US012069420B2

(12) United States Patent
Zhang et al.

(10) Patent No.: US 12,069,420 B2
(45) Date of Patent: Aug. 20, 2024

(54) OPEN EARPHONES

(71) Applicant: SHENZHEN SHOKZ CO., LTD., Guangdong (CN)

(72) Inventors: Lei Zhang, Shenzhen (CN); Liwei Wang, Shenzhen (CN); Zhen Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/518,477

(22) Filed: Nov. 23, 2023

(65) Prior Publication Data

US 2024/0147105 A1 May 2, 2024

Related U.S. Application Data

(63) Continuation of application No. PCT/CN2022/134389, filed on Nov. 25, 2022.

(30) Foreign Application Priority Data

Oct. 28, 2022 (CN) ......................... 202211336918.4

(51) Int. Cl.
*H04R 1/08* (2006.01)
*H04R 1/10* (2006.01)

(52) U.S. Cl.
CPC ............ *H04R 1/08* (2013.01); *H04R 1/1091* (2013.01); *H04R 1/105* (2013.01)

(58) Field of Classification Search
CPC .......... H04R 1/02; H04R 1/08; H04R 1/1008; H04R 1/105; H04R 1/1066; H04R 1/1075;
(Continued)

(56) References Cited

U.S. PATENT DOCUMENTS

2017/0201823 A1* 7/2017 Shetye .................. H04R 1/347
2018/0167710 A1* 6/2018 Silver .................. H04R 1/1008
(Continued)

FOREIGN PATENT DOCUMENTS

CN 201616895 U 10/2010
CN 113905304 A 1/2022
(Continued)

OTHER PUBLICATIONS

International Search Report in PCT/CN2022/134389 mailed on Jul. 5, 2023, 13 pages.
(Continued)

*Primary Examiner* — Thang V Tran
(74) *Attorney, Agent, or Firm* — METIS IP LLC

(57) ABSTRACT

An open earphone includes an acoustic driver for generating two sounds with opposite phases; a housing for accommodating the acoustic driver; and a suspension structure for fixing the housing in a position near an ear of a user without blocking an ear canal of the user. The housing is provided with two sound holes for outputting each of the two sounds with opposite phases. The housing includes a body and a baffle. The body defines a first cavity for housing the acoustic driver. The baffle is connected to the body and extended in a direction toward the ear canal of the user, and defines a second cavity with the auricle of the user. The two sound holes are disposed respectively inside and outside the second cavity.

18 Claims, 44 Drawing Sheets

(58) Field of Classification Search
CPC ...... H04R 1/1091; H04R 1/1846; H04R 1/24; H04R 1/26; H04R 1/3803; H04R 1/2888; H04R 1/2892; H04R 1/2896; H04R 5/0335; H04R 25/40; H04R 25/402; H04R 25/607; H04R 26/65; H04R 2205/022; H04R 2205/024
See application file for complete search history.

(56) References Cited

U.S. PATENT DOCUMENTS

| | | | | |
|---|---|---|---|---|
| 2019/0052954 | A1* | 2/2019 | Rusconi Clerici Beltrami | G10K 11/26 |
| 2019/0238971 | A1* | 8/2019 | Wakeland | H04R 1/24 |
| 2019/0253805 | A1* | 8/2019 | Wakeland | H04R 7/18 |
| 2020/0359129 | A1* | 11/2020 | Wakeland | H04R 1/2803 |
| 2021/0067857 | A1* | 3/2021 | Struzik | H04R 1/345 |
| 2021/0112329 | A1 | 4/2021 | Zhang et al. | |
| 2021/0127200 | A1* | 4/2021 | Zhang | H04R 3/005 |
| 2021/0219068 | A1 | 7/2021 | Zhang et al. | |
| 2022/0174403 | A1* | 6/2022 | Wang | H04R 1/345 |
| 2022/0182754 | A1* | 6/2022 | Fu | H04R 1/347 |
| 2022/0343887 | A1 | 10/2022 | Xiao et al. | |
| 2023/0403508 | A1* | 12/2023 | Wang | H04R 5/02 |

FOREIGN PATENT DOCUMENTS

| | | | |
|---|---|---|---|
| CN | 114175677 | A | 3/2022 |
| CN | 115243137 | A | 10/2022 |
| CN | 217643682 | U | 10/2022 |
| JP | 2000092581 | A | 3/2000 |

OTHER PUBLICATIONS

Written Opinion in PCT/CN2022/134389 mailed on Jul. 5, 2023, 7 pages.

* cited by examiner

OPEN EARPHONES

CROSS-REFERENCE TO RELATED APPLICATION

This application is a continuation of International Application No. PCT/CN2022/134389, filed on Nov. 25, 2022, which claims priority of Chinese Patent Application No. 202211336918.4, filled on Oct. 28, 2022, the contents of each of which are entirely incorporated herein by reference.

TECHNICAL FIELD

The present disclosure relates to the field of acoustics, and in particular, relates to open earphones.

BACKGROUND

An earphone is a portable audio output device that enables sound conduction. In order to solve sound leakage in the earphone, two or more sound sources may be utilized to send two acoustic signals with opposite phases. In a far field condition, a sound path difference between two sound sources with opposite phases that arrive at a point in the far field may be essentially negligible, so the two acoustic signals may cancel each other out to reduce a far field sound leakage. An effect of reducing the sound leakage to a certain extent is achieved, but there may still be some limitations. For example, while suppressing the far field sound signal, a sound volume of the near field sound signal may be reduced; and as a phase difference increases with a signal frequency, it is ineffective in suppressing the high-frequency signals in the far field.

Therefore, it is desired to provide an earphone effectively reduces the sound leakage, which is capable of increasing the sound volume of the near field sound signal while reducing the sound volume of the far field sound leakage.

SUMMARY

One of the embodiments of the present disclosure provides an open earphone including: an acoustic driver for generating two sounds with opposite phases; a housing for accommodating the acoustic driver, the housing being provided with two sound holes for outputting each of the two sounds with opposite phases; and a suspension structure for fixing the housing in a position near an ear of a user without blocking the ear canal of the user. The housing may include a body and a baffle. The body may define a first cavity accommodating the acoustic driver, and the baffle may be connected to the body and extended in a direction of an ear canal of the user. The two sound holes may be respectively located inside and outside of the second cavity In some embodiments, the baffle may be connected to one side of the body facing away from face of the user, and a thickness of the baffle may be less than a thickness of the body.

In some embodiments, a ratio of a distance between a boundary of the baffle near the ear canal of the user and a sound hole located outside of the second cavity to a distance between the two sound holes may be less than 1.78

In some embodiments, the distance between the boundary of the baffle near the ear canal of the user and the sound hole located outside of the second cavity may be less than the distance between the two sound holes.

In some embodiments, a ratio of a volume of the second cavity to a reference volume may be less than 1.75, the reference volume being a cube of the distance between the boundary of the baffle near the ear canal of the user and a sound hole located outside of the second cavity In some embodiments, a ratio of a sound volume of a sound output from a sound hole located outside of the second cavity to a sound volume of a sound output from a sound hole located inside the second cavity is in a range of 0.2-2.0.

In some embodiments, the open earphone may further include an acoustic structure. The acoustic structure may be configured to adjust the ratio of the sound volume of the sound output from the sound hole located outside of the second cavity to the sound volume of the sound output from the sound hole located inside the second cavity. The acoustic structure may include one of the following: a slit, a conduit, a cavity, a gauze, or a porous medium.

In some embodiments, the sound hole located inside of the second cavity may be located between the ear canal of the user and a sound hole located outside of the second cavity.

In some embodiments, when the body is located on a front side of a tragus of the user, a horizontal extension size of the baffle may be in a range of 2 mm-22 mm, and a longitudinal extension size of the baffle may be in a range of 2 mm-10 mm.

In some embodiments, an effective area of the baffle may be in a range of 84 $mm^2$-1060 $mm^2$.

In some embodiments, one of the two sound holes may be on a side of the body facing the tragus, and the other sound hole may be on a side where the baffle is located.

In some embodiments, when the body is located within the auricle or when there is an overlap between the body and a projection surface of the auricle, a longitudinal extension size of the baffle may not be less than 1 cm or an effective area of the baffle may not be less than 20 $mm^2$.

In some embodiments, one of the two sound holes may be on a side of the body towards the ear canal, and the other sound hole may be on a side of the body away from the ear canal In some embodiments, at least a portion of the ear canal of the user may be located inside the second cavity.

In some embodiments, the housing may at least partially cover the ear canal of the user.

One of the embodiments of the present disclosure provides another open earphone including: an acoustic driver for generating two sounds with opposite phases; a housing for accommodating the acoustic driver, the housing being provided with two sound holes for outputting the two sounds with opposite phases respectively; and a suspension structure for holding an end of the housing away from the suspension structure against an auricle of a user. The housing may define a first cavity accommodating the acoustic driver. The housing and the auricle may define a second cavity, and the two sound holes may be respectively located inside and outside of the second cavity.

In some embodiments, an angle between a surface of the housing towards a triangular fossa and a tangent line between the suspension structure and a housing connection may be in a range of 100°-150°.

In some embodiments, a ratio of a distance between a gap between the housing and an ear canal opening and a sound hole located outside of the second cavity to a distance between the two sound holes may be less than 1.78.

In some embodiments, a distance between a gap between the housing and an ear canal opening and a sound hole located outside of the second cavity may be less than a distance between the two sound holes.

In some embodiments, a ratio of a volume of the second cavity to a reference volume may be less than 1.75, the reference volume being a cube of a distance from a gap between the housing and an ear canal opening to a sound hole located outside of the second cavity.

In some embodiments, a ratio of the sound volume of the sound output from the sound hole located outside of the second cavity to the sound volume of the sound output from the sound hole located inside of the second cavity may be in a range of 0.2-2.0.

In some embodiments, the open earphone may further include an acoustic structure, the acoustic structure being configured to adjust the ratio of the sound volume of the sound output from the sound hole located outside of the second cavity to the sound volume of the sound output from the sound hole located inside of the second cavity. The acoustic structure may include one of the following: a slit, a conduit, a cavity, a gauze, or a porous medium.

In some embodiments, the sound hole located inside of the second cavity may be located on a side of the housing facing the ear canal In some embodiments, the sound hole located outside of the second cavity may be located on either a side of the housing toward a triangular fossa or a side of the housing toward an earlobe.

In some embodiments, a distance between an upper surface of the housing along a vertical axis of the user and a point at which the suspension structure contacts an ear of the user along a vertical axis of the user is within a range of 10 mm-20 mm.

In some embodiments, a length of the housing may be in a range of 20 mm-30 mm along a long axis of the housing on a surface away from the ear of the user.

In some embodiments, a length of the housing may be in a range of 11 mm-16 mm along a short axis of the housing on a surface away from the ear of the user.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which the same reference numbers represent the same structures, and wherein.

DETAILED DESCRIPTION

Figure 1:
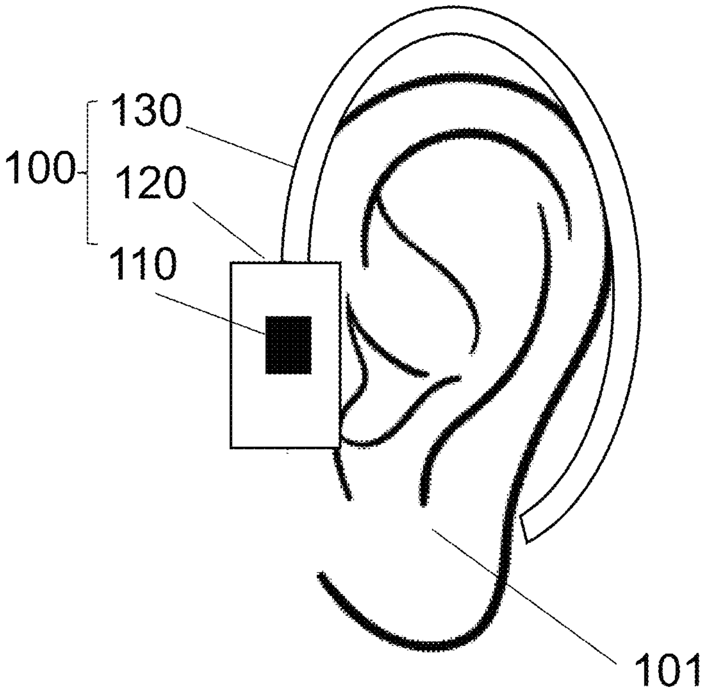
FIG. 1 is a structural diagram illustrating an exemplary open earphone according to some embodiments of the present disclosure.

In order to more clearly illustrate the technical solutions of the embodiments of the present disclosure, a brief description of the accompanying drawings used in the description of the embodiments is given below. Obviously, the accompanying drawings in the following description are only some examples or embodiments of the present disclosure, and it may be possible for those skilled in the art to apply the present disclosure to other similar scenarios based on the accompanying drawings without creative labor. Unless obviously obtained from the context or the context illustrates otherwise, the same numeral in the drawings refers to the same structure or operation.

It should be understood that the terms "system," "device," "unit," and/or "module" as used herein is a way to distinguish between different components, elements, portions, sections, or assemblies at different levels. However, words may be replaced by other expressions if other words accomplish the same purpose.

As used in the disclosure and the appended claims, the singular forms "a," "an," and "the" include plural referents unless the content clearly dictates otherwise. Generally, the terms "including" and "comprising" suggest only the inclusion of clearly identified operations and elements that do not constitute an exclusive list, and the method or apparatus may also include other operations or elements.

Embodiments of the present disclosure discloses open earphones. When a user wears an open earphone, the open earphone may fix, by a suspension structure, a housing near the ear of the user without blocking an ear canal of the user. The open earphone may be worn on the head of the user (e.g., the open earphone worn as eyeglasses or other structural means), or on other portions of a body of the user (e.g., a neck/shoulder region of the user), or placed near the ear of the user by other means (e.g., handheld). The open earphone may include an acoustic driver, the housing, and the suspension structure. The acoustic driver may be configured to generate two sounds with opposite phases. The housing may be configured to accommodate the acoustic driver, and the housing may be provided with two sound holes for outputting each of the two sounds with opposite phases.

In some embodiments, the suspension structure may be configured to fix the housing in a position near an ear of a user without blocking the ear canal of the user. In some embodiments, the housing may include a body and a baffle. The body may define a first cavity accommodating the acoustic driver. The baffle may be connected to the body, extended in a direction of the ear canal of the user, and may define a second cavity with an auricle of the user. The two sound holes may be located inside and outside of the second cavity, respectively.

In other embodiments, the suspension structure may be configured to hold an end of the housing (e.g., an end away from the suspension structure) against a concha cavity of the user. The housing may define the first cavity accommodating the acoustic driver, and the housing and the concha cavity may define the second cavity. The two sound holes may be located inside and outside of the second cavity, respectively.

In some embodiments, by limiting at least one of the sound holes inside the second cavity, a majority of the sound may be conducted into the ear canal of the user for near field listening, thereby increasing a listening volume. At the same time, as the leaky structure (e.g., a slit, etc.) is provided in the second cavity, the sound generated from the sound hole located inside the second cavity may also be radiated out of the second cavity, which still produces a sound cancellation with the sound generated from the other sound hole in the far field, thereby realizing a sound leakage reduction effect.

FIG. 1 is a structural diagram illustrating an exemplary open earphone according to some embodiments of the present disclosure. As shown in FIG. 1, an open earphone 100 may include an acoustic driver 110, a housing 120, and a suspension structure 130. In some embodiments, the open earphone 100 may be worn on a body (e.g., a head, neck, or upper torso) of the user through the suspension structure 130. The housing 120 and the acoustic driver 110 may be near an ear canal without blocking the ear canal, such that an ear 101 of the user remains open, thereby allowing the user to hear a sound output from the open earphone 100 while at the same time accessing the sound from an external environment. For example, the open earphone 100 may be disposed around or partially around a circumference of the ear 101 of the user and may transmit sound by air conduction or bone conduction.

In some embodiments, the housing 120 may be configured to be worn on the body of the user and may carry the acoustic driver 110. In some embodiments, the housing 120 may be a sealed housing structure that is internally hollow and the acoustic driver 110 may be disposed within the housing 120. In some embodiments, the open earphone 100 may be combined with products such as eyeglasses, headsets, head-mounted displays, AR/VR helmets, etc. In these situations, the housing 120 may be fixed near the ear 101 of the user through suspending or clamping. In some alternative embodiments, a suspension structure (e.g., a hook) may be provided on the housing 120. For example, a shape of the hook may match a shape of an ear contour, and the open earphone 100 may be worn independently on the ear 101 of the user through the hook.

In some embodiments, the housing 120 may be a housing structure that is shape-adapted to the human ear 101 (e.g., an annular shape, an ellipse shape, a polygonal shape (regular or irregular), a U-shape, a V-shape, and a semicircle shape, etc.), so that the housing 120 may be directly attached at the ear 101 of the user. In some embodiments, the housing 120 may also include a fixed structure. The fixed structure may include an earhook, an elastic band, etc., thereby allowing the open earphone 100 to be well fixed to the user, and preventing the open earphone 100 from falling down in use.

In some embodiments, the housing 120 may be located above, below, in front of (e.g., in front of the tragus), or in an auricle (e.g., in a concha cavity) of the ear 101 of the user when the user wears the open earphone 100. The housing 120 may also be provided with two or more sound holes for transmitting the sound. In some embodiments, the acoustic driver 110 may output the sounds with a phase difference (e.g., opposite phases) through the two sound holes.

The acoustic driver 110 may be an element that receives an electrical signal and converts the electrical signal to a sound signal for output. In some embodiments, differentiated by frequency, a type of acoustic driver 110 may include a low frequency (e.g., 30 Hz-150 Hz) speaker, a mid-low frequency (e.g., 150 Hz-500 Hz) speaker, a mid-high frequency (e.g., 500 Hz-5 kHz) speaker, a high frequency (e.g., 5 kHz-16 kHz) speaker, or a full frequency (e.g., 30 Hz-16 kHz) speaker, or any combination thereof. The low frequency, the high frequency, etc., mentioned here only indicate an approximate range of frequencies, which may be divided differently in different application scenarios. For example, a crossover point may be determined, with the low frequency indicating a range of frequencies below the crossover point, and the high frequency indicating frequencies above the crossover point. The crossover frequency point may be any value within an audible range of a human ear, e.g., 500 Hz, 600 Hz, 700 Hz, 800 Hz, 1000 Hz, etc.

In some embodiments, a core and a mainboard (not shown) may also be provided inside the housing 120. The core may form at least a portion of the structure of the acoustic driver 110, and the acoustic driver 110 may be configured to use the core to generate the sound, which is transmitted along a corresponding acoustic path to the corresponding sound outlet, respectively, and output from the sound outlet. The mainboard may be electrically connected to the core to control the sound generation of the core. In some embodiments, the mainboard may be disposed on the housing 120 near the core to shorten alignment distances to the core and other components (e.g., function buttons).

In some embodiments, the acoustic driver 110 may include a diaphragm. When the diaphragm vibrates, the sound may be generated from a front side and a rear side of the diaphragm, respectively. In some embodiments, the front side of the diaphragm within the housing 120 may be provided with a front cavity (not shown) for transmitting sound. The front cavity may be acoustically coupled to one of the sound holes (e.g., the first sound hole), and the sound from the front side of the diaphragm may be generated through the front cavity from the first sound hole. A rear cavity for transmitting sound may be provided at a location on the rear side of the diaphragm within the housing 120 (not shown). The rear cavity may be acoustically coupled to the other sound hole (e.g., a second sound hole), and the sound of the rear side of the diaphragm may be emitted from the second sound hole through the rear cavity. In some embodiments, the core may include a core housing (not shown). The core housing and the diaphragm of the acoustic driver 110 may define and form the front cavity and the rear cavity of the acoustic driver 110. In some embodiments, the open earphone 100 may also include a power supply (not shown). The power supply may be disposed at any location of the open earphone 100, such as a position on the housing 120 away from or near the acoustic driver 110. In some embodiments, the position of the power supply may also be reasonably disposed according to a weight distribution of the open earphone 100, so that the weight distribution on the open earphone 100 may be more balanced, thereby improving comfort and stability of the user when the user is wearing the open earphone 100. In some embodiments, the power supply may provide electrical power to various components of the open earphone 100 (e.g., the acoustic driver 110, the core, etc.). The power supply may be electrically connected to the acoustic driver 110 and/or the core to provide electrical power for the acoustic driver 110 and/or the core. It should be noted that when the diaphragm is vibrating, a group of sounds with phase differences (e.g., opposing phases) may generate simultaneously on the front side of the diaphragm and the rear side of the diaphragm. When passing through the front cavity and the rear cavity, respectively, the sounds may spread outward from the positions of the first sound hole and the second sound hole. In some embodiments, structures of the front cavity and the rear cavity may be disposed such that the sounds output from the acoustic driver 110 at the first sound hole and the second sound hole meet specific conditions. For example, the lengths of the front cavity and the rear cavity may be designed, such that a group of sounds with a particular phase relationship (e.g., opposite phases) may be output at the first sound hole and the second sound hole, so that a listening volume of the open earphone 100 in a near field is small, and a sound leakage in a far field is effectively reduced.

In order to further illustrate an effect of the distribution of the sound holes on both sides of the auricle on a sound output effect of the open earphone, the open earphone and the auricle may be equivalently modeled as a dual-source-baffle in the present disclosure.

Merely for facilitating description and illustration, when sizes of the sound holes on the open earphone is small, each sound hole may be approximately regarded as a point sound source. A sound pressure p in a sound field generated by a single point source may satisfy equation (1):

$$p = \frac{j\omega\rho_0}{4\pi r} Q_0 \exp j(\omega t - kr), \quad (1)$$

where ω denotes an angular frequency, $\rho_0$ denotes an air density, r denotes a distance between a target point and the sound source, $Q_0$ denotes a sound source volume speed, k denotes a wave number, and a magnitude of the sound pressure in the sound field of the point sound source may be inversely proportional to a distance from the point sound source.

As described above, two sound holes (e.g., the first sound hole and the second sound hole) may be disposed in the open earphone 100 to construct a dipole sound source to reduce the sound radiated from the open earphone to a surrounding environment (i.e., the far field sound leakage). In some embodiments, the sounds output by two sound holes, i.e., the dipole sound sources, may have a certain phase difference. When the position, and the phase difference, etc., between the dipole sound sources satisfy a certain condition, the open earphone may be made to exhibit different sound effects in the near field and the far field. For example, when the phases of the point sound sources corresponding to the two sound holes are opposite, i.e., an absolute value of the phase difference between the dual-point sources is 180°, the far field sound leakage may be reduced according to a principle of sound wave inversion and cancellation. Furthermore, for example, the far field sound leakage may also be realized when the phases of the point sound sources corresponding to the two sound holes are approximately opposite. As an example only, the absolute value of the phase difference between the dual-point sources for reducing the far field sound leakage may be in a range of 120°-240°.

Figure 2:
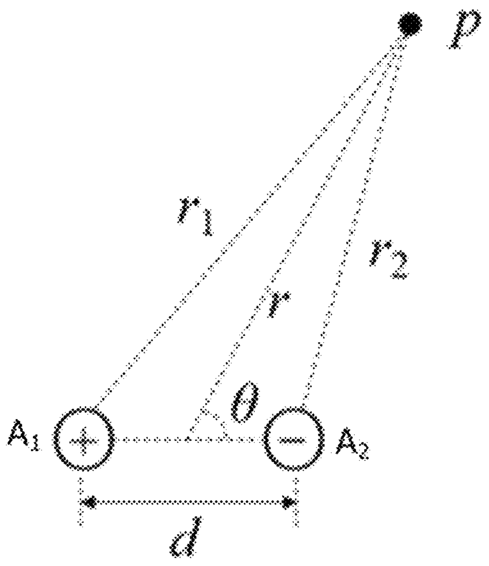
FIG. 2 is a schematic diagram illustrating a dual-point source according to some embodiments of the present disclosure.

FIG. 2 is a schematic diagram illustrating a dual-point source according to some embodiments of the present disclosure.

As shown in FIG. 2, the sound pressure p in the sound field generated by a dipole sound source may satisfy the following equation:

$$p = \frac{A_1}{r_1} \exp j(\omega t - kr_1 + \varphi_1) + \frac{A_2}{r_2} \exp j(\omega t - kr_2 + \varphi_2), \quad (2)$$

where A1 and A2 denote intensities of the dual-point sources respectively, $\varphi_1$ and $\varphi_2$ denote the phases of the dual-point sources respectively, and d denotes a spacing between two sound source of the dual-point source, $r_1$ and $r_2$ may satisfy equation (3):

$$\begin{cases} r_1 = \sqrt{r^2 + \left(\frac{d}{2}\right)^2 - 2 * r * \frac{d}{2} * \cos\theta} \\ r_2 = \sqrt{r^2 + \left(\frac{d}{2}\right)^2 + 2 * r * \frac{d}{2} * \cos\theta} \end{cases}, \quad (3)$$

where r denotes a distance between any target point in the space and a center of the dipole sound source, and θ denotes an angle between a line connecting the target point and the center of the dipole sound source and a straight line where the dipole sound source is located.

Through Equation (3), it may be seen that a magnitude of the sound pressure p at the target point in the sound field may be related to an intensity of the sound source at each point, a spacing d, the phase, and the distance of the target point from the sound source.

In an application of the open earphone, it may be necessary to ensure that the sound pressure transmitted to the listening position is great enough to meet listening demands, and at the same time, it may be necessary to ensure that the sound pressure of the sound radiates to the far field is small enough to reduce the sound leakage. Therefore, a sound leakage index a may be taken as an index for evaluating an ability to reduce the sound leakage:

$$\alpha = \frac{|P_{far}|^2}{|P_{ear}|^2}, \quad (4)$$

where $P_{far}$ denotes the sound pressure of the sound in the far field of the open earphone (i.e., the sound pressure of the sound leakage in the far field), and $P_{ear}$ denotes the sound pressure around the ear of the user (i.e., a listening sound pressure in the near field). Through Equation (4), it may be seen that the smaller the leakage index, the stronger the ability to reduce the sound leakage of the open earphone, and when the near field listening volume is the same at the listening position, the sound leakage in the far field may be small.

Figure 3:
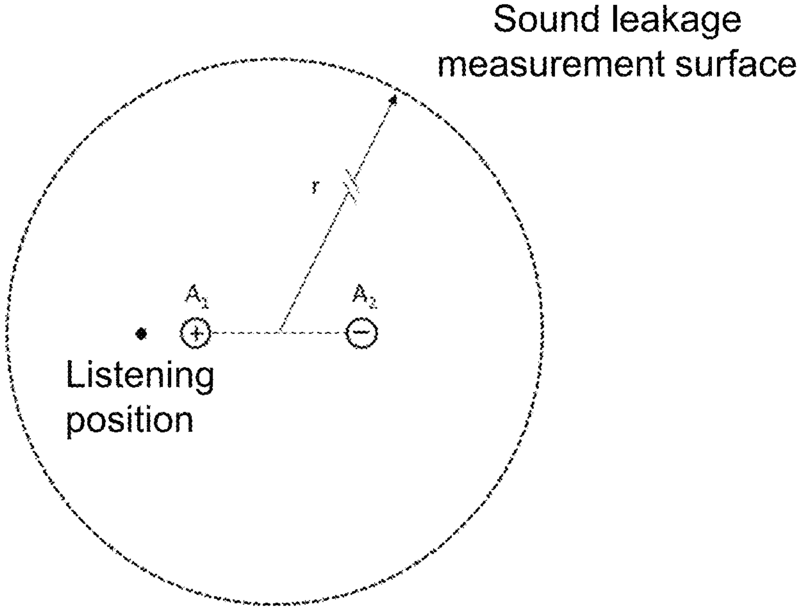
FIG. 3 is a schematic diagram illustrating a measurement of a sound leakage according to some embodiments of the present disclosure.

FIG. 3 is a schematic diagram illustrating a measurement of a sound leakage according to some embodiments of the present disclosure. As shown in FIG. 3, a listening position may be located on left of a point sound source A1, and a measurement mode of the sound leakage may be taking an average value of sound pressure amplitude at each point on a sphere centered on a center of dipole sound sources (A1 and A2, as shown in FIG. 3) with a radius of r as a sound leakage value. It is to be known that the mode of measuring the sound leakage in the present disclosure is only an exemplary illustration of a principle and an effect, and is not a limitation. The mode of measuring and calculating the sound leakage may be reasonably adjusted according to an actual situation. For example, a center of the dipole sound source may be taken as a center of a circle, two or more points may be uniformly taken in a far field according to a certain space angle, and the sound pressure amplitudes at the two or more points may be averaged. In some embodiments, a mode of measuring a listening sound may be selecting a point near the point sound source as the listening position, and taking the sound pressure amplitude measured at that listening position as a value of the listening sound. In some embodiments, the listening position may or may not be on a line connecting the dual-point source. The mode of measuring and calculating the listening sound may be reasonably adjusted according to an actual situation. For example, the mode of measuring and calculating the listening sound may be taking other points or one or more points in the near field, and averaging the sound pressure amplitudes at these points. For another example, the listening sound may be measured and calculated by taking a point sound source as the center of the circle, uniformly taking two or more points in the near field according to a certain space angle, and averaging the sound pressure amplitudes of the two or more points. In some embodiments, a distance between the near field listening position and the point sound source may be much smaller than a distance between the point sound source and the sphere for measuring the far field sound leakage.

Figure 4:
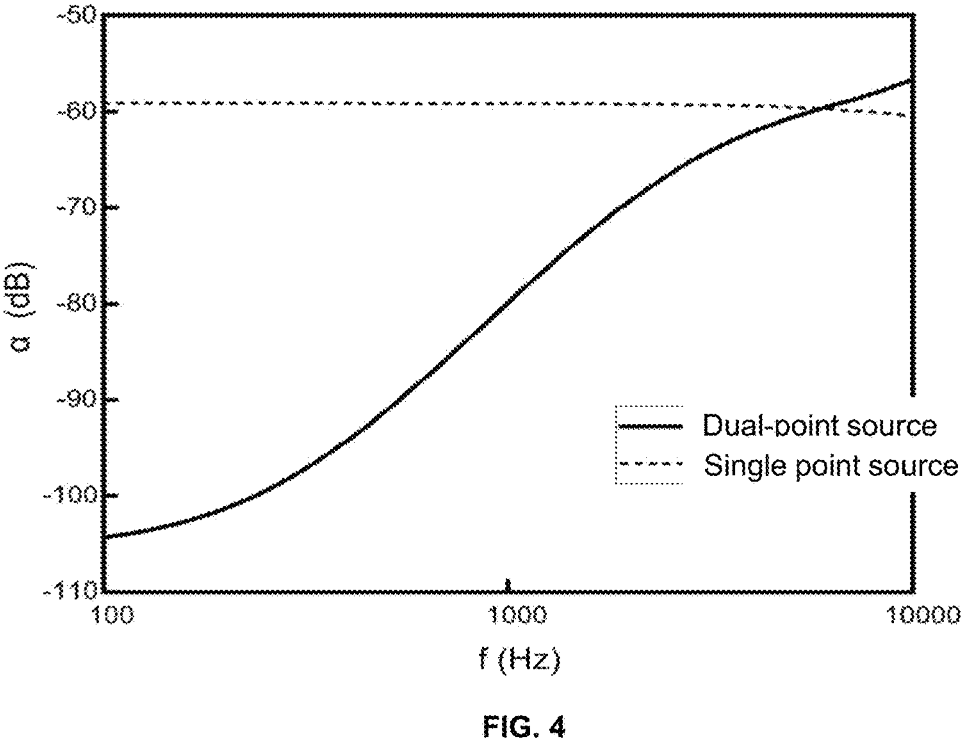
FIG. 4 is a comparison diagram illustrating sound leakage indexes of a single point source and a dual-point source at different frequencies according to some embodiments of the present disclosure.

FIG. 4 is a comparison diagram illustrating sound leakage indexes of a single point source and a dual-point source at different frequencies according to some embodiments of the present disclosure. The dual-point source (which may also be referred to as a dipole sound source) in FIG. 4 may be a typical dual-point source, i.e., with a fixed spacing, the same amplitude, and opposite phases. It may be understood that the selection of the typical dual-point source is only an illustration of the principle and effect. Parameters of each point sound source may be adjusted according to actual needs, which may be different from the typical dual-point source. As shown in FIG. 4, with the fixed spacing, a sound leakage generated by the dual-point source may increase with an increase of a frequency, and an ability to reduce the sound leakage may decrease with the frequency. When the frequency is greater than a certain frequency value (e.g., about 8000 Hz as shown in FIG. 4), the sound leakage generated may be greater than the frequency generated by a single point source, and the frequency (e.g., 8000 Hz) may be an upper limit frequency at which the dual-point source is able to reduce the sound leakage.

Figure 5:
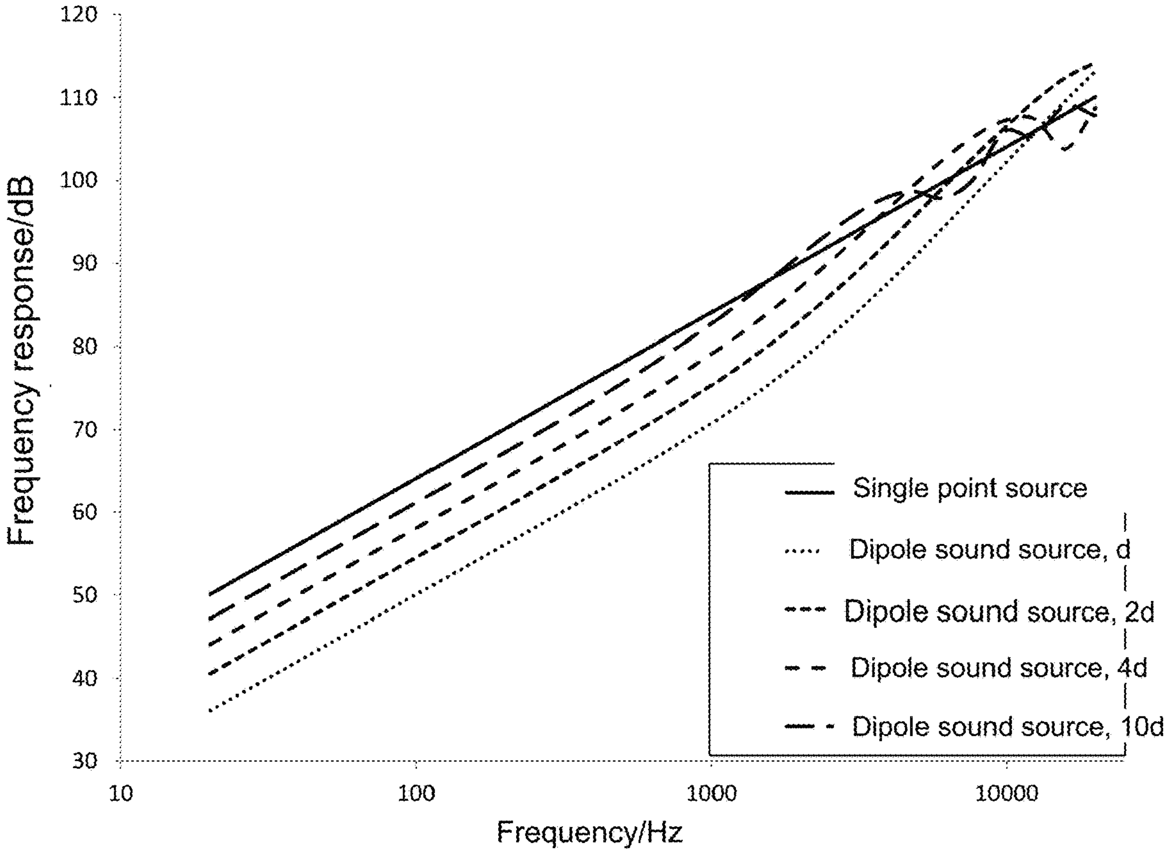
FIG. 5 illustrates frequency responses of dipole sound sources with different spacings at a near field listening position according to some embodiments of the present disclosure.

In order to adjust an output effect of the dual-point source (e.g., reducing the sound leakage index), the spacing d between the dual-point source may be adjusted. FIG. 5 illustrates frequency responses of dipole sound sources with different spacings at a near field listening position according to some embodiments of the present disclosure. As shown in FIG. 5, a sound volume at the listening position may gradually increase with a gradual increase in a spacing between a point sound source A1 and a point sound source A2 (e.g., increase from d to 10d). This is due to a fact that as the spacing between the point sound source A1 and point sound source A2 increases, an amplitude difference (i.e., a sound pressure difference) between two sounds arriving at the listening position may increase, a sound path difference may increase, so that a sound cancellation effect may weaken, and the sound volume at the listening position increases. However, as the sound cancellation still exists, the sound volume at the listening position may still be lower than the sound volume generated by a single point source with the same intensity at the same location in a low and mid frequency band (e.g., sounds with frequencies of less than 1,000 Hz). But in a higher frequency band (e.g., sounds with frequencies close to 10,000 Hz), as a wavelength of the sound becomes smaller, a condition that satisfies a mutual enhancement of the sounds may occur, so as to make the sound generated by the dipole sound source greater than the sound generated by the single point source. In embodiments of the present disclosure, a sound pressure amplitude, i.e., a sound pressure, may be a pressure generated by a vibration of the sound through air.

Figure 6:
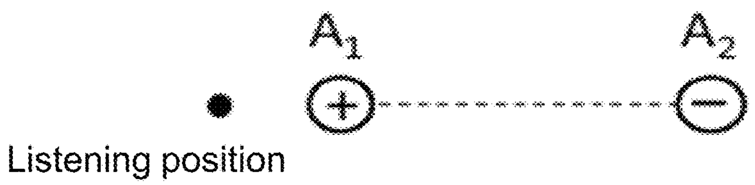
FIG. 6 is a schematic diagram illustrating a dual-point source and a listening position according to some embodiments of the present disclosure.
Figure 7:
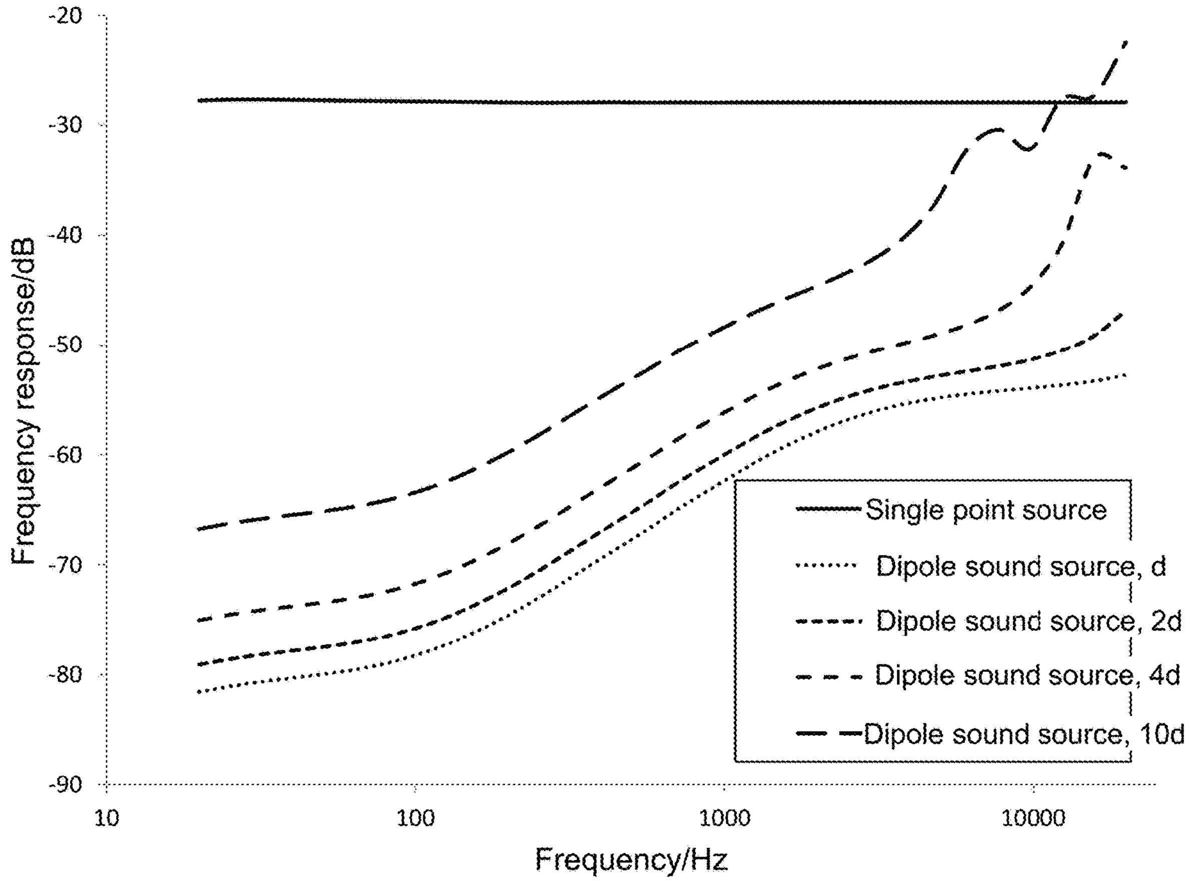
FIG. 7 is a diagram illustrating sound leakage indexes of dipole sound sources with different spacings in the far field according to some embodiments of the present disclosure.

In some embodiments, the sound volume at the listening position may be increased by increasing the spacing of the sound sources of the dipole sound source, but as the spacing increases, an ability of sound cancellation between sound sources of the dipole sound source may be weaker, thereby leading to an increase in a far field sound leakage. Merely as an illustration, FIG. 6 is a schematic diagram illustrating a dual-point source and a listening position according to some embodiments of the present disclosure. FIG. 7 is a diagram illustrating sound leakage indexes of dipole sound sources with different spacings in the far field according to some embodiments of the present disclosure. According to the listening position shown in FIG. 6, the point sound source A1 and the point sound source A2 may be located on the same side of the listening position, the point sound source A1 may be closer to the listening position than the point sound source A2, and the point sound source A1 and the point sound source A2 may output sounds with the same amplitude, but opposite phases. A sound leakage may be measured by taking an average value of the sound pressure amplitude at each point on a sphere with a radius of 50 cm and centered on a center of the dual-point source as a value of the sound leakage. The sound leakage indexes of a single point source and the dipole sound sources with different spacings in the far field are shown in FIG. 7. The sound leakage index of the single point source may be used as a reference, as the spacing between the dipole sound sources increases from d to 10d, the index gradually increases, thereby indicating an increasing sound leakage. At the same time, a frequency band in which the sound leakage is reduced may become narrower and narrower relative to the frequency band of the single point source. It should be understood that the above mode for measuring the sound leakage is only for illustrating the principle and effect.

Figure 8:
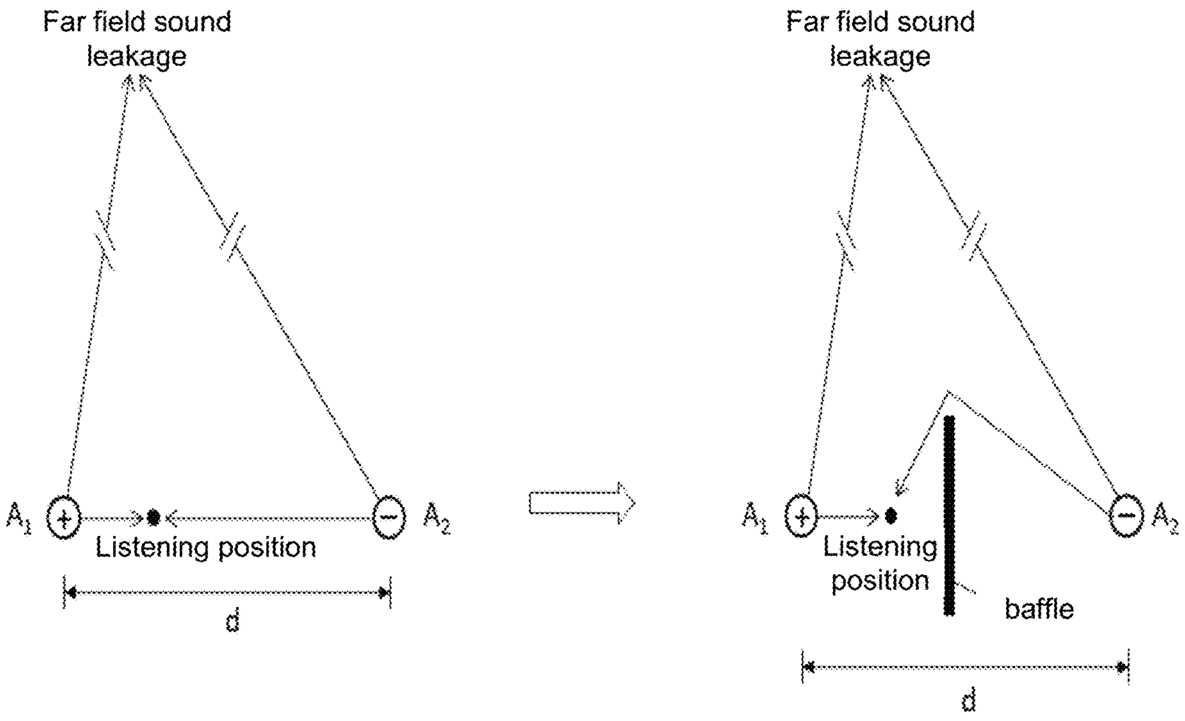
FIG. 8 is a schematic diagram illustrating an exemplary distribution of baffles provided around one sound source of a dipole sound source according to some embodiments of the present disclosure.

In some embodiments, a baffle may be provided around one of the dual-point source in order to improve an output of an open earphone, i.e., to increase an intensity of the sound at the near field listening position while reducing a sound volume of a far field sound leakage. FIG. 8 is a schematic diagram illustrating an exemplary distribution of baffles provided around one sound source of a dipole sound source according to some embodiments of the present disclosure. As shown in FIG. 8, when a baffle is provided between the point sound source A1 and the point sound source A2, in a near field, a sound field of the point sound source A2 may bypass the baffle in order to intervene with sound waves of the point sound source A1 at a listening position. This is equivalent to increasing a sound path from the point sound source A2 to the listening position. As a result, assuming that the point sound source A1 and the point sound source A2 have the same amplitude, an amplitude difference between the sound waves of the point sound source A1 and the point sound source A2 at the listening position may increase compared to a situation where the baffle is not provided, and thus a degree of cancellation of the two sounds at the listening position may be reduced, resulting in an increased sound volume at the listening position. In the far field, as the sound waves from both point sound source A1 and point sound source A2 may interfere over a great spatial range without bypassing the baffle (similar to the situation without the baffle), the sound leakage in the far field may not significantly increase compared to the situation without the baffle. Therefore, providing a baffle structure around one of the point sound source A1 and the point sound source A2 may significantly increase the sound volume at a listening position of the near field under a circumstance that a sound leakage volume in the far field is not significantly increased.

Figure 9:
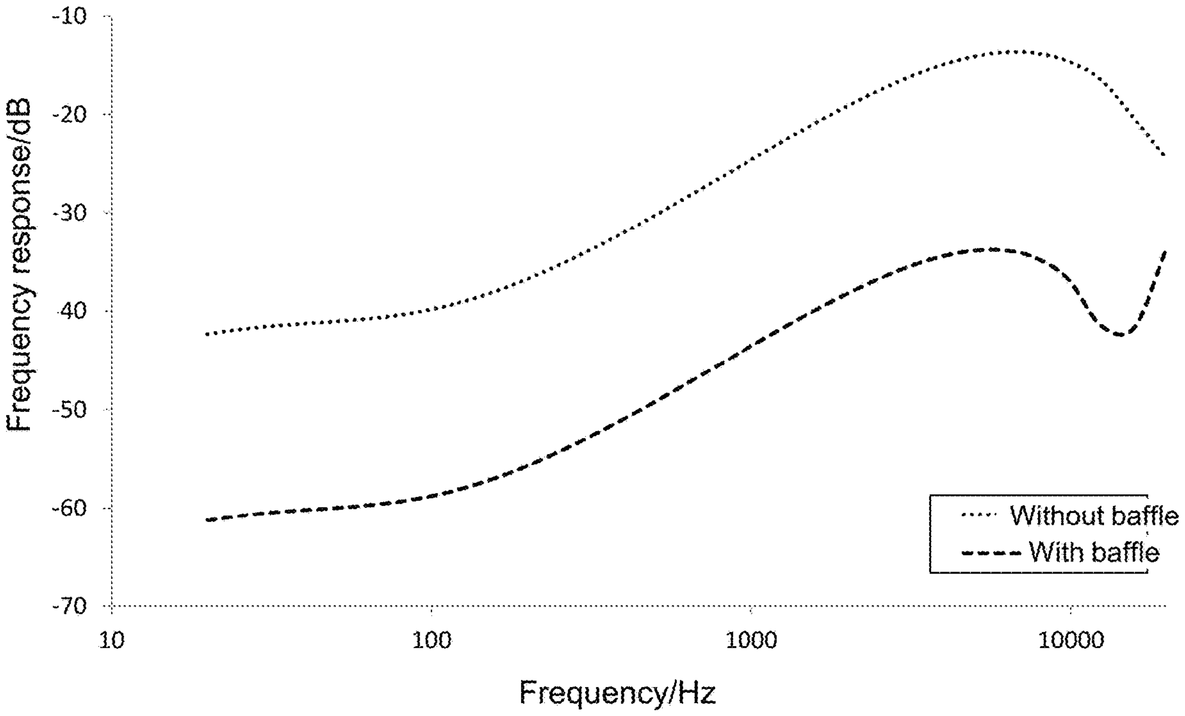
FIG. 9 is a diagram illustrating sound leakage indexes of one sound source of a dipole sound source provided with a baffle and without a baffle around according to some embodiments of the present disclosure.

FIG. 9 is a diagram illustrating sound leakage indexes of one sound source of a dipole sound source provided with and without a baffle around according to some embodiments of the present disclosure. After adding the baffle between two sound sources of the dual-point source, a distance between the two sound sources of the dual-point source in a near field is increased, and a sound volume at a near field listening position may be equivalent to being generated by a dual-point source with a greater distance between each other, and the listening volume in the near field may be significantly increased relative to a situation without the baffle. In a far field, the sound field of the dual-point source may be minimally affected by the baffle, a sound leakage generated may be equivalent to sound leakage generated by a dual-point source with a smaller distance. Therefore, as shown in FIG. 9, after adding the baffle, a leakage index may be much smaller compared to the situation without the baffle, i.e., at the same listening volume, the sound leakage in the far field may be smaller than the sound leakage without the baffle, and the ability to reduce the sound leakage may be significantly enhanced.

Figure 10:
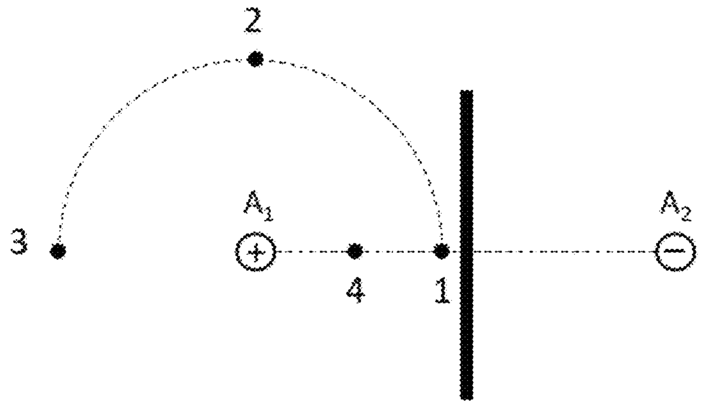
FIG. 10 is a schematic diagram illustrating a dipole sound source with a baffle at different listening positions in the near field according to some embodiments of the present disclosure.

In some embodiments, when a certain spacing of the dipole sound source is maintained, the position of the listening position with respect to the dipole sound source may have a certain effect on the listening volume in the near field and the sound leakage reduction in the far field. In order to improve an output effect of an open earphone, in some embodiments, two sound holes may be provided on the open earphone. The two sound holes may be respectively located at a front side and a rear side of the baffle when the user wears the earphone. In some embodiments, considering that the sound transmitted from the sound hole located on the rear side of the baffle may bypass the baffle to reach an ear canal of the user, an acoustic path from the sound hole located on the front side of the baffle to the ear canal of the user (i.e., the acoustic distance between the hole and entrance position of the ear canal of the user) may be shorter than the acoustic path from the sound hole located on the rear side of the baffle to the ear canal of the user. To further illustrate an effect of the listening position on the sound output effect, as an exemplary illustration, FIG. 10 is a schematic diagram illustrating a dipole sound source with a baffle at different listening positions in the near field provided according to some embodiments of the present disclosure. As shown in FIG. 10, four representative listening positions (i.e., listening position 1, listening position 2, listening position 3, and listening position 4) are selected to illustrate effects of and principle for the selection of listening positions. The listening position 1, the listening position 2, and the listening position 3 may respectively have equal spacing r1 from the point sound source A1, and the listening position 4 may have a different spacing r2 from the point sound source A1.

Figure 11:
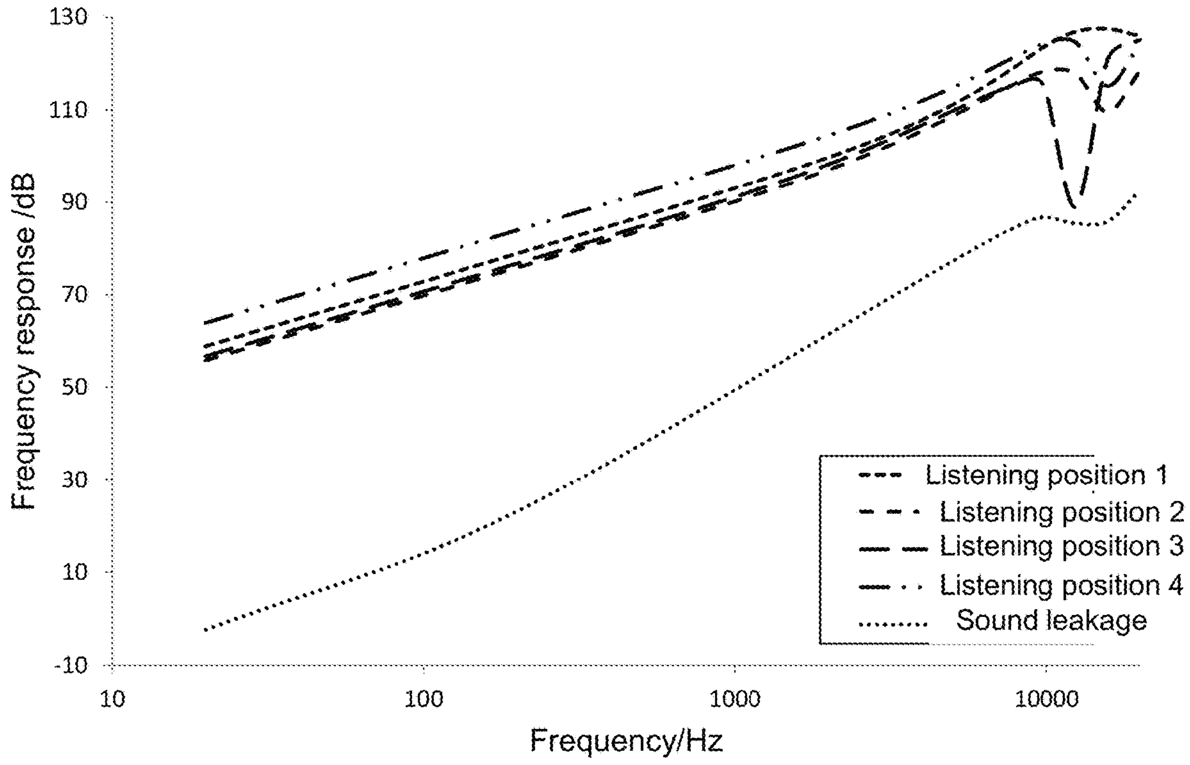
FIG. 11 illustrates frequency responses of a dipole sound source with a baffle at different listening positions in the near field provided according to some embodiments of the present disclosure.

FIG. 11 illustrates frequency responses of a dipole sound source with a baffle at different listening positions (as shown in FIG. 10) in the near field provided according to some embodiments of the present disclosure. As shown in FIG. 11, when there is the baffle, a sound leakage volume in a far field may not change with a change in the listening position. A listening volume at the listening position 1 may exceed the listening volume at the listening position 2 and the listening position 3. At the listening position 4, as a spacing between the listening position and a point sound source A1 is small, and a sound field amplitude of the point sound source A1 at the position is great, the listening volume at the listening position 4 may still be the greatest of the four listening positions. As the sound leakage volume in the far field may not change with the change of the listening position, and the listening volume at the listening position in the near field may change with the listening positions, the sound leakage indexes of the opening earphone in different listening positions, as shown in FIG. 11, may be different. The listening positions with greater listening volumes (e.g., the listening position 1 and the listening position 4) may have smaller sound leakage indexes, and greater abilities to reduce the sound leakage. The listening positions with smaller listening volumes (e.g., the listening position 2 and the listening position 3) may have greater sound leakage indexes, and weaker ability to reduce the sound leakage.

Figure 12:
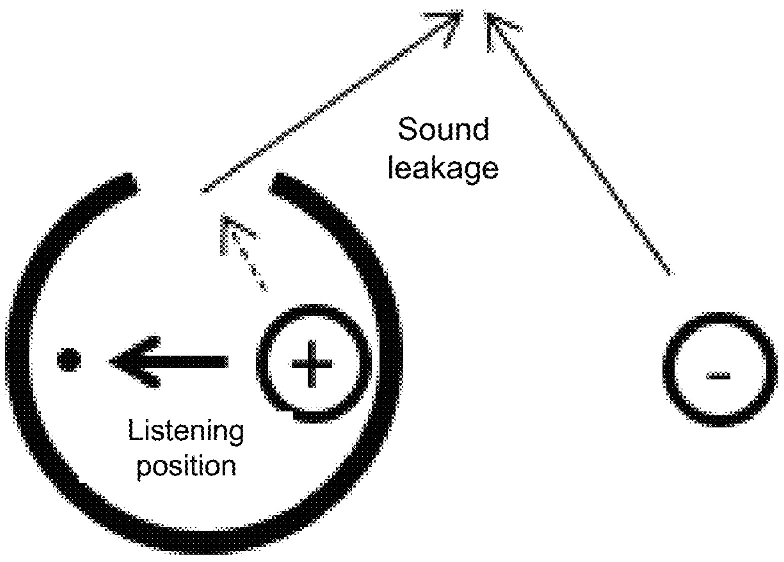
FIG. 12 is a schematic diagram illustrating an exemplary distribution of a cavity structure provided around one of sound sources according to some embodiments of the present disclosure.

In order to further increase the listening volume, especially the listening volume at low and mid frequencies, while still retaining a phase cancellation effect of the sound leakage in the far field, a cavity structure may be provided around one sound source of the dual-point source. FIG. 12 is a schematic diagram illustrating an exemplary distribution of a cavity structure provided around one of the sound sources according to some embodiments of the present disclosure. The "cavity structure" in the present disclosure refers to a structure that is isolated from the outside and at the same time has a hollow interior. The structure makes the interior not completely sealed from the outside. Instead, a leaky structure (e.g., an opening, a slit, a pipeline, etc.) communicating with an external environment may be allowed, so as to form a cavity-like structure, thereby keeping ears open. In some embodiments, the cavity structure may be provided with the leaky structure capable of making the interior of the cavity structure acoustically communicated with the external environment, and keeping ears open. Exemplary leaky structures may include, but not limited to, an opening, a slit, a pipeline, etc., or any combination thereof.

In some embodiments, the cavity structure may contain a listening position and at least one sound source. The "contained" herein may mean that at least one of the listening position and the sound source is inside the cavity, or at least one of the listening position and the sound source is at an interior edge of the cavity. In some embodiments, the listening position may be an ear or an entrance to an ear canal, or may be an acoustic reference point for the ear such as an ear reference point (ERP), a drum reference point (DRP), etc., or may be an entrance structure oriented towards a listener, etc.

The two sound sources with opposite phases may constitute a dipole. The dipole may radiate a sound to surrounding space and undergo a phenomenon of interference cancellation of sound waves, thereby realizing an effect of leakage sound cancellation. As a sound path difference and a sound volume difference of the two sounds are great at the listening position, the effect of sound cancellation may be relatively insignificant, and a great sound may be heard at the listening position than at other positions. In order to ensure the effect of the sound leakage cancellation while improving the sound volume at the listening position as much as possible, the cavity structure may be disposed as shown in FIG. 12. When the cavity structure is provided between the dipole sound source as shown in FIG. 12, one sound source of the dipole sound source and the listening position may be inside the cavity structure, and the other dipole sound source may be outside the cavity structure.

Figure 13:
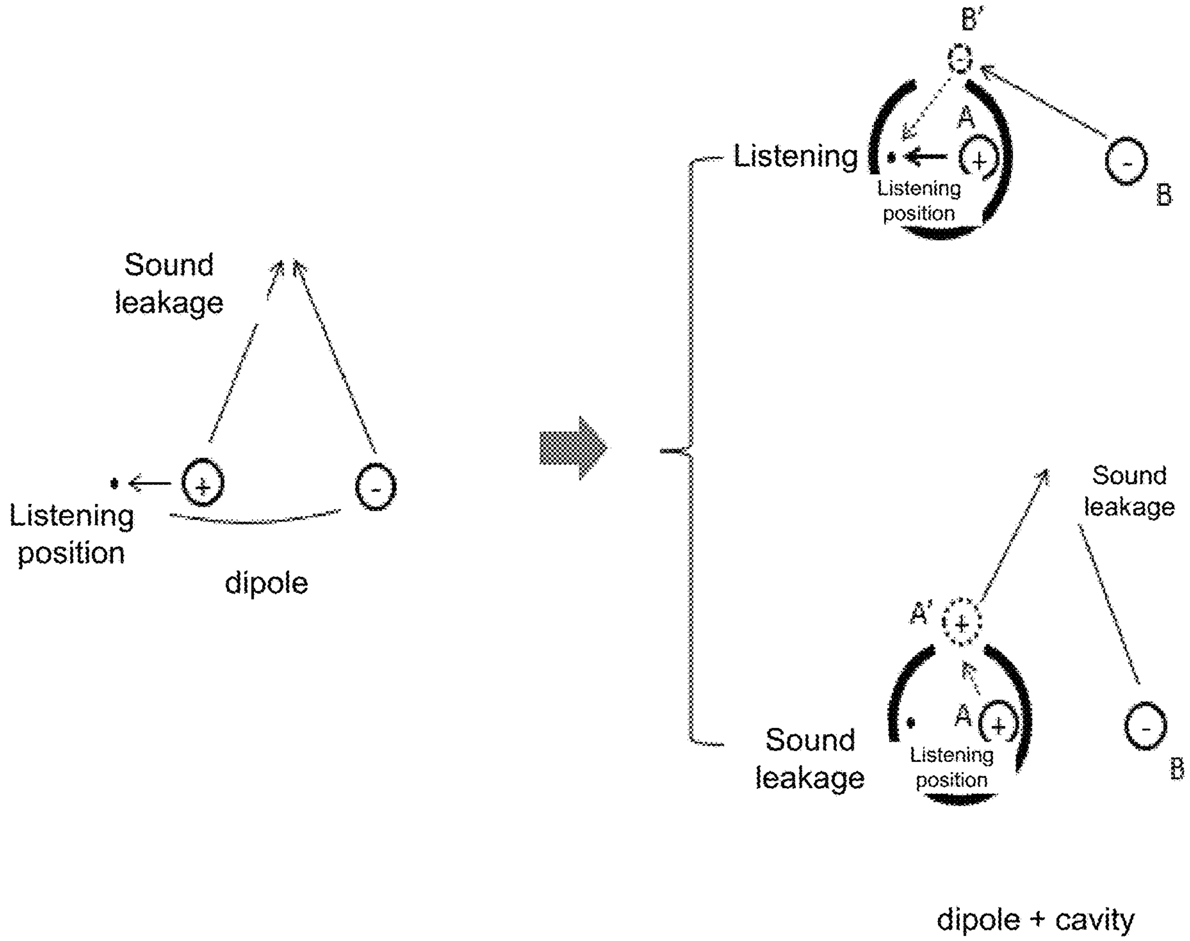
FIG. 13 is a schematic diagram illustrating a dipole sound source and a cavity structure provided around one sound source of the dipole sound source according to some embodiments of the present disclosure.

FIG. 13 is a schematic diagram illustrating a dipole sound source and a cavity structure provided around one sound source of a dipole sound source according to some embodiments of the present disclosure.

In the dipole sound source structure shown in FIG. 13, the two sound sources with opposite phases may constitute a dipole. The dipole may radiate a sound to a surrounding space and an interference cancellation of sound waves may occur, to realize an effect of sound leakage cancellation. As a sound path difference of the two sounds is great at a listening position, the effect of sound cancellation may be relatively insignificant, and a greater sound may be heard at the listening position than at other positions.

In order to maximize the sound volume of the listening sound while ensuring the leakage phase canceling effect, a cavity structure as shown in FIG. 12 may be disposed around one of the two sound sources of the dipole sound source. For listening, as shown in the upper right of FIG. 13, as one of the sound sources A is wrapped by the cavity structure, most of the sound radiated from the cavity structure may reach the listening position either by direct or reflected means. Comparatively, when there is no cavity structure, most of the sound radiated from the sound source may not reach the listening position. Thus, the cavity structure may be provided such that the sound volume of the sound reaching the listening position is significantly increased. At the same time, only a small portion of the sounds with opposite phases radiated from an opposite phase sound source B outside the cavity structure may enter the cavity structure through a leaky structure of the cavity structure. This is equivalent to generating a secondary sound source B' at the leaky structure. An intensity of the secondary sound source B' may be significantly smaller than the intensities of the sound source B and the sound source A. The sound generated by the secondary source B' may have a weak effect of opposite phase cancellation in the cavity on the source A, so that the listening volume at the listening position may be significantly increased.

For the sound leakage, as shown in the lower right of FIG. 13, the sound radiated by the sound source A to the outside world through the leaky structure of the cavity may be equivalent to generating a secondary sound source A' at the leaky structure. As almost all the sound radiated from the sound source A is output from the leaky structure, and a structural size of the cavity is much smaller than a spatial size at which the leakage sound is evaluated (the difference is at least an order of magnitude), the intensity of secondary sound source A' may be considered to be comparable to that of the intensity of sound source A. For the outside space, the sound phase cancellation effect produced by the secondary sound source A' and the sound source B may be comparable to the sound cancellation effect produced by the sound source A and the sound source B. That is, a comparable sound leakage reduction effect may still be maintained under the cavity structure.

Figure 14A:
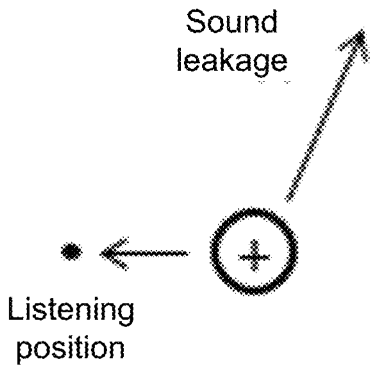
FIG. 14A is a schematic diagram illustrating a monopole sound source according to some embodiments of the present disclosure.
Figure 14B:
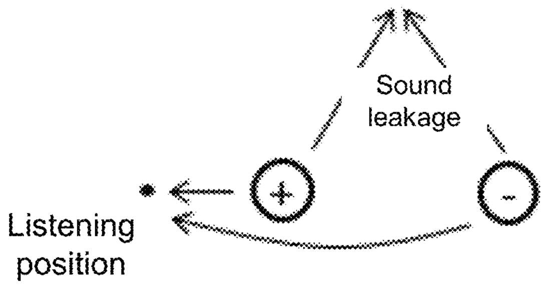
FIG. 14B is a schematic diagram illustrating a dipole sound source according to some embodiments of the present disclosure.
Figure 14C:
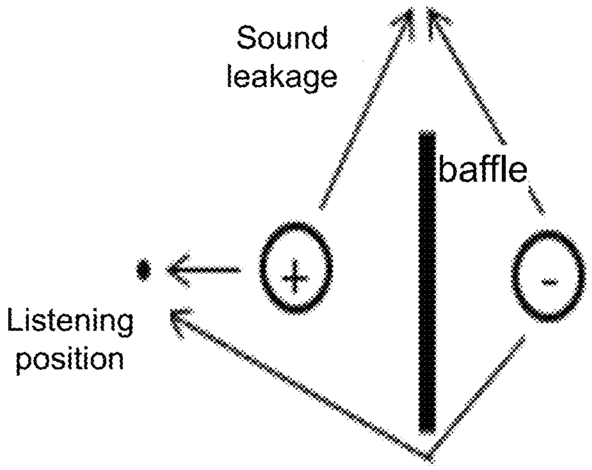
FIG. 14C is a schematic diagram illustrating a baffle structure provided around one sound source of a dipole sound source according to some embodiments of the present disclosure.
Figure 14D:
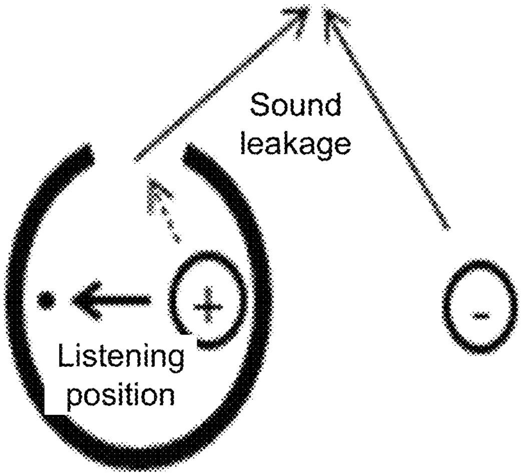
FIG. 14D is a schematic diagram illustrating a cavity structure provided around one sound source of a dipole sound source according to some embodiments of the disclosure.
Figure 15A:
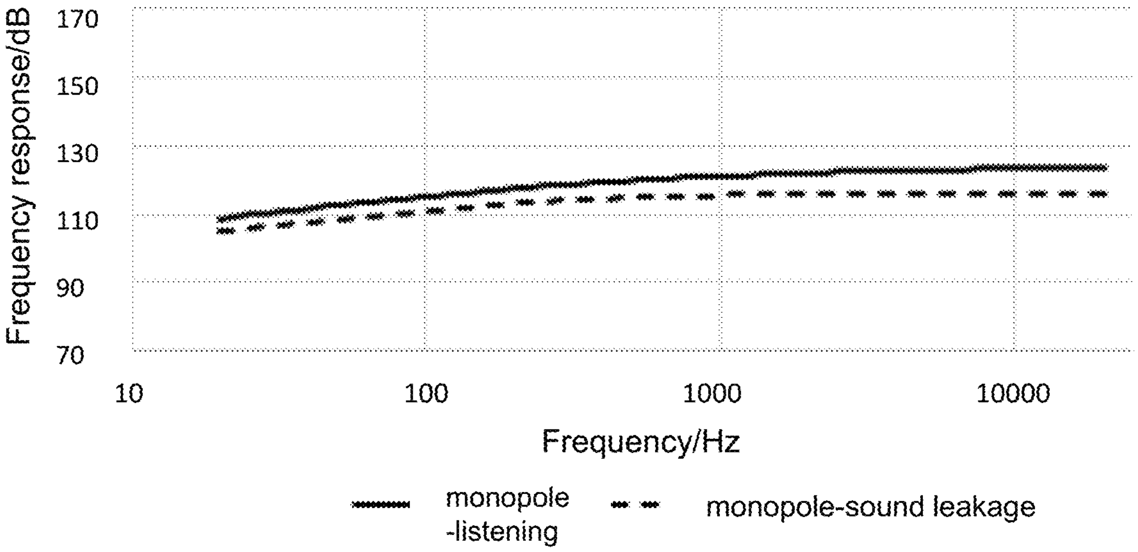
FIG. 15A illustrates frequency responses of a listening sound and a sound leakage of a monopole sound source at a listening position according to some embodiments of the present disclosure.
Figure 15B:
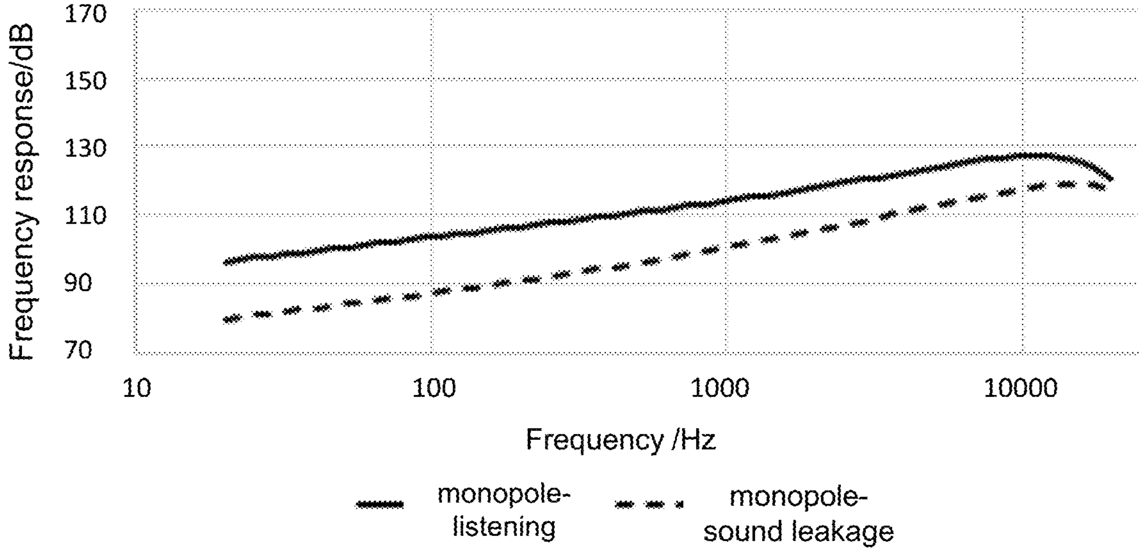
FIG. 15B illustrates frequency responses of a listening sound and a sound leakage of a dipole sound source at a listening position according to some embodiments of the present disclosure.
Figure 15C:
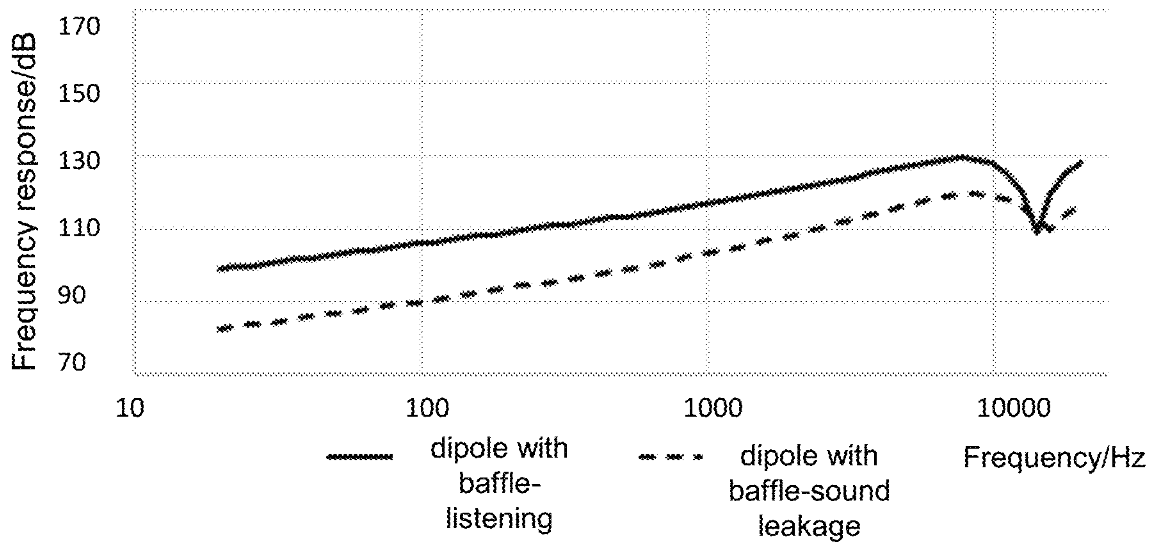
FIG. 15C illustrates frequency responses of a listening sound and a sound leakage at a listening position when a baffle structure is provided around one sound source of a dipole sound source according to some embodiments of the present disclosure.
Figure 15D:
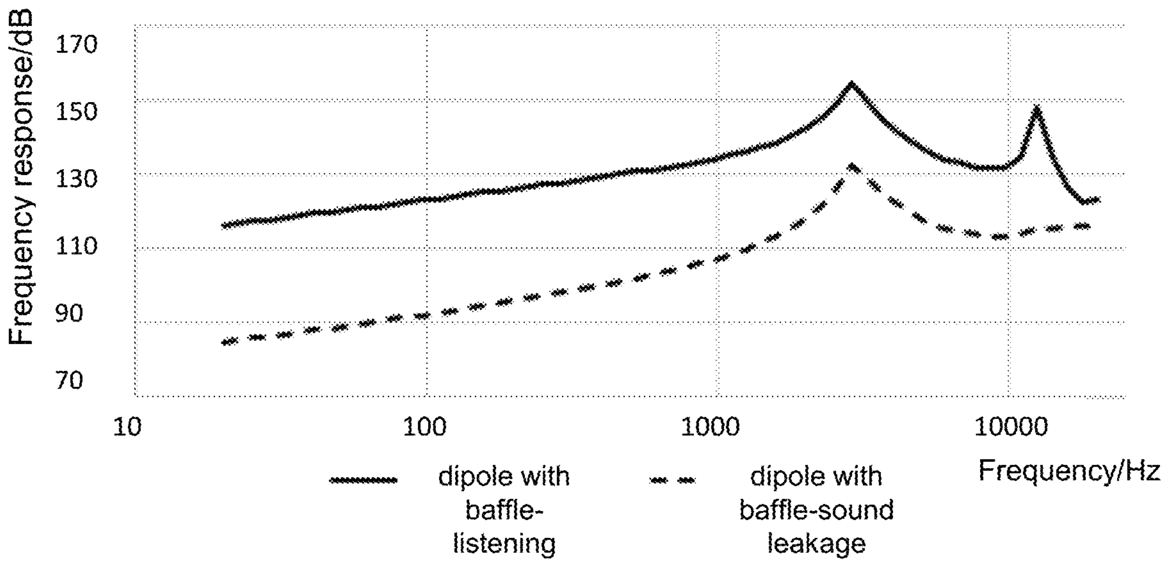
FIG. 15D illustrates frequency responses of a listening sound and a sound leakage at a listening position when a cavity structure is provided around one sound source of a dipole sound source according to some embodiments of the present disclosure.

FIG. 14A is a schematic diagram illustrating a monopole sound source according to some embodiments of the present disclosure. FIG. 14B is a schematic diagram illustrating a dipole sound source according to some embodiments of the present disclosure. FIG. 14C is a schematic diagram illustrating a baffle structure provided around one sound source of a dipole sound source according to some embodiments of the present disclosure. FIG. 14D is a schematic diagram illustrating a cavity structure provided around one sound source of a dipole sound source according to some embodiments of the disclosure. FIG. 15A illustrates frequency responses of a listening sound and a sound leakage of a monopole sound source at a listening position according to some embodiments of the present disclosure. FIG. 15B illustrates frequency responses of a listening sound and a sound leakage of a dipole sound source at a listening position according to some embodiments of the present disclosure. FIG. 15C illustrates frequency responses of a listening sound and a sound leakage at a listening position when a baffle structure is provided around one sound source of a dipole sound source according to some embodiments of the present disclosure. FIG. 15D illustrates frequency responses of a listening sound and a sound leakage at a listening position when a cavity structure is provided around one sound source of a dipole sound source according to some embodiments of the present disclosure.

In general, the greater the difference between the frequency response curve of a listening volume and the frequency response curve of a sound leakage volume, the better. From FIGS. 15A-15D, it may be seen that by adopting a cavity structure, the listening volume may be significantly improved. At the same time, the sound leakage volume of the cavity structure may be equivalent to the other structures. This indicates that the cavity structure minimizes the sound leakage at the same listening volume and maximizes the listening volume at the same leakage volume.

Figure 16:
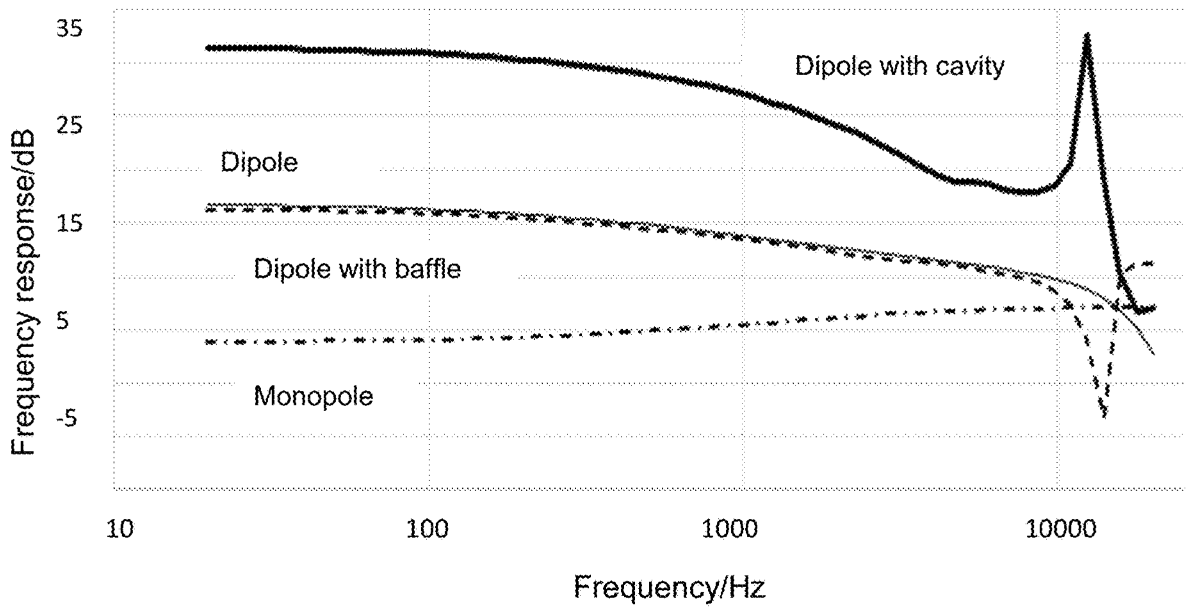
FIG. 16 is a schematic diagram illustrating a listening index of a monopole sound source, a listening index of dipole sound source, a listening index of a dipole sound source when a baffle structure is provided around one sound source of the dipole sound source, and a listening index of a dipole sound source when a cavity structure is provided around one sound source of dipole sound source according to some embodiments of the present disclosure.

In order to show an effect of the solution directly, an inverse $1/\alpha$ of a sound leakage index a may be taken and referred to as a listening index. The listening index may be used to evaluate the effect of each structure. The listening index may be a magnitude of the listening volume when the sound leakage is the same. From an application point of view, the listening index should be as great as possible. FIG. 16 is a schematic diagram illustrating a listening index of a monopole sound source, a listening index of dipole sound source, a listening index of a dipole sound source when a baffle structure is provided around one sound source of the dipole sound source, and a listening index of a dipole sound source when a cavity structure is provided around one sound source of dipole sound source according to some embodiments of the present disclosure. As shown in FIG. 16, in terms of the listening index, as the cavity structure is able to significantly increase the listening volume, the cavity structure may be significantly better than the other structures.

In some embodiments, the listening effect may be related to a leaky structure (e.g., an opening, a slit, a pipe, etc.) on the cavity structure, which is illustrated below in terms of a location of the leaky structure and a size of the opening.

Figure 17:
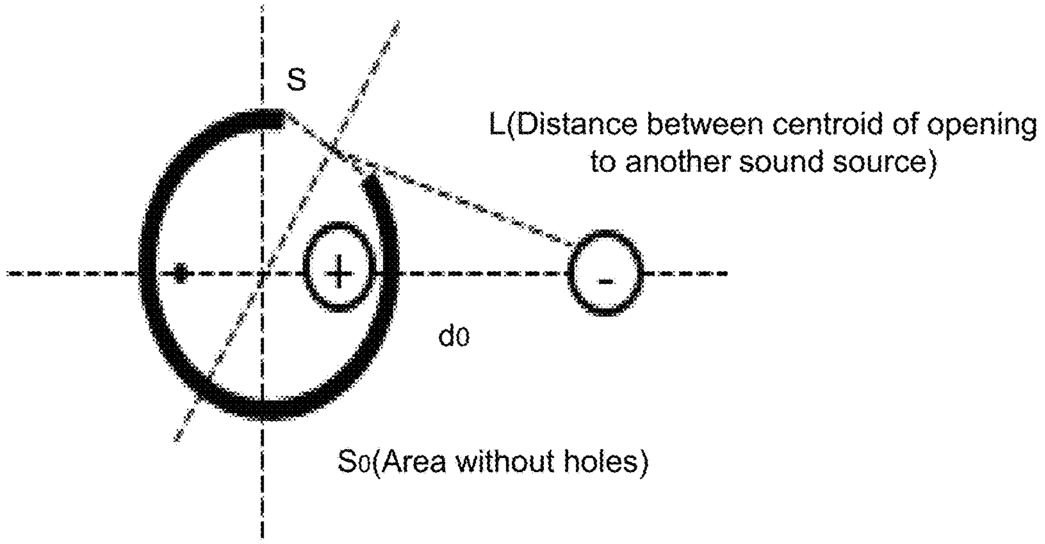
FIG. 17 is a schematic diagram illustrating a cavity structure according to some embodiments of the present disclosure.

FIG. 17 is a schematic diagram illustrating a cavity structure according to some embodiments of the present disclosure. As shown in FIG. 17, assuming that an area of the opening of a leaky structure on the cavity structure is S, and that an area of the cavity structure that is subjected to a direct action of the contained sound source is $S_0$. The term “direct action” here refers to the sound generated by the contained sound source acting acoustically on a wall of the cavity structure without passing through the leaky structure. A distance between the two sound sources may be $d_0$, and a distance between a center of an opening shape of the leaky structure (referred to as the centroid) to the other sound source may be L.

Figure 18:
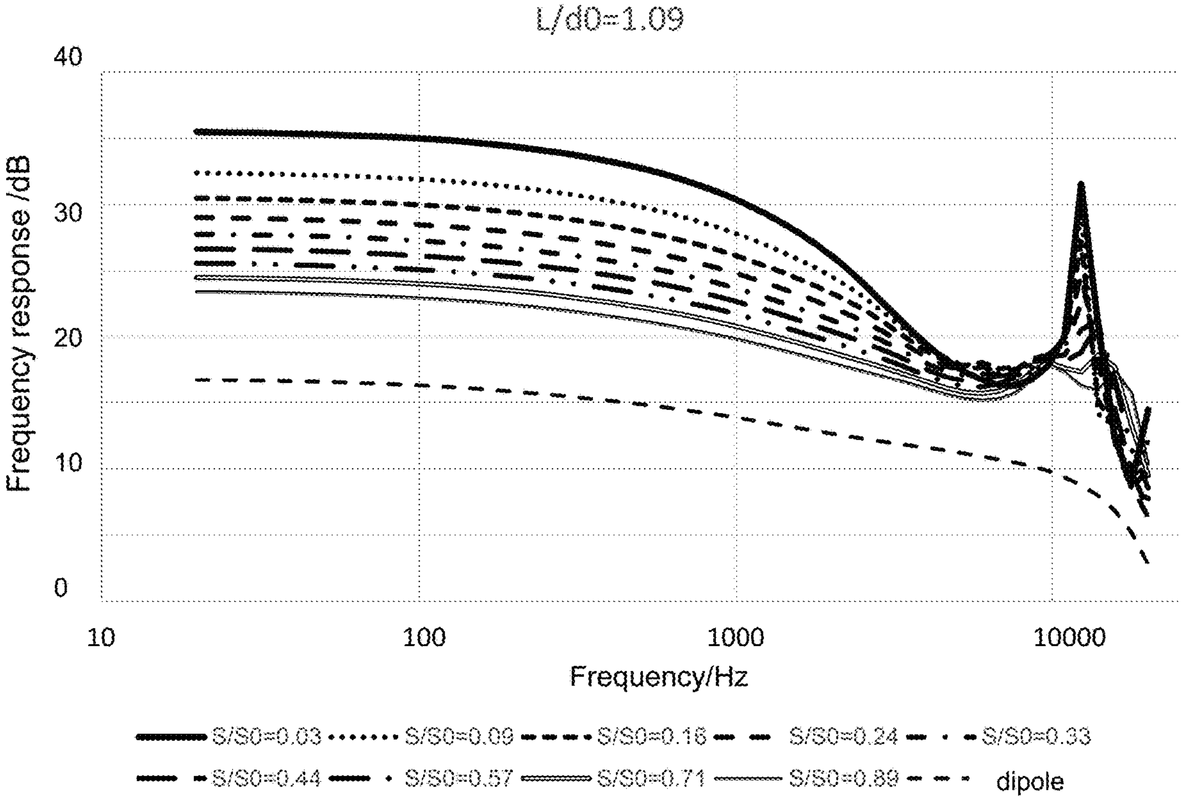
FIG. 18 is a curve diagram illustrating listening indexes of cavity structures with different sizes of leaky structures according to some embodiments of the present disclosure.

FIG. 18 is a curve diagram illustrating listening indexes of cavity structures with different sizes of leaky structures according to some embodiments of the present disclosure. As shown in FIG. 18, keeping a relative distance from the opening to a centroid constant (e.g., $L/d_0=1.09$), the greater the relative opening size $S/S_0$, the smaller the listening index. This is due to a fact that the greater the relative opening is, the more sound components are directly radiated outward from the contained sound source, and the less sound reaches the listening position, resulting in a decrease in the listening volume as the relative opening increases, which in turn results in a decrease in the listening indexes.

Figure 19:
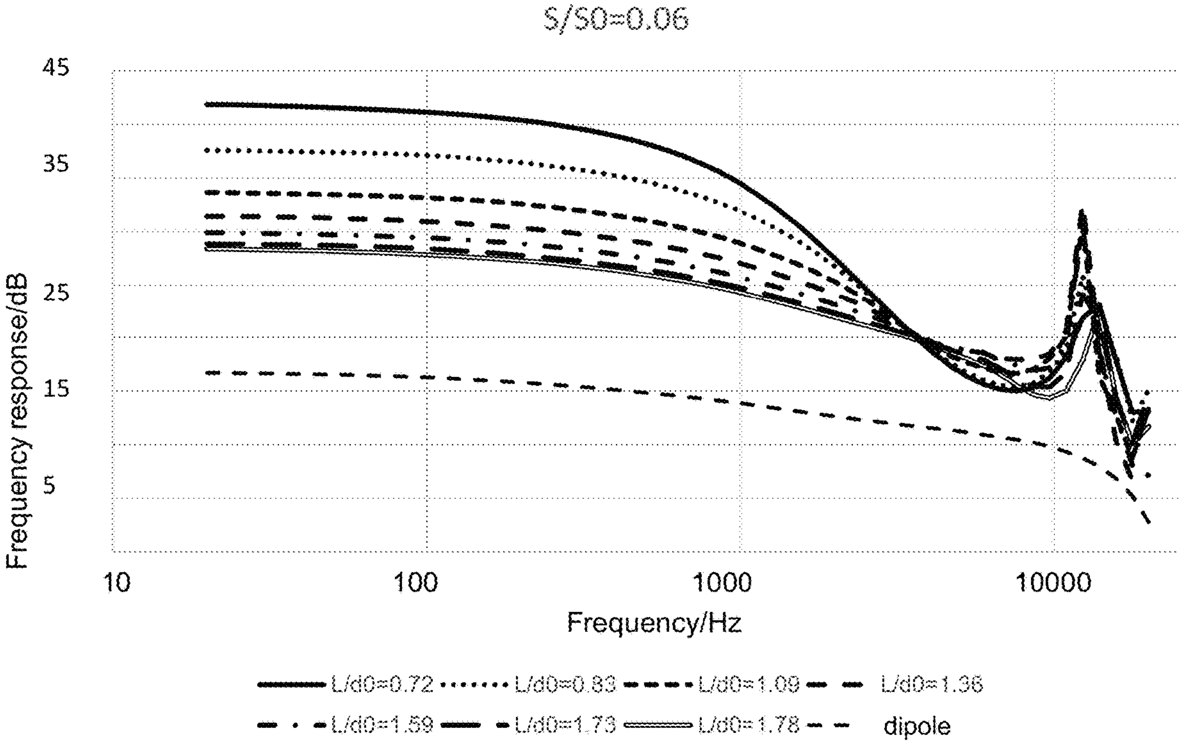
FIG. 19 is a curve diagram illustrating listening indexes of the cavity structures with leaky structures at different positions according to some embodiments of the present disclosure.

FIG. 19 is a curve diagram illustrating listening indexes of the cavity structures with leaky structures at different positions according to some embodiments of the present disclosure. As shown in FIG. 19, keeping a relative opening size (e.g., $S/S_0=0.06$) constant, the greater a relative distance $L/d_0$ from an opening to a centroid, the smaller the listening index. This is due to the fact that the greater a relative distance, the farther away the secondary sound source A' generated at the openings is from the sound source B, the weaker an effect of inverse cancellation between the secondary sound source A' and the sound source B in an external sound field, and the greater the sound leakage, which leads to the listening index being small.

Figure 20A:
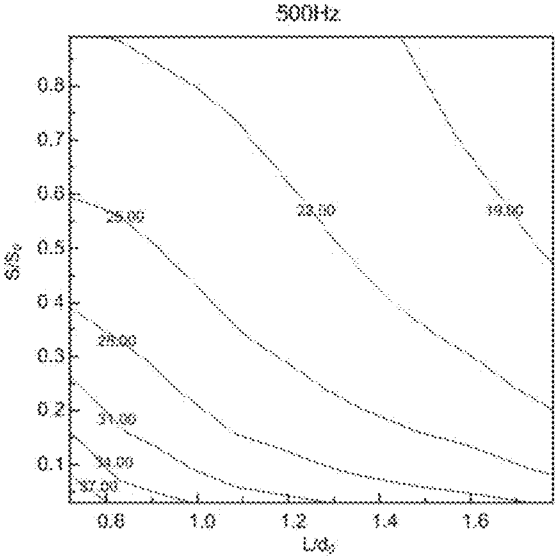
FIG. 20A is a curve diagram illustrating listening indexes of cavity structures with different sizes of leaky structures at different positions under a frequency of 500 Hz according to some embodiments of the present disclosure.
Figure 20B:
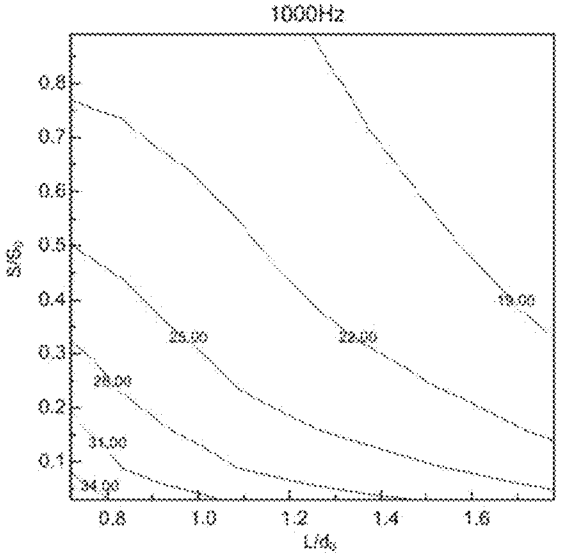
FIG. 20B is a curve diagram illustrating listening indexes of cavity structures with different sizes of leaky structures at different positions under a frequency of 1000 Hz according to some embodiments of the present disclosure.
Figure 20C:
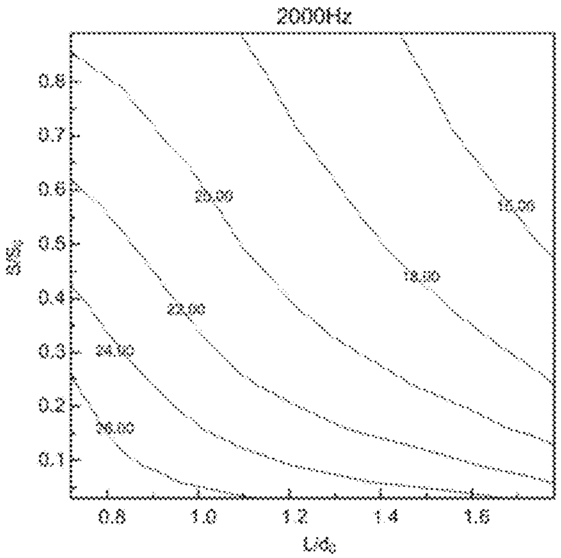
FIG. 20C is a curve diagram illustrating listening indexes of cavity structures with different sizes of leaky structures at different positions under a frequency of 2000 Hz according to some embodiments of the present disclosure.
Figure 20D:
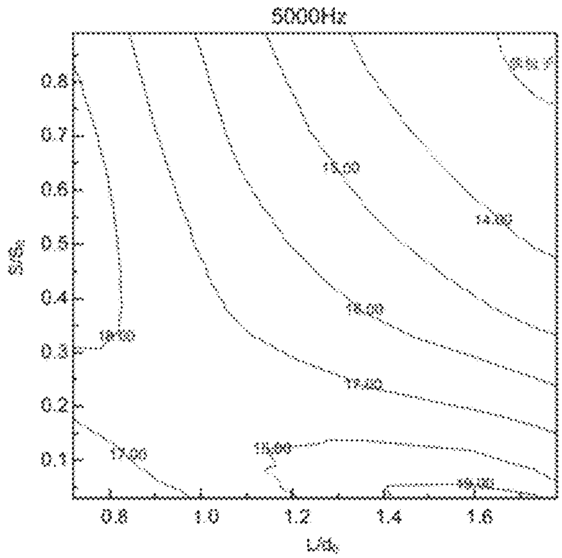
FIG. 20D is a curve diagram illustrating listening indexes of cavity structures with different sizes of leaky structures at different positions under a frequency of 5000 Hz according to some embodiments of the present disclosure.

FIG. 20A is a curve diagram illustrating listening indexes of cavity structures with different sizes of leaky structures at different positions under a frequency of 500 Hz according to some embodiments of the present disclosure. FIG. 20B is a curve diagram illustrating listening indexes of cavity structures with different sizes of leaky structures at different positions under a frequency of 1000 Hz according to some embodiments of the present disclosure. FIG. 20C is a curve diagram illustrating listening indexes of cavity structures with different sizes of leaky structures at different positions under a frequency of 2000 Hz according to some embodiments of the present disclosure. FIG. 20D is a curve diagram illustrating listening indexes of cavity structures with different sizes of leaky structures at different positions under a frequency of 5000 Hz according to some embodiments of the present disclosure. Considering a relative area $S/S_0$ of an opening of the leaky structure and a relative distance $L/d_0$ from a centroid of an opening to an external sound source, in some embodiments, in order to ensure that there are listening indexes higher than a dipole at a main frequency band of the listening sound (e.g., the frequency band no greater than 5000 Hz or 10 kHz), so as to make the relative area of the opening of the leaky structure $S/S_0$ not greater than 0.8 while the relative distance from the centroid of the opening to the external sound source $L/d_0$ not greater than 1.7.

It should be understood that the above leaky structure of the opening is only an example, and the leaky structure of the cavity structure may include one or more openings, which is also able to achieve a superior listening index, and in particular to improve the listening index at the high frequencies. Taking the example of disposing two opening structures, situations of an equal opening and an equal opening ratio are analyzed as follows. Taking a structure with only one hole as a comparison, here the "equal opening" refers to disposing two holes (or may be referred to as openings) with the same size as the structure with only one hole. The "equal opening ratio" refers to that a sum of the opening areas $S/S_0$ of the two holes is the same as the area of the structure with only one hole. The equal opening may be equivalent to doubling a relative opening size $S/S_0$ of the structure with only one hole, which, as previously described, the equal opening may result in a decrease in the overall listening index. In the situation of the equal opening, even though $S/S_0$ is the same as the structure of only one hole, a distance from the two holes to the external source may be different, and thus results in a different listening index.

Figure 21A:
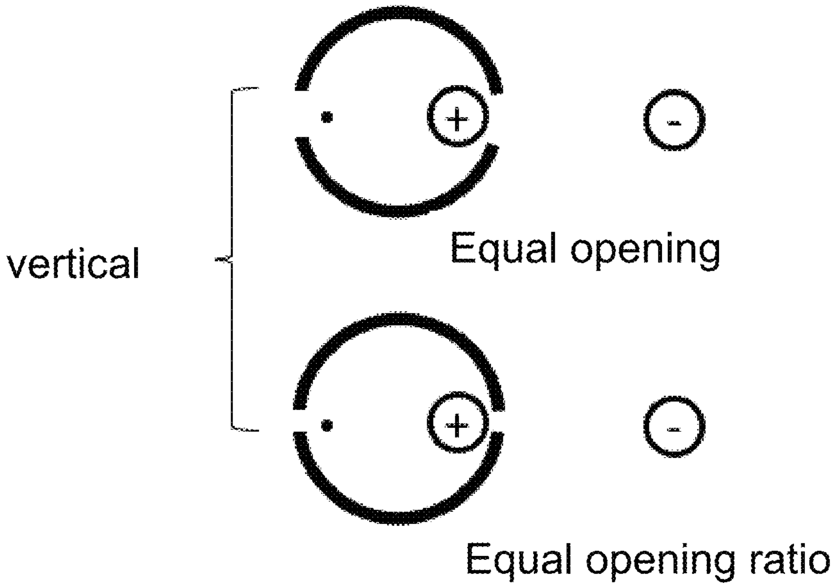
FIG. 21A is a schematic diagram illustrating a cavity structure with two horizontal openings according to some embodiments of the present disclosure.
Figure 21B:
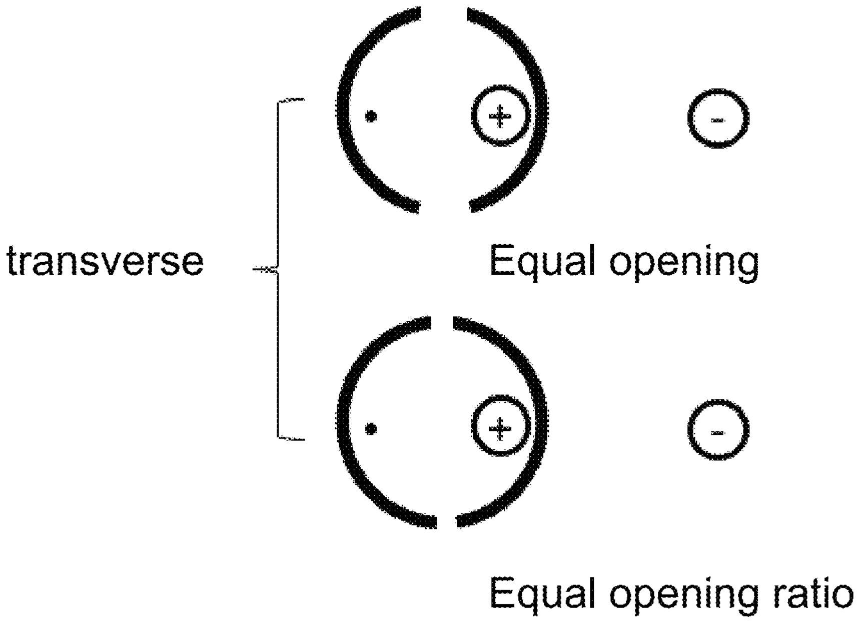
FIG. 21B is a schematic diagram illustrating a cavity structure with two vertical openings according to some embodiments of the present disclosure.

In some embodiments, when a line connecting two holes forms different angles with a line connecting the two sound sources, a difference in a location of the secondary sound sources formed at the holes may occur, which in turn affects and effect of a sound leakage reduction. FIG. 21A is a schematic diagram illustrating a cavity structure with two horizontal openings according to some embodiments of the present disclosure. FIG. 21B is a schematic diagram illustrating a cavity structure with two vertical openings according to some embodiments of the present disclosure. As shown in FIG. 21A, when a line connecting the two openings is parallel to a line connecting two sound sources (i.e., they are two horizontal openings), distances between each of the two openings to an external sound source may be taken as the maximum and the minimum value, respectively. As shown in FIG. 21B, when the two openings (i.e., two vertical openings) are perpendicular to each other, the distance from each of the two openings to the external sound source may be equal, and a middle value may be taken.

Figure 22:
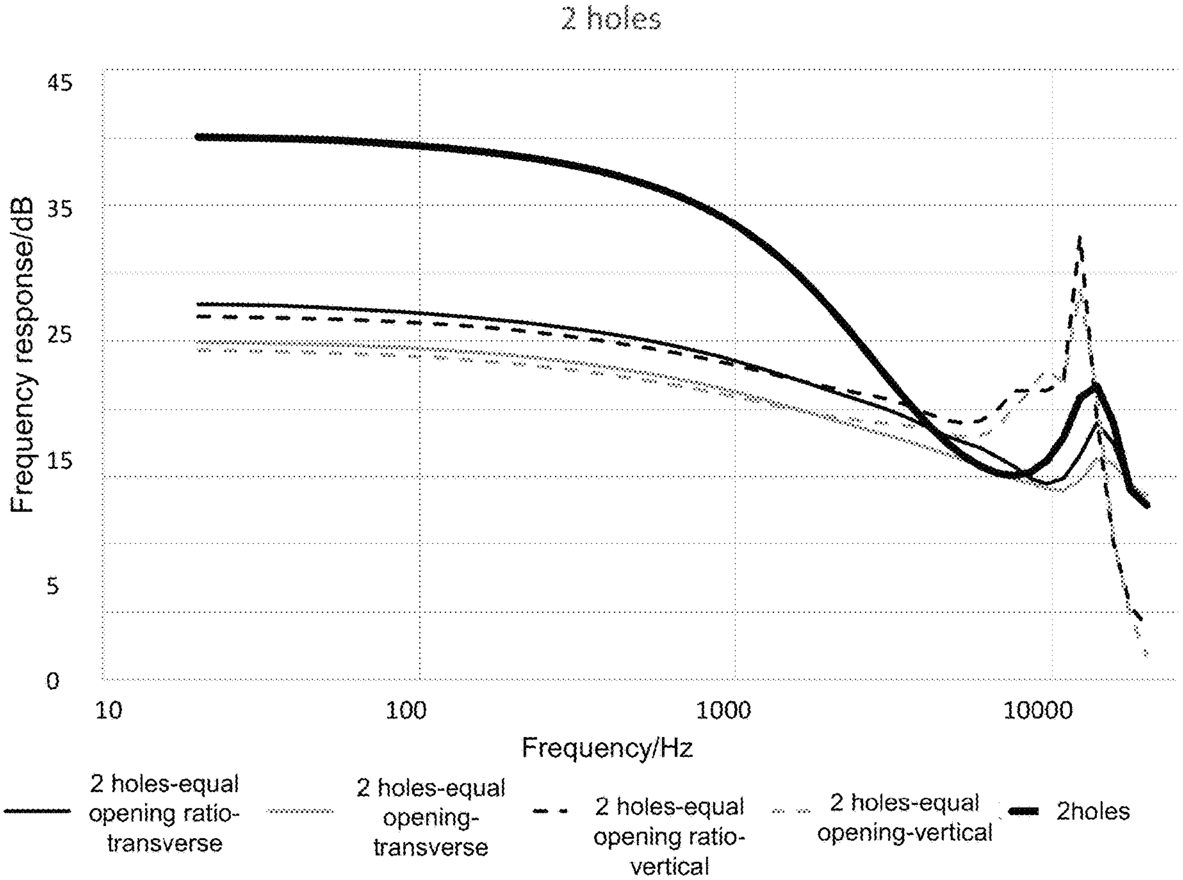
FIG. 22 is a comparison curve diagram illustrating listening indexes of cavity structures with two openings and one opening according to some embodiments of the present disclosure.

FIG. 22 is a comparison curve diagram illustrating listening indexes of cavity structures with two openings and one opening according to some embodiments of the present disclosure. As shown in FIG. 22, an overall listening index of the cavity structure with equal opening may be smaller compared to the overall listening index of the cavity structure with one opening. For a cavity structure with equal opening, each of the two openings may have different distances from the external sound source, which also results in a different listening index. As may be seen in conjunction with FIG. 21A, FIG. 21B, and FIG. 22, a leaky structure of an equal opening ratio may have a higher listening index than the leaky structure with an equal opening regardless of whether the opening is horizontal or vertical. This is because compared with the leaky structure with the equal opening structure, a relative opening size $S/S_0$ of the leaky structure with equal opening is twice as great as a relative opening size $S/S_0$ of the leaky structure with equal opening ratio, and thus the listening index is great. It may also be seen in conjunction with FIGS. 21A, 21B, and 22 that the listening index of the horizontal opening is greater for both the leaky structure with the equal opening and the leaky structure with the equal opening ratio. This is because a distance from one of the openings in the leaky structure with horizontal openings to the external sound source is less than the distance between the two sound sources. A secondary sound source created thereof, together with the external sound source, may have short distances from the two original sound sources, resulting in a high listening index, thereby improving the sound leakage reduction effect. Thus, in order to improve the sound leakage reduction effect, the distance between the at least one opening to the external sound source may be smaller than the distance between the two sound sources.

Figure 23A:
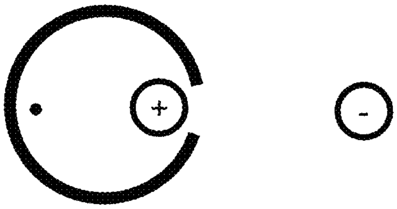
FIG. 23A is a schematic diagram illustrating a cavity structure with one opening according to some embodiments of the present disclosure.
Figure 23B:
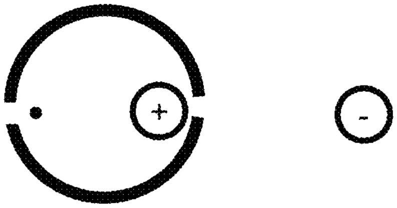
FIG. 23B is a schematic diagram illustrating a cavity structure with two openings according to some embodiments of the present disclosure.
Figure 23C:
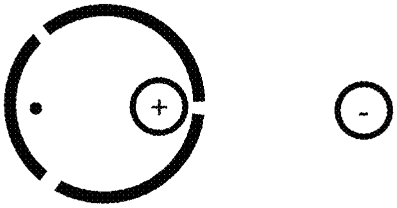
FIG. 23C is a schematic diagram illustrating a cavity structure with three openings according to some embodiments of the present disclosure.
Figure 23D:
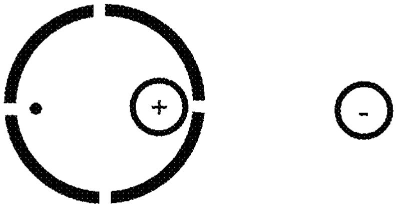
FIG. 23D is a schematic diagram illustrating a cavity structure with four openings according to some embodiments of the present disclosure.

FIG. 23A is a schematic diagram illustrating a cavity structure with one opening according to some embodiments of the present disclosure. FIG. 23B is a schematic diagram illustrating a cavity structure with two openings according to some embodiments of the present disclosure. FIG. 23C is a schematic diagram illustrating a cavity structure with three openings according to some embodiments of the present disclosure. FIG. 23D is a schematic diagram illustrating a cavity structure with four openings according to some embodiments of the present disclosure.

Figure 24:
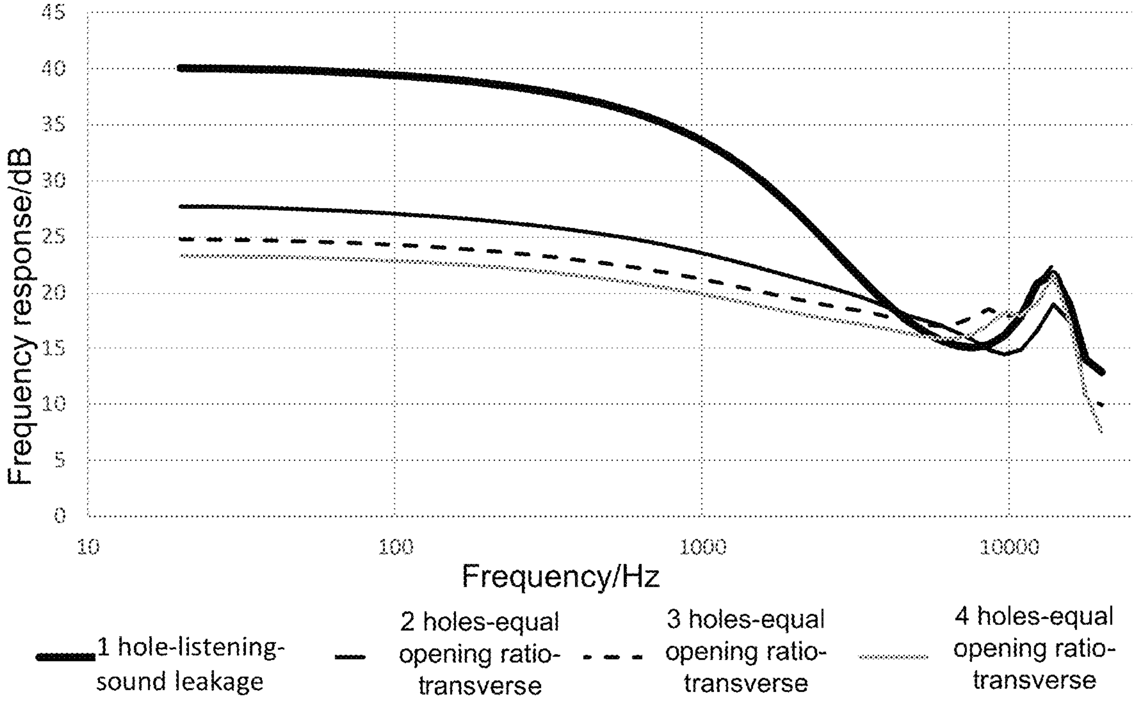
FIG. 24 is a comparison curve diagram illustrating listening indexes of cavity structures with different counts of openings according to some embodiments of the present disclosure.

FIG. 24 is a comparison curve diagram illustrating listening indexes of cavity structures with different counts of openings according to some embodiments of the present disclosure. As shown in FIG. 24, the cavity structure with a plurality of openings may well increase a resonant frequency of an airborne sound within the cavity structure relative to a cavity structure with a single opening, such that the entire device, relative to the cavity structure with a single opening, has a high listening index in a high frequency band (e.g., the sound with a frequency close to 10,000 Hz). The higher frequency bands may be the frequency bands to which the human ear is more sensitive, and therefore there is a greater demand for the sound leakage reduction. Therefore, in order to improve the sound leakage reduction effect in the high frequency band, the cavity structure with more than one opening may be selected.

Figure 25A:
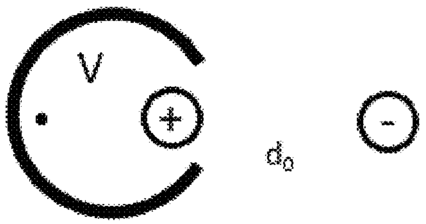
FIG. 25A is a schematic diagram illustrating a cavity structure with one opening according to some embodiments of the present disclosure.

In some embodiments, the listening effect may be related to a cavity volume of the cavity structure, and the effect of the cavity volume on the listening effect is described below. FIG. 25A is a schematic diagram illustrating a cavity structure with one opening according to some embodiments of the present disclosure. As shown in FIG. 25A, assuming that a cavity volume of the cavity structure is V, a distance from the opening to the external sound source is $d_0$, then a reference volume may be $V_0=d_0*d_0$, and a relative volume of the cavity structure may be $V/V_0$. It should be understood that as FIG. 25A is studied and simulated in a 2D scale, a concept of the volume may be the square of a length; accordingly, if it is transferred to a 3D scale for the analysis, the volume should be modified to the cube of the length.

Figure 25B:
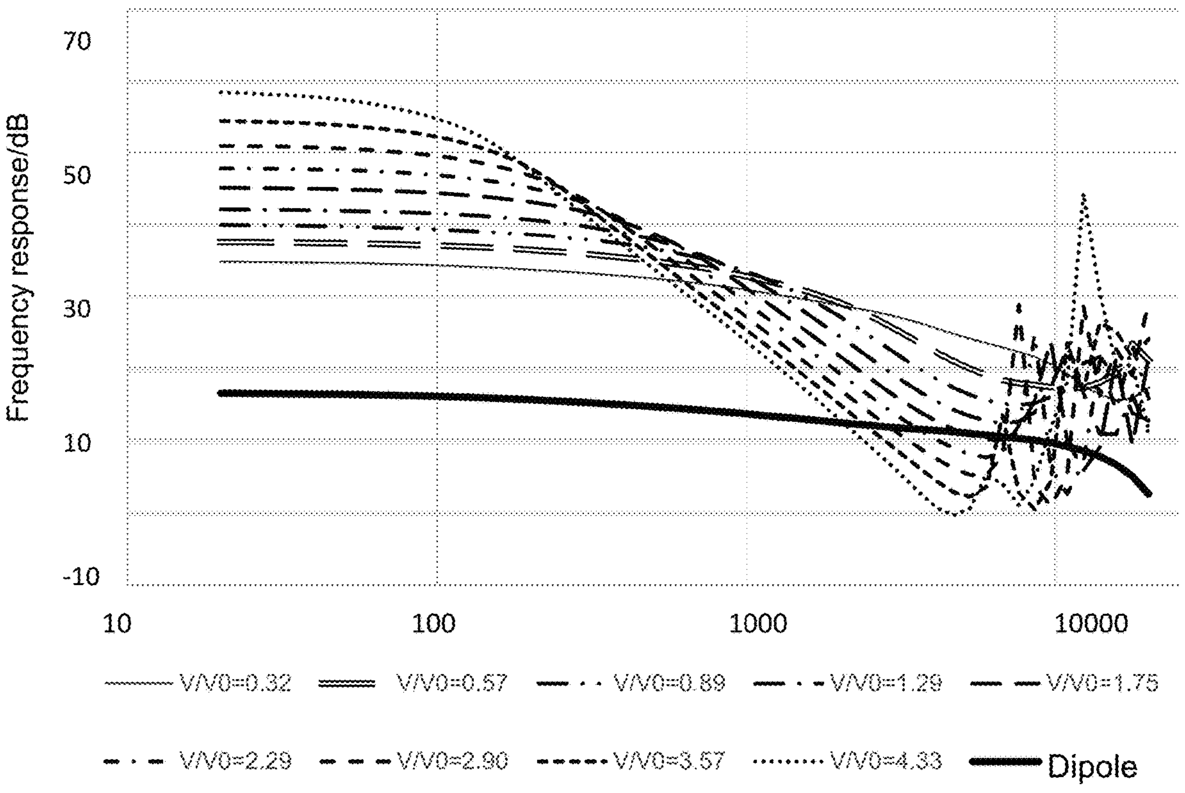
FIG. 25B is a comparison curve diagram illustrating listening indexes of cavity structures with one opening of different relative volumes according to some embodiments of the present disclosure.

FIG. 25B is a comparison curve diagram illustrating listening indexes of cavity structures with one opening at different relative volumes according to some embodiments of the present disclosure. As shown in FIG. 25B, relative to a dual-point source (dipole) without the cavity structure, the greater the relative volume $V/V_0$ of the cavity structure, the greater the listening index in a low frequency band (e.g., the frequency below 500 Hz), and the smaller the listening index in a high frequency band (e.g., the frequency above 500 Hz). In summary, the greater the relative volume $V/V_0$ of the cavity structure, and the smaller an overall listening index. This is due to an influence of an air-acoustic resonance within the cavity structure. On the resonant frequency of the cavity structure, the air-acoustic resonance may be generated within the cavity structure, and a sound much greater than the sound of the external sound source may be radiated outward, resulting in a great increase in the leakage sound, thereby making the listening index significantly smaller near the resonance frequency. As shown in FIG. 25B, the significant reduction of the listening index around the resonance frequency may be indicated by a deep valley on the frequency response curve. With a constant opening size, the greater the relative volume of the cavity structure, the lower the resonance frequency, and the deeper the valley formed. In conjunction with FIG. 25B, in order to reduce the effect of the valley of the listening index, so as to make the listening indexes in most of the frequency bands higher than the listening indexes of a dipole sound source without the cavity structure, the relative volume $V/V_0$ of the cavity structure may be disposed, so that the resonant frequency of the cavity structure may be shifted as much as possible towards the high frequencies and certain conditions may be satisfied. For example, the resonant frequency may be not less than 7000 Hz. In this situation, the relative volume $V/V_0$ of the cavity structure may be no greater than 1.75. For example, the relative volume $V/V_0$ of the cavity structure may be no greater than 1.7.

Figure 26A:
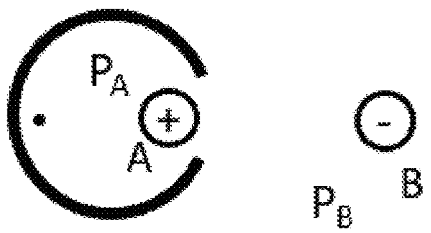
FIG. 26A is a schematic diagram illustrating a cavity structure with an opening according to some embodiments of the present disclosure.

In some embodiments, the listening effect and the sound leakage effect may be related to a sound volume of the sound source. FIG. 26A is a schematic diagram illustrating a cavity structure with an opening according to some embodiments of the present disclosure. As shown in FIG. 26A, sound pressure RMS values PA and PB generated by the two sound sources may be tested at the same distance from the sound sources A and B, respectively, so as to indicate the sound volume of the two sound sources. A sound pressure ratio of the two sound sources may be set to Nsource=PB/PA. It should be understood that the mode of calibrating the sound volume of the sound sources using the RMS values of PA and PB is only an example, and other methods of calibrating the sound volume of the sound sources may be adopted as well.

Figure 26B:
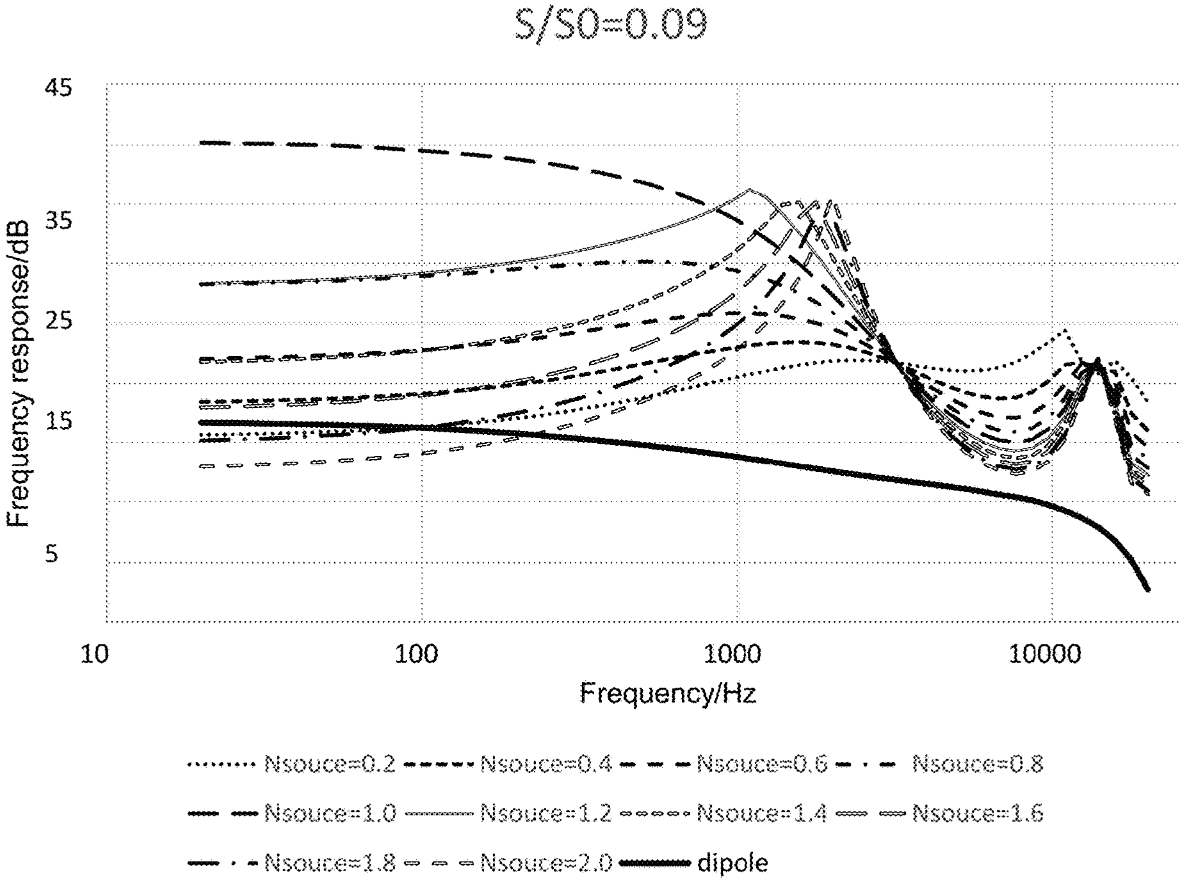
FIG. 26B is a comparison curve diagram illustrating listening indexes of cavity structures with different sound pressure ratios (Nsource) according to some embodiments of the present disclosure.

FIG. 26B is a comparison curve diagram illustrating listening indexes of cavity structures with different sound pressure ratios (Nsource) according to some embodiments of the present disclosure. As shown in FIG. 26B, keeping a relative opening size (e.g., $S/S_0=0.9$) constant, when the Nsource value is small, a suppression of sound inside the cavity structure may be insufficient, making the listening volume inside the cavity structure, especially the listening volume at high frequencies (e.g., above 5000 Hz) increase, resulting in an increase in the high-frequency listening index. In the low-frequency band (e.g., below 1000 Hz), as the sound volume of the sound source B is small, it may be difficult to form an ideal dipole sound field distribution, and an inverse phase cancellation effect of the sound leakage of source A may be weakened, which leads to a great sound leakage and a decrease in a low-frequency listening index.

When the Nsource is close to 1, more sound from the sound source B may enter the cavity structure, thereby attenuating the listening volume, especially the listening volume at the high frequency (e.g., 5000 Hz and above), making the high-frequency listening index lower than the sound leakage when the sound leakage is lower than the Nsource. In the low and mid frequency band (e.g., below 1000 Hz), the source A the source B may be an ideal dipole sound field distribution, which results in a decrease in an overall sound leakage, so as to reduce an overall sound leakage, thereby leading to a significant increase in the listening index. As a result, the listening index may be ideal throughout the frequency band.

When the Nsource is greater than 1, as it is difficult for the sound leaking from the sound source A to inversely suppress the sound generated from the sound source B, the sound leakage in the internal space of the cavity structure may be great, which in turn makes the overall listening index small. The listening index may only increase abruptly in the frequency band near the resonant frequency (e.g., around 2000 Hz) of the cavity structure due to an air-acoustic resonance. As a result, a sudden increase in the audible index in that frequency band may occur.

Figure 27A:
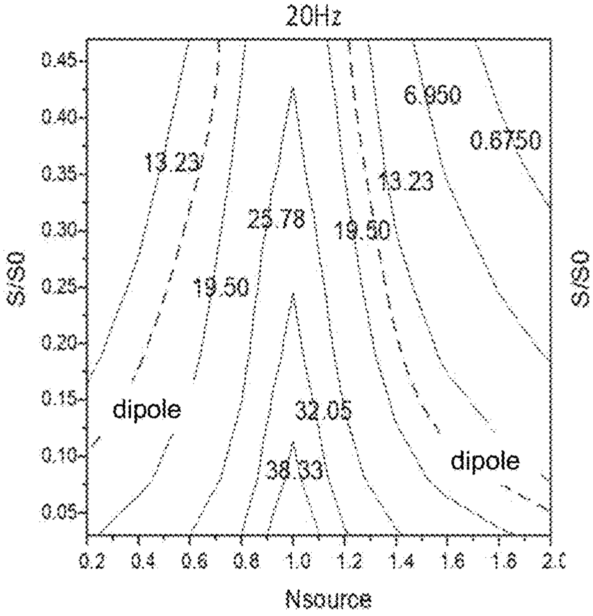
FIG. 27A is a curve diagram illustrating listening indexes when the cavity structure shown in FIG. 26A has leaky structures of different sizes and different sound pressure ratios (Nsource) according to some embodiments shown in the present disclosure.
Figure 27B:
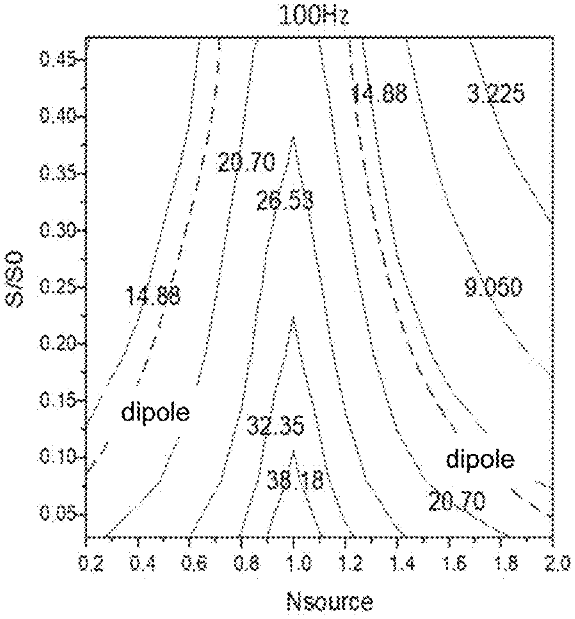
FIG. 27B is a curve diagram illustrating listening indexes when the cavity structure shown in FIG. 26A has leaky structures of different sizes and different sound pressure ratios (Nsource) under a frequency of 100 Hz according to some embodiments of the present disclosure.
Figure 27C:
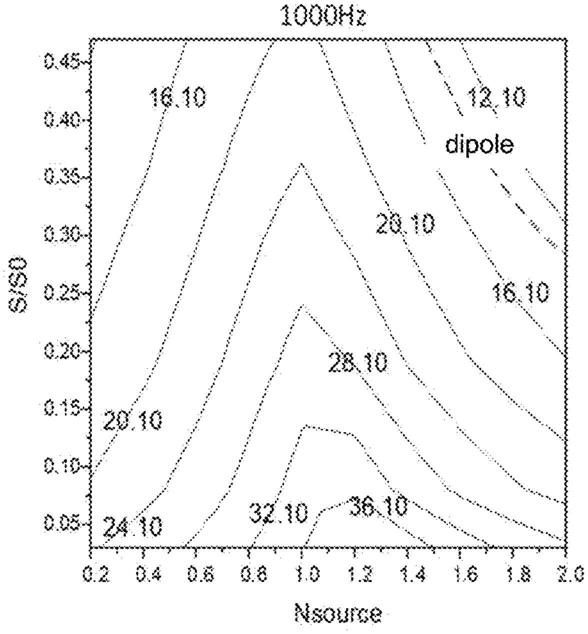
FIG. 27C is a curve diagram illustrating listening indexes when the cavity structure shown in FIG. 26A has leaky structures of different sizes and different sound pressure ratios (Nsource) under a frequency of 1000 Hz according to some embodiments of the present disclosure.
Figure 27D:
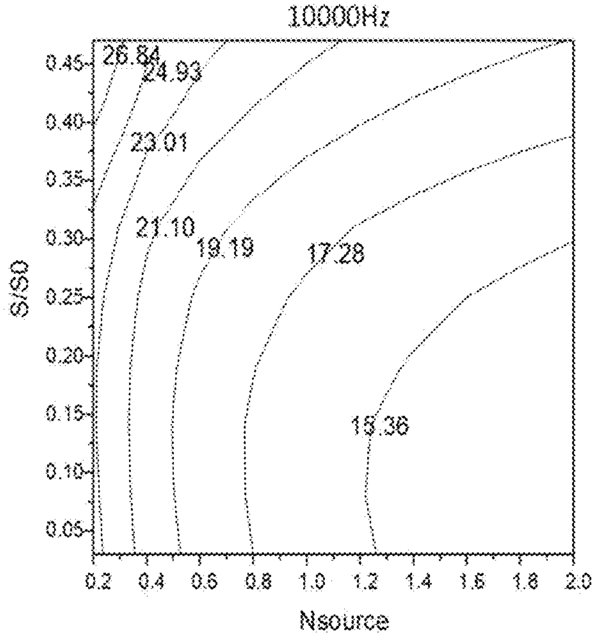
FIG. 27D is a curve diagram illustrating listening indexes when the cavity structure shown in FIG. 26A has leaky structures of different sizes and different sound pressure ratios (Nsource) under a frequency of 10000 Hz according to some embodiments of the present disclosure.

FIG. 27A is a curve diagram illustrating listening indexes when the cavity structure shown in FIG. 26A has leaky structures of different sizes and different sound pressure ratios (Nsource) according to some embodiments shown in the present disclosure; FIG. 27B is a curve diagram illustrating listening indexes when the cavity structure shown in FIG. 26A has leaky structures of different sizes and different sound pressure ratios (Nsource) under a frequency of 100 Hz according to some embodiments of the present disclosure FIG. 27C is a curve diagram illustrating listening indexes when the cavity structure shown in FIG. 26A has leaky structures of different sizes and different sound pressure ratios (Nsource) under a frequency of 1000 Hz according to some embodiments of the present disclosure FIG. 27D is a curve diagram illustrating listening indexes when the cavity structure shown in FIG. 26A has leaky structures of different sizes and different sound pressure ratios (Nsource) under a frequency of 10000 Hz according to some embodiments of the present disclosure.

Figure 28A:
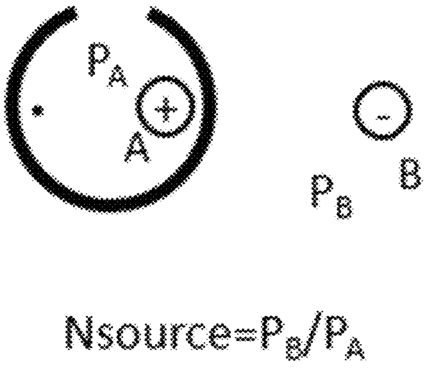
FIG. 28A is a schematic diagram illustrating a cavity structure of a cavity with one opening according to some embodiments of the present disclosure.
Figure 28B:
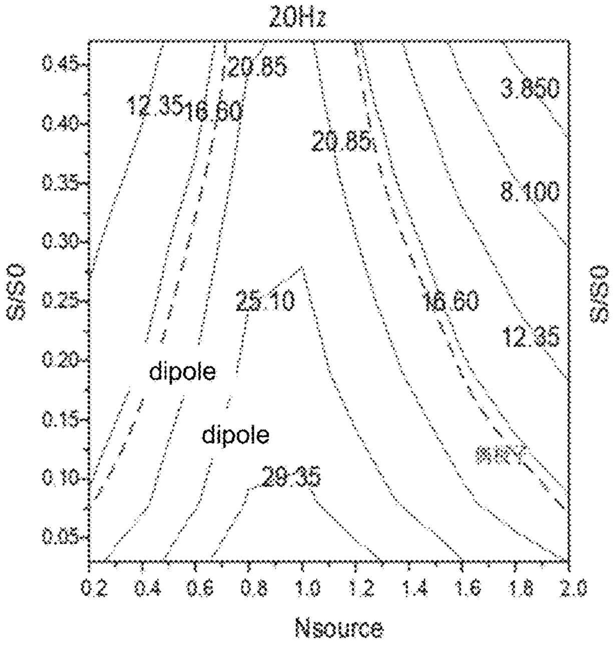
FIG. 28B is a curve diagram illustrating listening indexes when the cavity structure shown in FIG. 28A has leaky structures of different sizes and different sound pressure ratios (Nsource) under a frequency of 20 Hz according to some embodiments of the present disclosure.
Figure 28C:
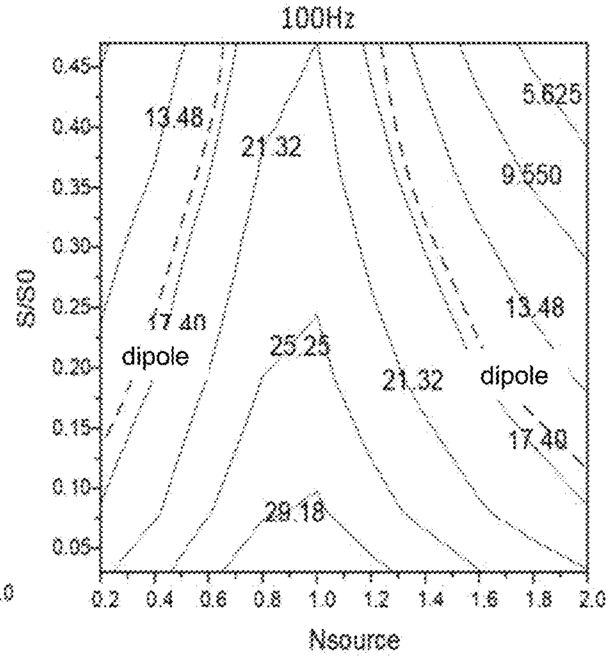
FIG. 28C is a curve diagram illustrating listening indexes when the cavity structure shown in FIG. 28A has leaky structures of different sizes and different sound pressure ratios (Nsource) under a frequency of 100 Hz according to some embodiments of the present disclosure.
Figure 28D:
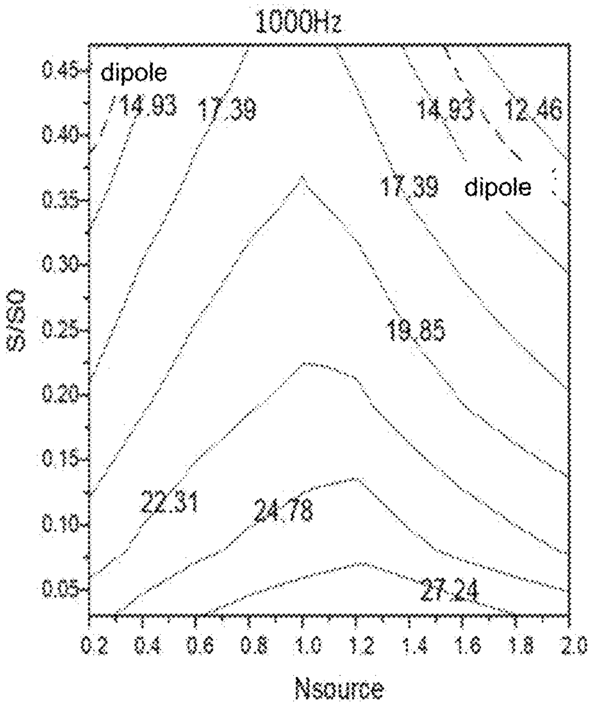
FIG. 28D is a curve diagram illustrating listening indexes when the cavity structure shown in FIG. 28A has leaky structures of different sizes and different sound pressure ratios (Nsource) under a frequency of 1000 Hz according to some embodiments of the present disclosure.
Figure 28E:
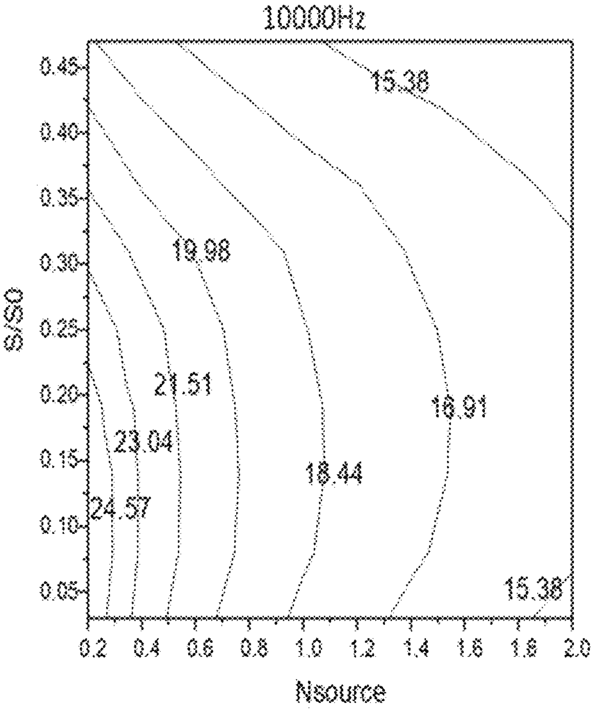
FIG. 28E is a curve diagram illustrating listening indexes when the cavity structure shown in FIG. 28A has leaky structures of different sizes and different sound pressure ratios (Nsource) under a frequency of 10000 Hz according to some embodiments of the present disclosure.

FIG. 28A is a schematic diagram illustrating a cavity structure of a cavity with one opening according to some embodiments of the present disclosure. FIG. 28B is a curve diagram illustrating listening indexes when the cavity structure shown in FIG. 28A has leaky structures of different sizes and different sound pressure ratios (Nsource) under a frequency of 20 Hz according to some embodiments of the present disclosure. FIG. 28C is a curve diagram illustrating listening indexes when the cavity structure shown in FIG. 28A has leaky structures of different sizes and different sound pressure ratios (Nsource) under a frequency of 100 Hz according to some embodiments of the present disclosure. FIG. 28D is a curve diagram illustrating listening indexes when the cavity structure shown in FIG. 28A has leaky structures of different sizes and different sound pressure ratios (Nsource) under a frequency of 1000 Hz according to some embodiments of the present disclosure. FIG. 28E is a curve diagram illustrating listening indexes when the cavity structure shown in FIG. 28A has leaky structures of different sizes and different sound pressure ratios (Nsource) under a frequency of 10000 Hz according to some embodiments of the present disclosure.

Figure 29A:
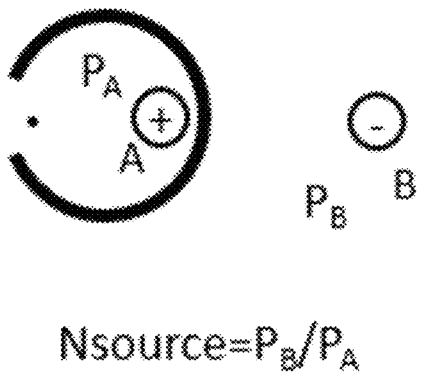
FIG. 29A is a schematic diagram illustrating a cavity structure with one opening according to some embodiments of the present disclosure.
Figure 29B:
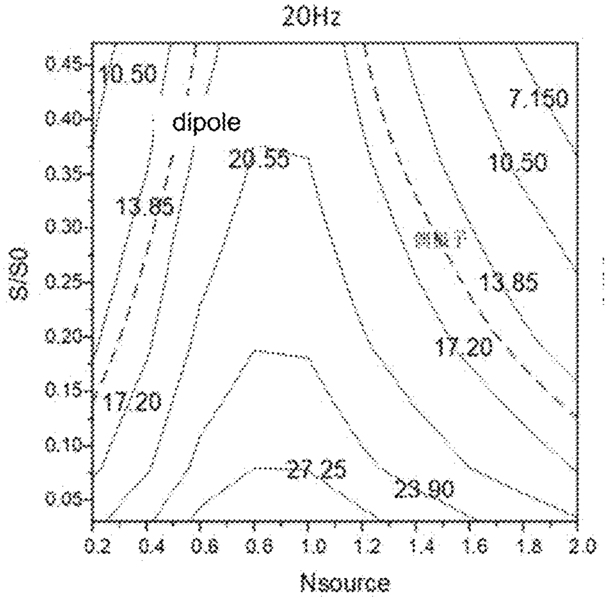
FIG. 29B is a curve diagram illustrating listening indexes when the cavity structure shown in FIG. 29A has leaky structures of different sizes and different sound pressure ratios (Nsource) under a frequency of 200 Hz according to some embodiments of the present disclosure.
Figure 29C:
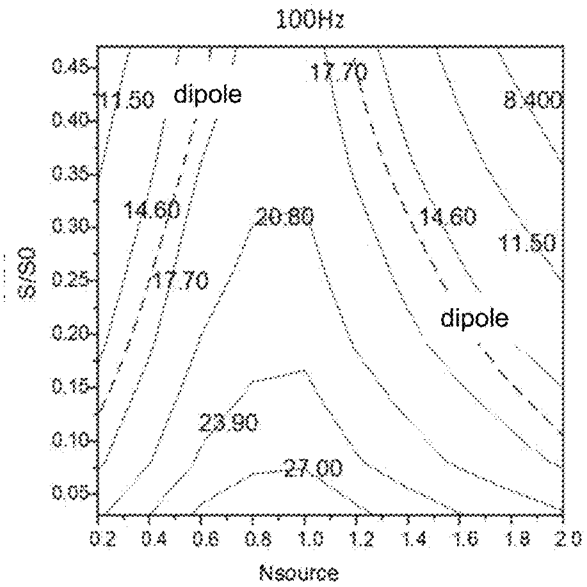
FIG. 29C is a curve diagram illustrating listening indexes when the cavity structure shown in FIG. 29A has leaky structures of different sizes and different sound pressure ratios (Nsource) under a frequency of 100 Hz according to some embodiments of the present disclosure.
Figure 29D:
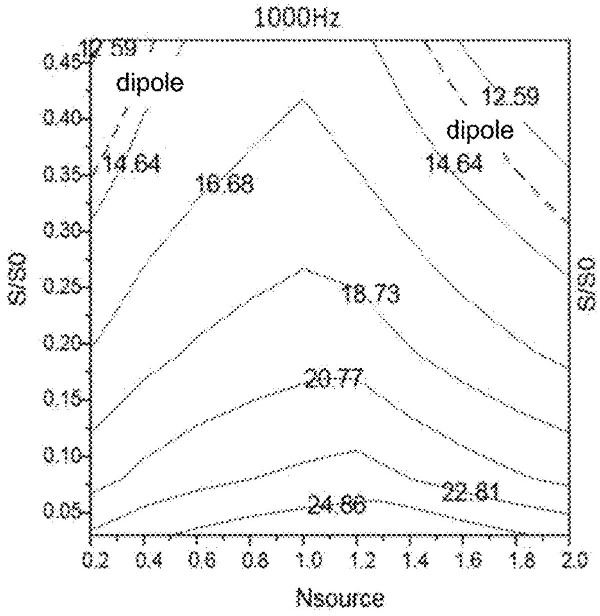
FIG. 29D is a curve diagram illustrating listening indexes when the cavity structure shown in FIG. 29A has leaky structures of different sizes and different sound pressure ratios (Nsource) under a frequency of 1000 Hz according to some embodiments of the present disclosure.
Figure 29E:
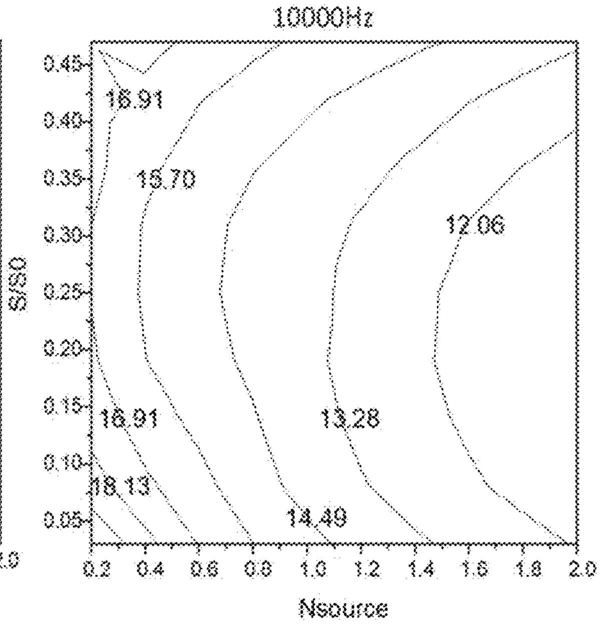
FIG. 29E is a curve diagram illustrating listening indexes when the cavity structure shown in FIG. 29A has leaky structures of different sizes and different sound pressure ratios (Nsource) under a frequency of 10000 Hz according to some embodiments of the present disclosure.

FIG. 29A is a schematic diagram illustrating a cavity structure with one opening according to some embodiments of the present disclosure. FIG. 29B is a curve diagram illustrating listening indexes when the cavity structure shown in FIG. 29A has leaky structures of different sizes and different sound pressure ratios (Nsource) under a frequency of 200 Hz according to some embodiments of the present disclosure. FIG. 29C is a curve diagram illustrating listening indexes when the cavity structure shown in FIG. 29A has leaky structures of different sizes and different sound pressure ratios (Nsource) under a frequency of 100 Hz according to some embodiments of the present disclosure. FIG. 29D is a curve diagram illustrating listening indexes when the cavity structure shown in FIG. 29A has leaky structures of different sizes and different sound pressure ratios (Nsource) under a frequency of 1000 Hz according to some embodiments of the present disclosure. FIG. 29E is a curve diagram illustrating listening indexes when the cavity structure shown in FIG. 29A has leaky structures of different sizes and different sound pressure ratios (Nsource) under a frequency of 10000 Hz according to some embodiments of the present disclosure.

Cavity structures with one opening shown in FIGS. 26A, 28A, and 29A may be distinguished by having different relative distances $L/d_0$ between a centroid of the opening to an external sound source. The centroid of the cavity structure, the centroid of the opening of the leaky structure, and the sound source located outside the cavity structure in FIG. 26A may be on a straight line and there may be no obstruction between the two sound sources. A line connecting the centroid of the cavity structure and the centroid of the opening of the leaky structure in FIG. 28A may be perpendicular to the line connecting the two sound sources. In FIG. 29A, the centroid of the opening of the leaky structure, and the sound source located outside the cavity structure may be on a straight line, and the two sound sources may be shielded by the cavity structure. According to FIGS. 27A-27D, FIGS. 28B-28E, and FIGS. 29B-29E, in order to ensure that the dual-point source with a cavity structure has a greater listening index than the dual-point source without a cavity structure in an audible frequency range of the human ear when it has different relative distances $L/d_0$ from the opening centroid to the external sound source, the sound pressure ratio Nsource of the two sound sources may be in a range of 0.2-2.0 when a relative area of the opening $S/S_0$ is not greater than 0.075. The sound pressure ratio Nsource of the two sound sources may be in a range of 0.6-1.4 when the relative area of the opening $S/S_0$ is not greater than 0.25. The sound pressure ratio Nsource of the two sound sources may be in a range of 0.7-1.3 when the relative area of the opening $S/S_0$ is not greater than 0.45.

In some embodiments, sound volumes of the two sound sources may be adjusted by directly regulating output powers of the two sound sources. In some embodiments, a difference in sound volumes of the two sound sources may also be achieved by realizing the sound of the sound source through a specific acoustic structure. Exemplary acoustic structures may include slits, conduits, cavities, gauze, porous media, etc., or any combination thereof. For example, a conduit may be provided between one of the sound sources and a listening position to form a sound conduction channel to increase the sound volume of the sound source at a particular frequency. Furthermore, for example, a porous medium may be provided between one of the sound sources and the listening position to reduce the sound volume of that sound source.

Figure 30:
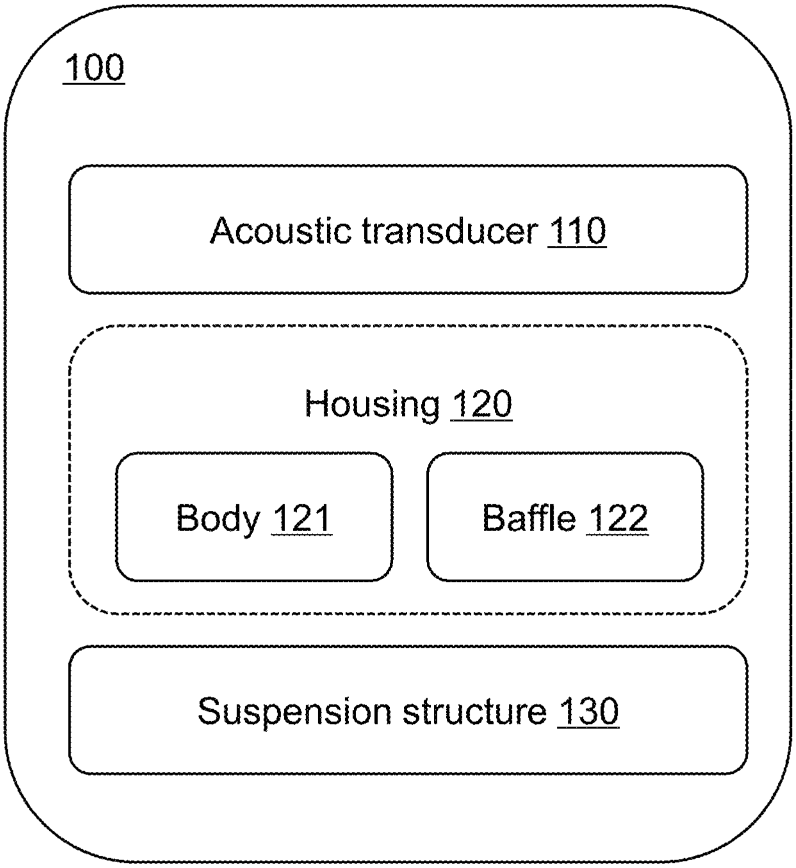
FIG. 30 is a block diagram illustrating an exemplary open earphone according to some embodiments of the present disclosure.

FIG. 30 is a block diagram illustrating an exemplary open earphone according to some embodiments of the present disclosure. As shown in FIG. 30, the open earphone 100 may include the acoustic driver 110, the housing 120, and the suspension structure 130. The acoustic driver 110 may be configured to generate two sounds with opposite phases. The housing 120 may be configured to accommodate the acoustic driver 110. The suspension structure 130 may be configured to fix the housing in a position near an ear of a user without blocking an ear canal of the user. In some embodiments, the housing 120 may include a body 121 and a baffle 122. The body 121 may define a first cavity accommodating the acoustic driver 110, and the baffle 122 may be connected to the body 121 and extended in a direction of the ear canal of the user and define a second cavity with an auricle of the user (e.g., analogous to the cavity structure shown in FIG. 12, FIG. 13, FIG. 14D, FIG. 17, FIGS. 21A-21B, FIGS. 23A-23D, FIG. 25A, FIG. 26A, FIG. 28A, or FIG. 29A). Descriptions of the acoustic driver 110, the housing 120, and the suspension structure 130 may be found in the relevant descriptions of FIG. 1 or FIG. 31 of the present disclosure.

Various embodiments of the open earphone will be illustrated exemplarily below combined with FIGS. 31-44.

Figure 31:
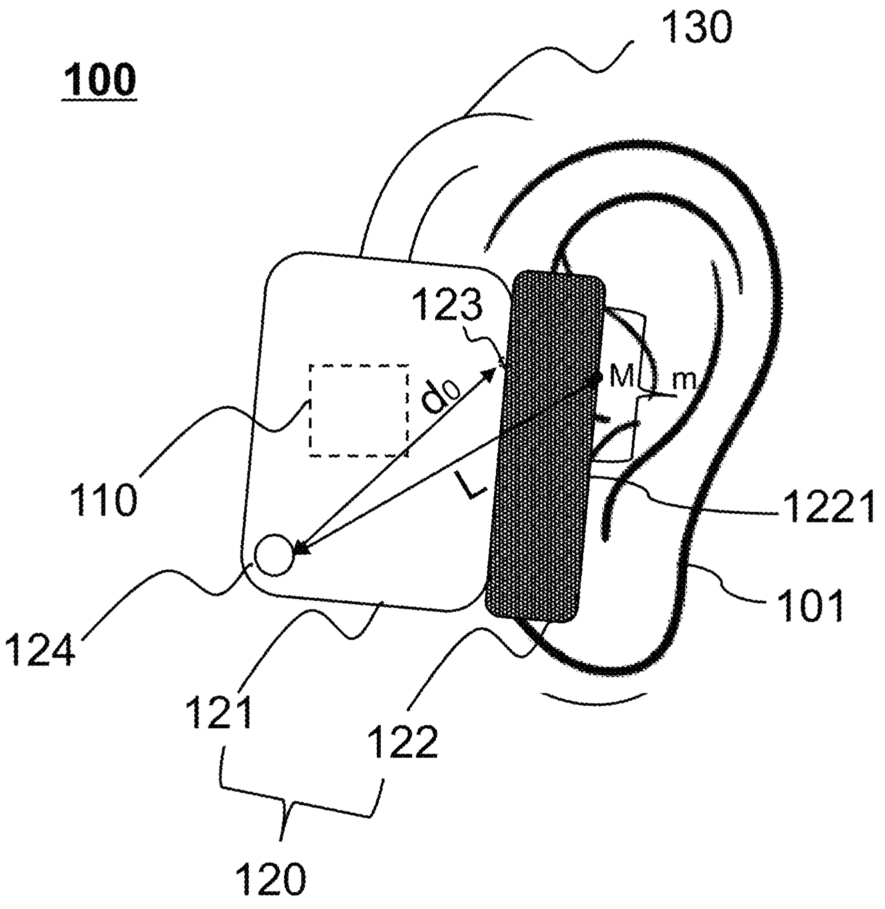
FIG. 31 is a schematic diagram illustrating a structure of an exemplary open earphone according to some embodiments of the present disclosure.
Figure 32:
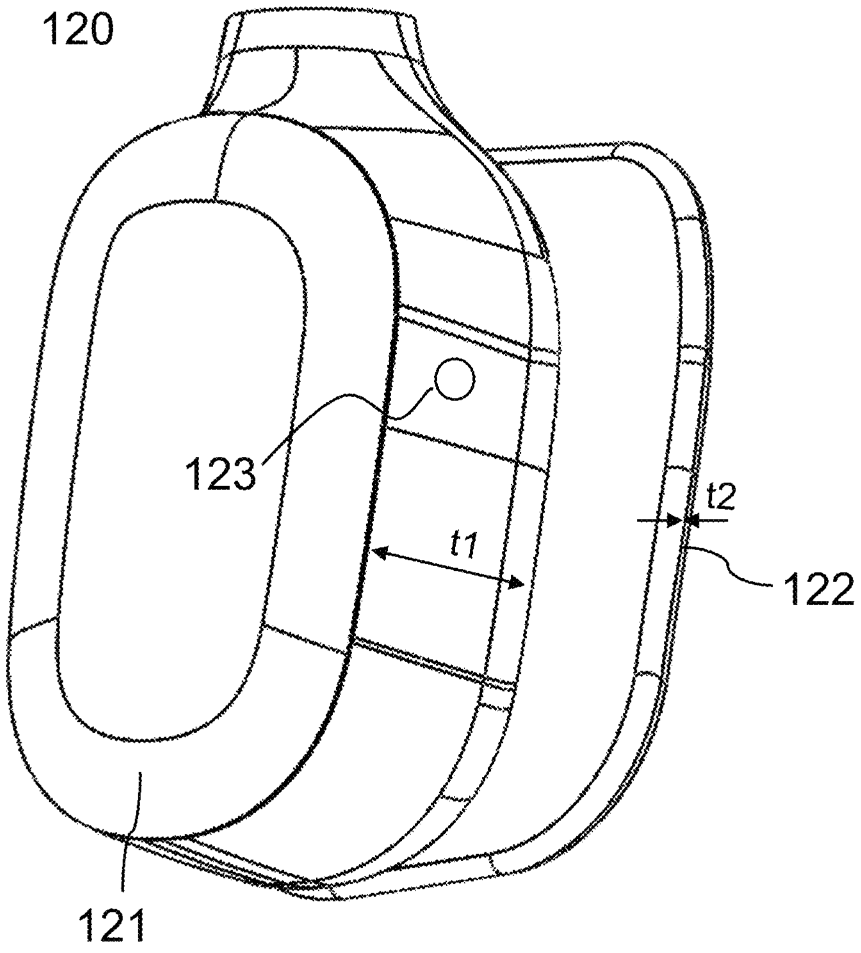
FIG. 32 is a schematic diagram illustrating a structure of an exemplary housing according to some embodiments of the present disclosure.

FIG. 31 is a schematic diagram illustrating a structure of the exemplary open earphone 100 according to some embodiments of the present disclosure. As shown in FIG. 31, the open earphone 100 may include the acoustic driver 110, the housing 120, and the suspension structure 130. The suspension structure 130 may be connected to the housing 120, and may allow the housing 120 to be fixed in a position near the ear 101 of a user without blocking an ear canal of the user. For example, the housing 120 may be fixed to a front side of a tragus of the user and fit on a face of the user. For another example, one end of the housing 120 (e.g., an end away from the suspension structure 130) may abut against an interior of the ear of the user (e.g., inside the concha cavity, on the antihelix, etc.). The acoustic driver 110 may be configured to generate two sounds with opposite phases. The housing 120 may have a first cavity, and the acoustic driver 110 may be provided in the first cavity. In some embodiments, the housing 120 may include the body 121 and the baffle 122. The body 121 may define the first cavity accommodating the acoustic driver 110. In some embodiments, the body 121 may be a regular shape such as a rectangle, a square, a cylinder, an ellipsoid, a sphere, or any irregular shape. The baffle 122 may be attached to a side of the body 121 departs the face of the user. For example, the baffle 122 may be connected to a surface on the body 121 opposite to a face-fitting side of the body 121 that fits on the face to avoid the baffle 122 from hitting the tragus. The baffle 122 and the ear of the user may form a second cavity. In some embodiments, the housing 120 may be provided with the first sound hole 123 and the second sound hole 124 that are in communication with the first cavity. The first sound hole 123 and the second sound hole 124 may be respectively configured to output two sounds with opposite phases. In some embodiments, according to related descriptions of FIG. 12, in order to increase a listening volume of the open earphone 100, particularly the listening volume at low and mid frequencies, while still retaining the effect of phase cancellation in a far field leakage, the second cavity may be configured to separate the two sound holes such that one of the sound holes is located inside the second cavity and the other sound hole is located outside the second cavity. For example, as shown in FIG. 31, the first sound hole 123 may be disposed inside the second cavity and the second sound hole 124 may be disposed outside the second cavity. For example, the first sound hole 123 may be disposed on a cross-section (e.g., as shown in FIG. 32) where the body 121 and the baffle 122 intersect. The second sound hole 124 may be disposed in any surface of the body 121 outside of the second cavity (e.g., a side that departs from the face of the user, as shown in FIG. 31, or a surface on the body 121 that is parallel to the side on which the first sound hole 123 is located). It should be understood that the sound hole 123 may not be visible from the perspective shown in FIG. 31, and that the numbering "123" is only used to show the position of the plane in which the first sound hole is located in relation to the position of the body 121 and the baffle 122. In some embodiments, the sound hole inside the second cavity (i.e., the first sound hole 123) may be located between the ear canal of the user and the sound hole outside the second cavity (i.e., the second sound hole 124).

In some embodiments, the first sound hole 123 may be disposed on a cross-section (e.g., as shown in FIG. 32) where the body 121 and the baffle 122 intersect, the second sound hole 124 may be disposed on the side of the body 121 away from the face, and the first sound hole 123 may be disposed closer to the ear canal of the user compared to the second sound hole 124, so that the first sound hole 123 is disposed inside the second cavity and the second sound hole 124 is disposed outside the second cavity. In some embodiments, the first sound hole 123 may be disposed close to the baffle 122. When the baffle 122 is a portion of the body 121, the first sound hole 123 may also be provided on the baffle 122. In some embodiments, the first sound hole 123 may be disposed between the ear canal of the user and the second sound hole 124. In some embodiments, the first sound hole 123 and the second sound hole 124 may be diagonally disposed on a side of the body 121 relative to the face. It should be noted that the first sound hole 123 and the second sound hole 124 are not limited to being distributed diagonally as shown in FIG. 31, but may also be distributed along the side of the body 121 relative to the face, etc., or other arbitrary distribution modes.

FIG. 32 is a schematic diagram illustrating a structure of an exemplary housing according to some embodiments of the present disclosure. In some embodiments, the body 121 may be disposed on a front side of a tragus or disposed within an auricle (there may be an overlap between the body 121 and an auricle projection surface). The baffle 122 may be connected to a side of the body 121 that is departs from a face of the user, and the baffle 122 may extend in a direction toward the ear canal relative to the body 121. In some embodiments, the baffle 122 may be of a plate structure, and a thickness of the baffle 122 may be less than a thickness of the body 121 as the body 121 defines a first cavity that accommodates the acoustic driver 110. As shown in FIG. 32, a thickness t2 of the baffle 122 may be less than a thickness t1 of the body 121. In some embodiments, when the body 121 is disposed on the front side of the tragus, a thickness of the body 121 may be a distance between a side of the body 121 near the face and a side of the body 121 away from the face, and a thickness of the baffle 122 may be a distance between two sides that are parallel to the two sides of the body 121 described above. In some embodiments, when the body 121 is located within the auricle or when there is an overlap between the body and a projection surface of the auricle, the thickness of the body 121 may be a distance between a side of the body 121 near the auricle and a side of the body 121 away from the auricle. The thickness of the baffle 122 may be a distance between two sides parallel to the two sides of the body 121 described above. In some embodiments, the thickness of the body 121 may be a length of the body 121 in a direction along a coronal axis of a human body. The projection surface in the present disclosure refers to a projection of an object on a head. For example, "there is an overlap between the body and a projection surface of the auricle" refers to that there is an overlap between a projection surface of the body 121 on the head and a projection surface of the auricle on the head. For example, the projection surface of the body 121 may be located entirely within a range of the projection surface of the auricle.

In some embodiments, according to FIGS. 20A-20D and the related descriptions, in order to improve the listening index so that the listening index at each frequency is greater than the listening index when a two-point (dipole) sound source without the cavity structure, the relative distance $L/d_0$ from the centroid of the opening of the cavity structure to the sound source located outside the cavity structure may not be greater than 1.78. When the user wears the open earphone 100, as shown in FIG. 31, the relative distance Lido from the centroid of the opening of the cavity structure to the sound source located outside the cavity structure may be expressed as a ratio value of the distance L between a boundary 1221 of the baffle 122 near the ear canal of the user (as shown in FIG. 31) and the second sound outlet 124 to the distance do between the two sound holes. Here, the "distance between the boundary 1221 and the second sound hole 124" refers to a distance between a boundary line of the baffle 122 near the ear canal and the second sound hole 124, or between a midpoint (e.g., a mid-point M shown in FIG. 31) of a line (e.g., the line segment m shown in FIG. 31) connecting two endpoints on a boundary surface that is abut against the auricle. In some embodiments, the ratio of the distance between the baffle 122 near the boundary 1221 of the ear canal of the user and the second sound hole 124 to the distance between the two sound holes may be less than 1.78.

Merely by way of example, the ratio of the distance between the boundary 1221 of the baffle 122 near the ear canal of the user and the second sound hole 124 to the distance between the two sound holes may be less than 1.78, 1.68, 1.58, 1.48, 1.38, 1.28, 1.18, or 1.08, etc.

In some embodiments, according to FIG. 22 and the related descriptions, in order to make a distance between a secondary sound source of the sound source disposed inside the cavity structure (i.e., the second cavity) and the sound source disposed outside of the cavity structure (i.e., the second cavity) close to improve the sound leakage reduction effect, the distance between the opening of the cavity structure and the external sound source may be smaller than the distance between the two sources. When the user wears the open earphone 100, the distance from the opening of the cavity structure (i.e., the second cavity) to the external sound source may be expressed as the distance between the boundary 1221 of the baffle 122 near the ear canal of the user and the second sound outlet 124. In some embodiments, the distance between the boundary 1221 of the baffle 122 near the ear canal of the user to the second sound hole 124 may be less than the distance between the two sound holes (i.e., the first sound hole 123 and the second sound hole 124).

In some embodiments, according to FIGS. 25A-25B, and the related descriptions, a relative volume $V/V_0$ of the cavity structure (i.e., the second cavity) may be less than 1.75 in order to improve the overall listening index. The relative volume $V/V_0$ of the cavity structure (i.e., the second cavity) may be expressed as a ratio of a volume of the second cavity to a reference volume. For example, the ratio of the volume of the second cavity to the reference volume may be smaller than 1.75. When the user wears the open earphone 100, the reference volume may be the cube of the distance between the boundary 1221 near the ear canal of the user to the sound hole (i.e., the second sound hole 124) disposed outside of the second cavity. In some embodiments, the volume of the second cavity may be a volume of a closed space enclosed by the concha cavity, the ear canal, the housing 120, the sound hole, and the curved surface surrounded by a gap that leaks sound. Thus, the volume of the second cavity may be measured by a glue-injected inverted ear mold. In some embodiments, the volume of the second cavity may be a product of the distance from a surface of the housing 120 facing the auricle/concha cavity to the surface of the auricle/concha cavity and an area enclosed by the auricle and each contact point of the housing 120. The distance from the surface of the housing 120 facing the auricle/concha cavity to the surface of the auricle/concha cavity may be a distance between a normal direction of the housing 120 along the sound hole (e.g., the first sound hole 123) disposed inside the second cavity and the surface of the auricle/concha cavity. The contact points of the auricle with the housing 120 may include a contact point of upper and lower edges (e.g., two edges along a direction along a vertical axis of the human body) of the housing 120 to the auricle, a contact point of an end (e.g., the end away from the suspension structure 130) to the concha cavity, an end point of the housing 120 closest to a wall of the concha cavity, etc., or any combination thereof.

In some embodiments, according to FIGS. 27A-27D, FIGS. 28B-28E, and FIGS. 29B-29E, and the related descriptions, in order to ensure that in situations of different relative distances $L/d_0$ between centroid of opening to the external sound source and different relative areas $S/S_0$ of the openings, a dual-point source provided with the cavity structure (i.e., the second cavity) having greater listening indexes than the dual-point source without the cavity structure in an audible frequency range of the human ear, the value of the sound pressure ratio Nsource between the two sound sources may be in a range of 0.2-2.0. For example, a ratio of a sound volume (or a sound pressure) of the sound outputted from the sound hole (i.e., the second sound hole 124) disposed outside of the second cavity to the sound volume (or the sound pressure) of the sound outputted from the sound hole (i.e., the first sound hole 123) disposed inside of the second cavity may be in a range of 0.2-2.0. Merely as an example, a ratio of the sound volume of the sound outputted from the second sound hole 124 to the sound volume of the sound outputted from the first sound hole 123 may be in a range of 0.6-1.4. For another example, the ratio of the sound volume of the sound outputted from the second sound hole 124 to the sound volume of the sound outputted from the first sound hole 123 may be in a range of 0.7-1.3.

In some embodiments, the sound volumes of the sounds outputted from the first sound hole 123 and the second sound hole 124 may be respectively regulated through regulating a sound output power of the acoustic driver 110. In some embodiments, the acoustic structures may be provided within the first cavity corresponding to the first sound hole 123 and the second sound hole 124, respectively, and the two sounds with opposite phases output by the acoustic driver 110 may be respectively outputted from the first sound hole 123 and the second sound hole 124 through the acoustic structures. The acoustic structures may adjust a ratio of a sound volume of the sound outputted from the sound hole (i.e., the second sound hole 124) outside of the second cavity to a sound volume outputted from the sound hole (i.e., the first sound hole 123) disposed inside the second cavity. An exemplary acoustic structure may include a slit, a conduit, a cavity, a gauze, a porous medium, etc., or any combination thereof.

In some embodiments, the suspension structure 130 may be an arcuate structure adapted to the auricle of the user so that the suspension structure 130 is able to be suspended at an upper auricle of the user. In some embodiments, the suspension structure 130 may also be a clamping structure adapted to the auricle of the user so that the suspension structure 130 may be clamped at the auricle of the user. In some embodiments, one end of the suspension structure 130 away from the auricle may be connected to the housing 120, and the other end may extend along the auricle of the user.

Figure 33:
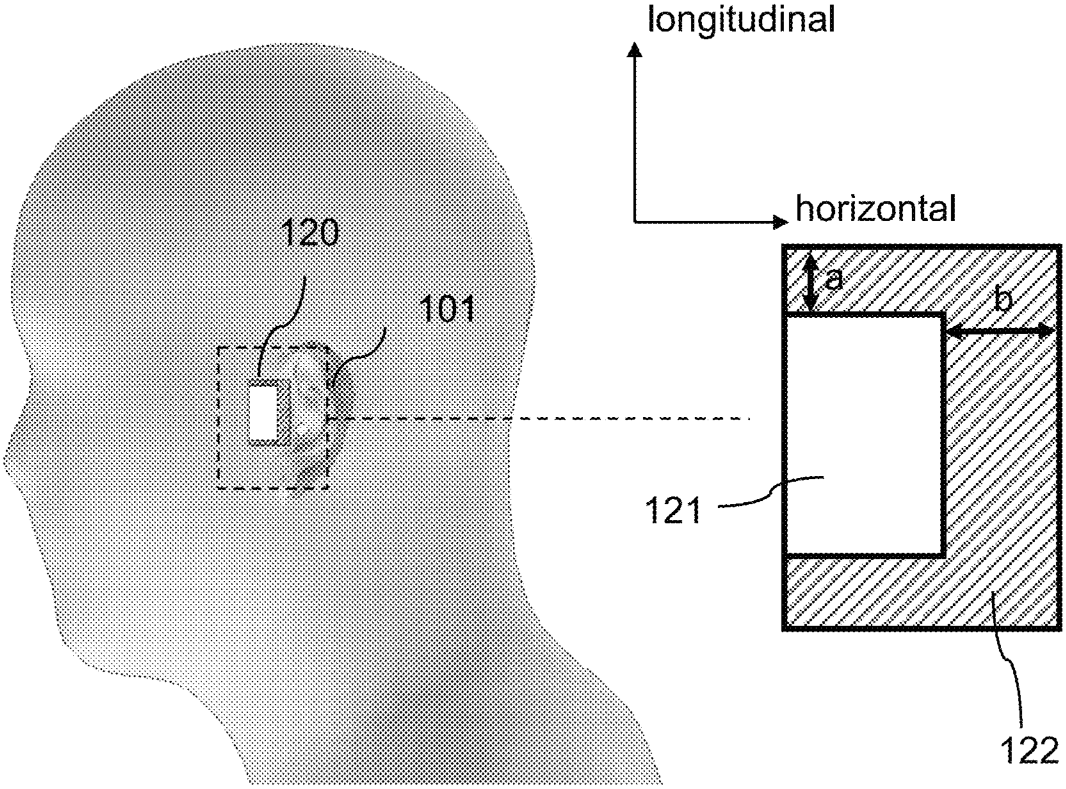
FIG. 33 is a schematic diagram illustrating a structure of an exemplary housing according to some embodiments of the present disclosure.

FIG. 33 is a schematic diagram illustrating a structure of an exemplary housing according to some embodiments of the present disclosure. As shown in FIG. 33, the body 121 may be disposed on a front side of a tragus of a user, and the baffle 122 may be provided not only protruding out of the body 121 in a horizontal direction, but also protruding out of the body 121 in a longitudinal direction. Here, "horizontal" refers to a direction along a sagittal axis of a human body, and "longitudinal" refers to a direction along a vertical axis of the human body. A portion of the baffle 122 that protrudes from the body 121 in the longitudinal direction may have a longitudinal extension size (referring to size as shown in FIG. 33), and a portion of the baffle 122 that protrudes from the body 121 in the horizontal direction may have a horizontal extension size (referring to size b shown in FIG. 33).

Figure 34A:
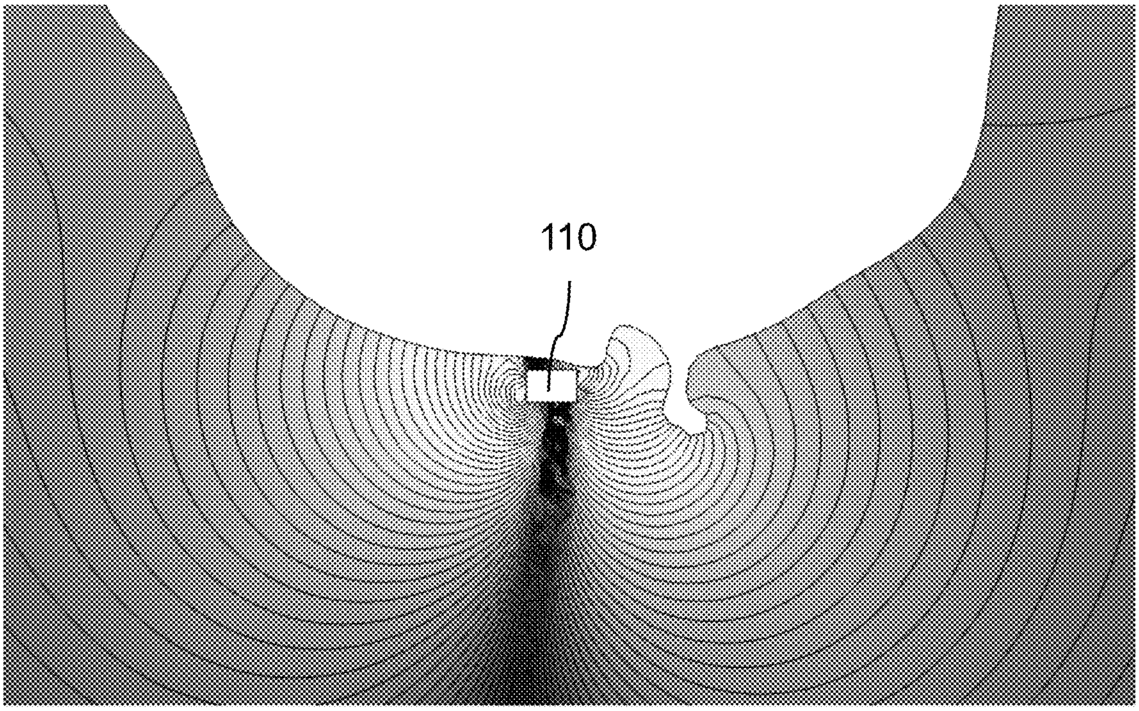
FIG. 34A is a sound field diagram illustrating an open earphone without a baffle.
Figure 34B:
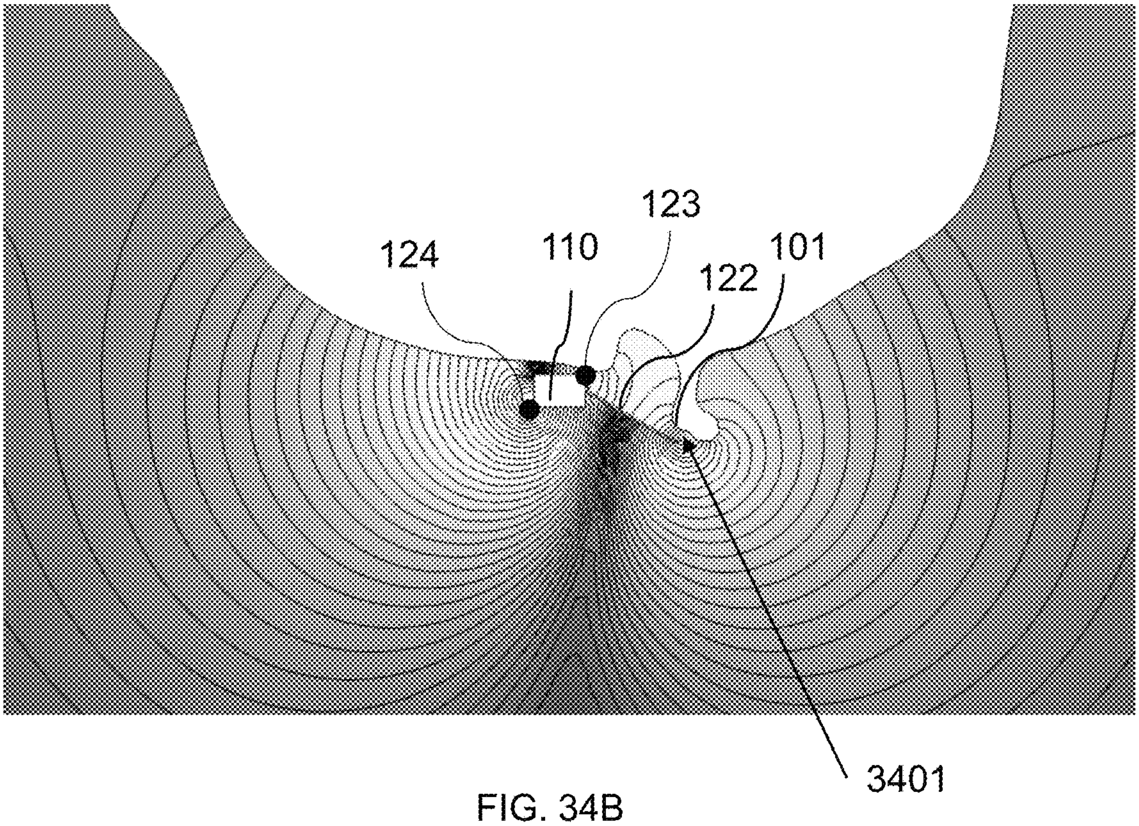
FIG. 34B is a sound field diagram illustrating an open earphone with a baffle shown in FIG. 33.

FIG. 34A is a sound field diagram illustrating an open earphone without a baffle. FIG. 34B is a sound field diagram illustrating an open earphone with a baffle shown in FIG. 33. As shown in FIG. 34A, when there is no baffle 122, a sound pressure may be centrally distributed at the acoustic driver 110 (or may be referred to as the body 121). As shown in FIG. 34B, when there is the baffle 122, the baffle 122 may enclose a second cavity with a portion of an auricle, and a gap (e.g., a gap 3401 shown in FIG. 34B) between the baffle 122 and the auricle (e.g., the ear 101 shown in FIG. 34B) may approximately form a leaky structure of the second cavity. As a sound A outputted from the first sound hole 123 inside the second cavity has an opposite phase with a sound B outputted from the second sound hole 124 outside the second cavity, the sound A may leak through the leaky structure to be canceled out with the sound B in opposite phase. In this way, a normal operation of a sound leakage reduction mechanism of the open earphone 100 may be ensured. At the same time, a presence of the second cavity may change a sound pressure distribution in the auricle, and the sound pressure may be centrally distributed at the baffle 122. At least a portion of an entrance of an ear canal may overlap with a projection surface of the baffle 122, making the sound pressure at the ear canal entrance substantially enhanced. Therefore, the presence of the second cavity may be capable of changing the sound pressure distribution within the auricle, enhancing the sound pressure at the ear canal entrance, so that the listening volume thereof is significantly enhanced, and thus the listening index is enhanced.

Figure 35:
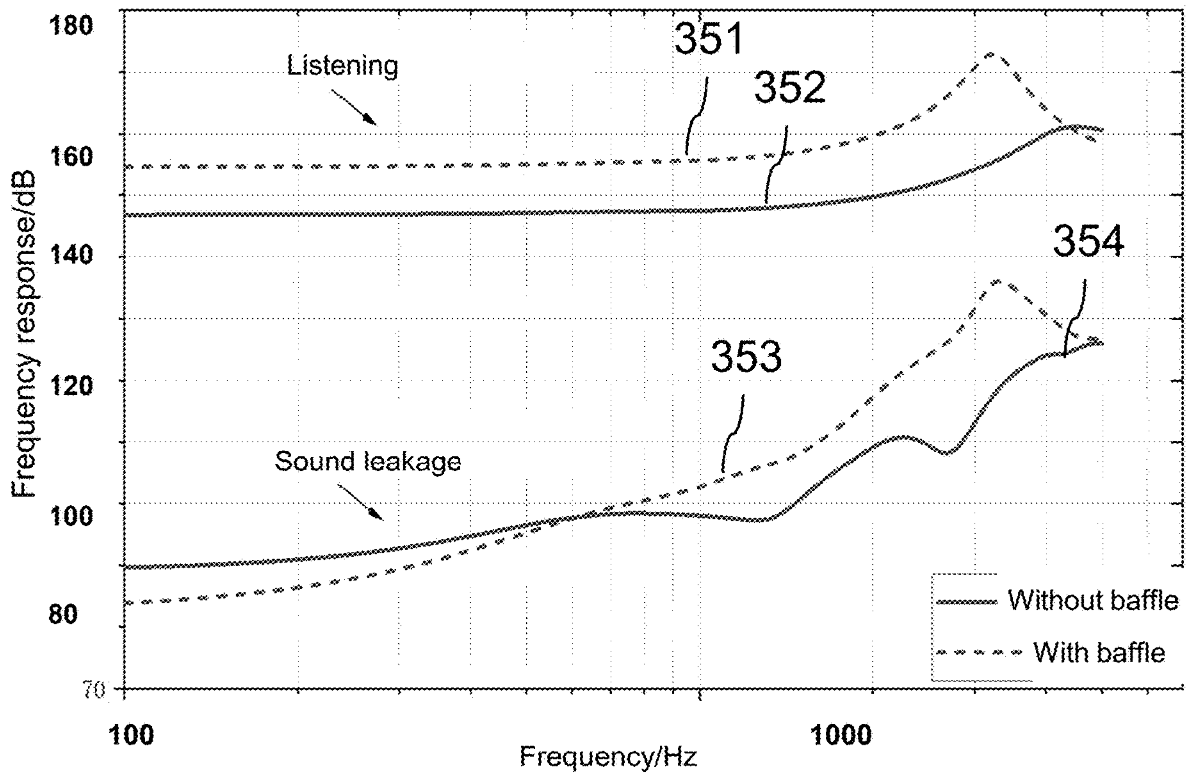
FIG. 35 is a comparison curve diagram illustrating frequency response curves of an open earphone without a baffle and an open earphone with a baffle.
Figure 36:
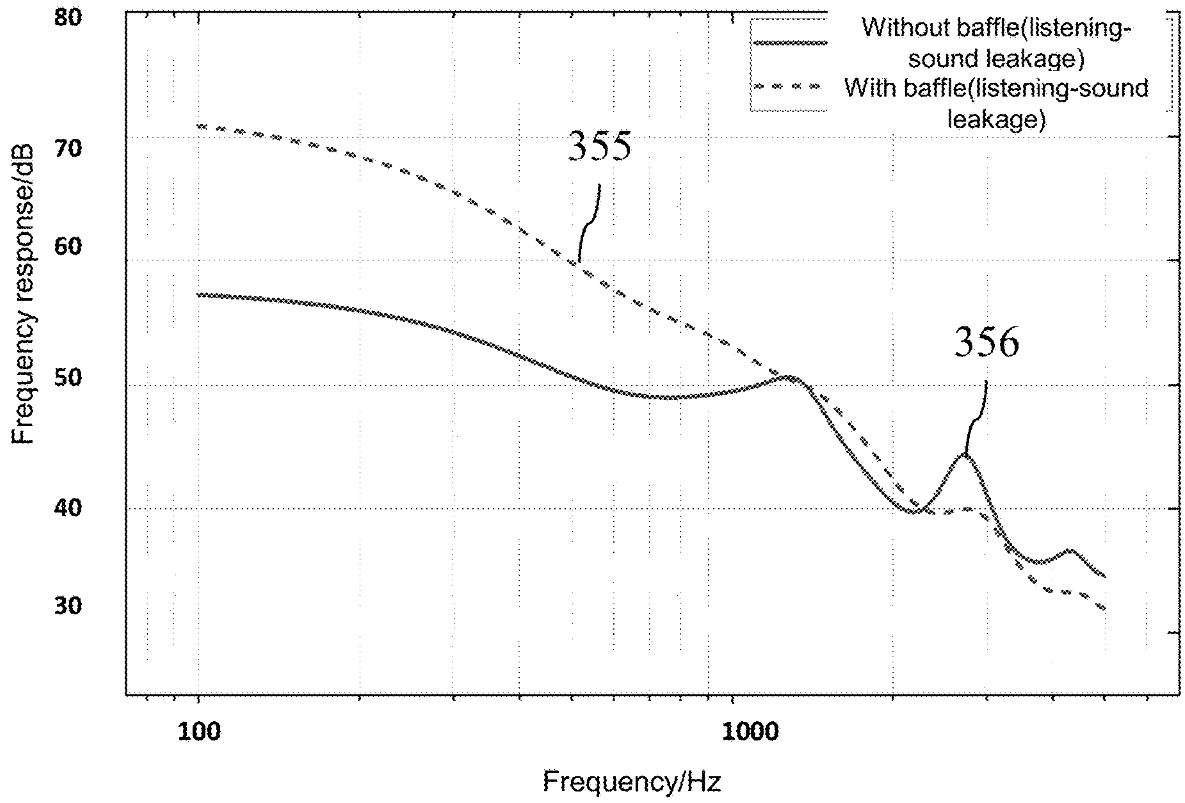
FIG. 36 is a curve diagram illustrating a difference between a listening volume and a sound leakage volume of an open earphone with a baffle, and a difference between a listening volume and a sound leakage volume of an open earphone without a baffle.

FIG. 35 is a comparison curve diagram illustrating frequency response curves of an open earphone without a baffle and an open earphone with a baffle. As shown in FIG. 35, a curve 351 indicates the frequency response curve of a listening volume of the open earphone 100 when the baffle 122 is disposed, and a curve 352 indicates the listening volume of the open earphone 100 when the baffle 122 is not disposed. As may be seen from the curve 351 and the curve 352, the listening volume of the open earphone 100 with the baffle 122 may be significantly increased relative to the listening volume without the baffle 122. A curve 353 indicates the frequency response curve of a sound leakage volume of the open earphone 100 when the baffle 122 is disposed, and a curve 354 indicates the frequency response curve of the sound leakage volume of the open earphone 100 when the baffle 122 is not disposed. As may be seen from curves 353 and 354, in a low and mid frequency range (e.g., 100 Hz-600 Hz), the sound leakage volume of the open earphone 100 disposed with the baffle 122 may be lower than the sound leakage volume of the open earphone 100 without the baffle 122, which indicates that the open earphone 100 with the baffle 122 has a good sound leakage reduction effect in the low and mid frequency range. FIG. 36 is a curve diagram illustrating a difference between a listening volume and a sound leakage volume of an open earphone with a baffle, and a difference between a listening volume and a sound leakage volume of an open earphone without a baffle. As shown in FIG. 36, a curve 355 indicates a curve of the difference between the listening volume and the sound leakage volume of the open earphone 100 when the baffle 122 is provided, and a curve 356 indicates a curve of the difference between the listening volume and the sound leakage volume of the open earphone 100 when the baffle 122 is not provided. According to the curve 355 and the curve 356, the difference between the listening sound volume and the sound leakage volume of the open earphone 100 provided with the baffle plate 122 may be greater in a low frequency band (e.g., in a range of 100-1000 Hz), and the listening sound effect and sound leakage reduction effect may be improved.

Figure 37A:
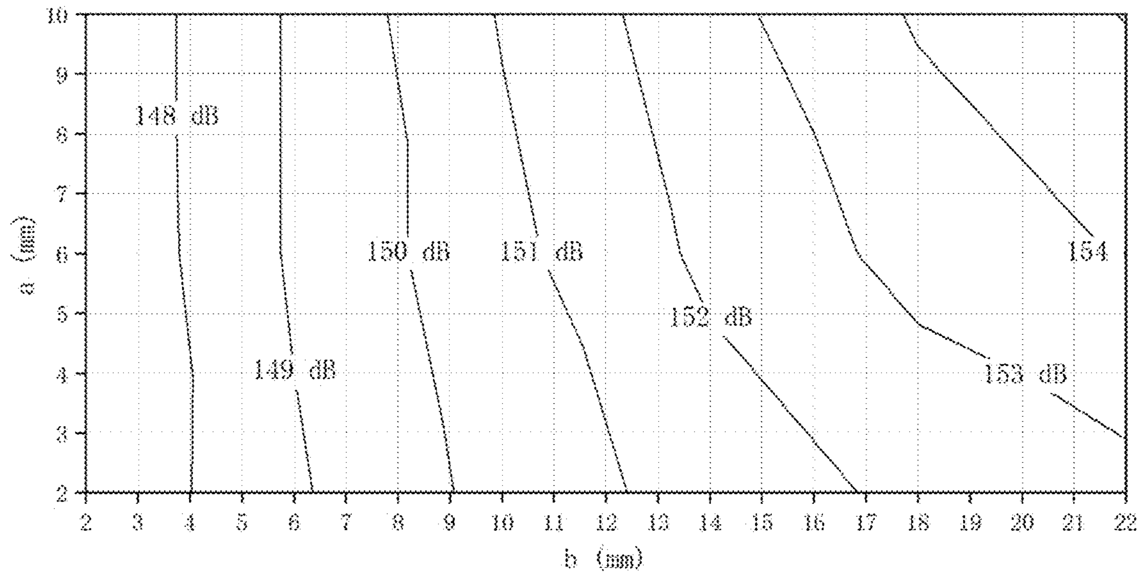
FIG. 37A is a diagram illustrating a change of a listening volume in a horizontal extension size and a longitudinal extension size of different baffles when a frequency of the baffle shown in FIG. 33 is 50 Hz.
Figure 37B:
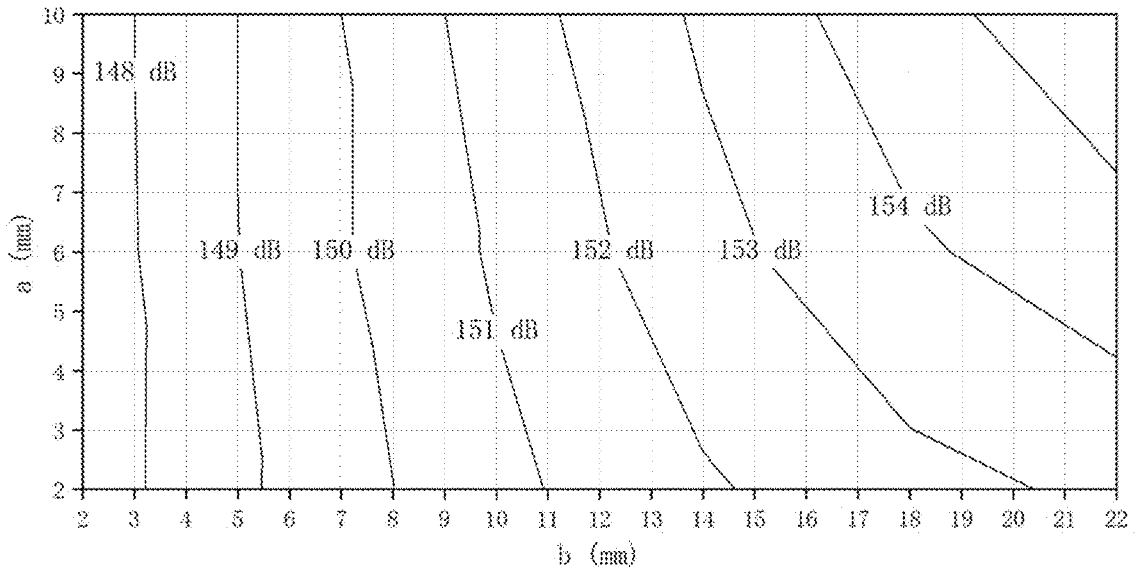
FIG. 37B is a diagram illustrating a change of a listening volume in a horizontal extension size and a longitudinal extension size of different baffles when a frequency of the baffle shown in FIG. 33 is 1000 Hz.
Figure 37C:
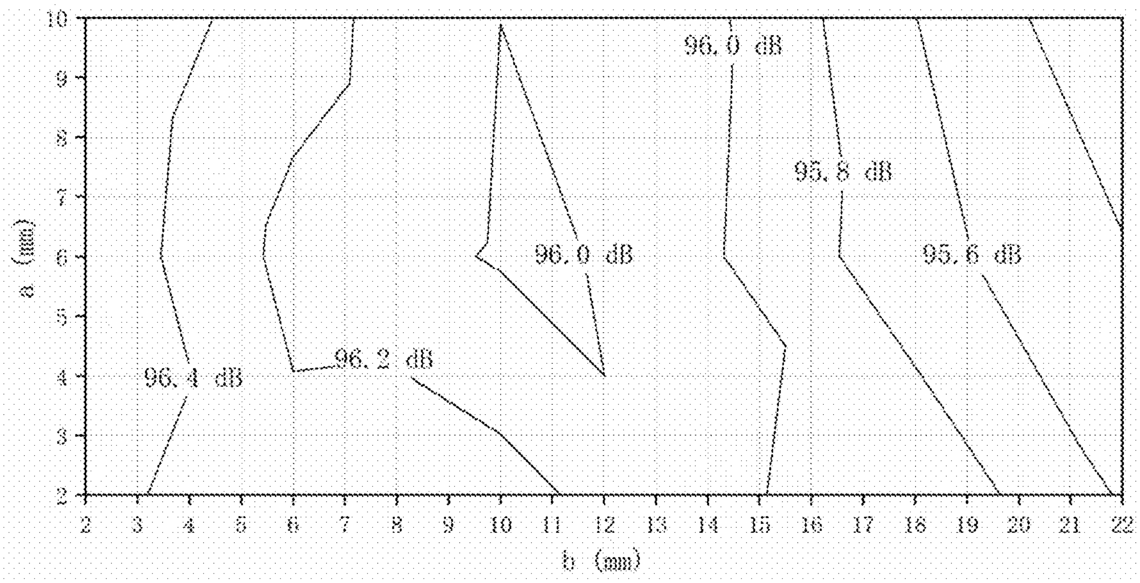
FIG. 37C is a diagram illustrating a change of a sound leakage volume in a horizontal extension size and a longitudinal extension size of different baffles when a frequency of the baffle shown in FIG. 33 is 500 Hz.
Figure 37D:
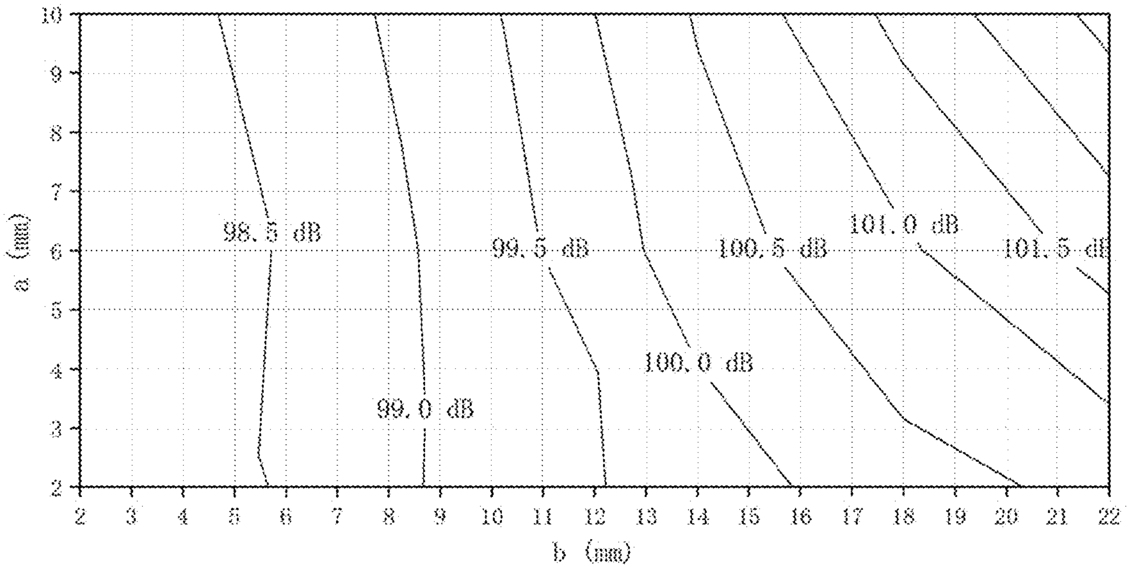
FIG. 37D is a diagram illustrating a change of a sound leakage volume in a horizontal extension size and a longitudinal extension size of different baffles when a frequency of the baffle shown in FIG. 33 is 1000 Hz.

In some embodiments, as a size of the baffle 122 (e.g., a longitudinal extension size, a horizontal extension size of the baffle 122, as shown in FIG. 33) may affect a size of a second cavity and a size of a relative opening, the listening volume and the sound leakage volume of the open earphone 100 may be relative to the longitudinal extension size and the horizontal extension size of the baffle 122. FIG. 37A is a diagram illustrating a change of a listening volume in a horizontal extension size and a longitudinal extension size of different baffles when a frequency of the baffle shown in FIG. 33 is 50 Hz. FIG. 37B is a diagram illustrating a change of a listening volume in a horizontal extension size and a longitudinal extension size of different baffles when a frequency of the baffle shown in FIG. 33 is 1000 Hz. FIG. 37C is a diagram illustrating a change of a sound leakage volume in a horizontal extension size and a longitudinal extension size of different baffles when a frequency of the baffle shown in FIG. 33 is 500 Hz. FIG. 37D is a diagram illustrating a change of a sound leakage volume in a horizontal extension size and a longitudinal extension size of different baffles when a frequency of the baffle shown in FIG. 33 is 1000 Hz. In conjunction with FIGS. 37A-37D, when a horizontal extension size b of the baffle 122 varies in a range of 2 mm-22 mm, and a longitudinal extension size of the baffle 122 varies in a range of 2 mm-10 mm, the listening volume of the open earphone 100 may be increased by up to about 8 dB. At the same time, the sound leakage volume may be increased by up to about 3 dB, which indicates that when the horizontal extension of the baffle 122 is in a range of 2 mm-22 mm, and the longitudinal extension size of the baffle 122 is in a 2 mm-10 mm, a listening index of the open earphone 100 may always be improved. Thus, in some embodiments, the longitudinal extension size of the baffle 122 may be in the range of 2 mm-10 mm. For example, the longitudinal extension size of the baffle 122 may be in a range of 3 mm-9 mm. Furthermore, for example, the longitudinal extension size of the baffle 122 may be in a range of 4 mm-8 mm. In some embodiments, the horizontal extension size of the baffle 122 may be in a range of 2 mm-22 mm. For example, the horizontal extension size of the baffle 122 may be in a range of 4 mm-20 mm. Furthermore, for example, the horizontal extension size of the baffle 122 may be in a range of 6 mm-18 mm.

The longitudinal extension size and the horizontal extension size of the baffle 122 may form an effective area of the baffle 122. The "effective area" here refers to an area of a portion of the baffle 122 that forms a second cavity with an auricle (e.g., an area of a shaded portion of the baffle 122 as shown in FIG. 33). In some embodiments, the effective area of the baffle 122 may be in a range of 70 $mm^2$-1110 $mm^2$. For example, the effective area of the baffle 122 may be in a range of 84 $mm^2$-1060 $mm^2$. Further example, the effective area of the baffle 122 may be in a range of 100 $mm^2$-900 $mm^2$.

In some embodiments, the body 121 and the baffle 122 may be of an integrated structure, with the baffle 122 being a portion of the housing 120 that extends toward an ear canal of a user and the baffle 122 being disposed near a face. In some embodiments, the body 121 and the baffle 122 may be separate structures assembled together. In some embodiments, the baffle 122 may be a side of the body 121 (e.g., a side of the body 121 that faces the face of the user).

In some embodiments, one of the two sound holes (e.g., the first sound hole 123) may be on a side of the body 121 facing a tragus, and the other sound hole (e.g., the second sound hole 124) may be on a side where the baffle 122 is located, so that the first sound hole 123 is inside the second cavity and the second sound hole 124 is outside the second cavity.

Figure 38:
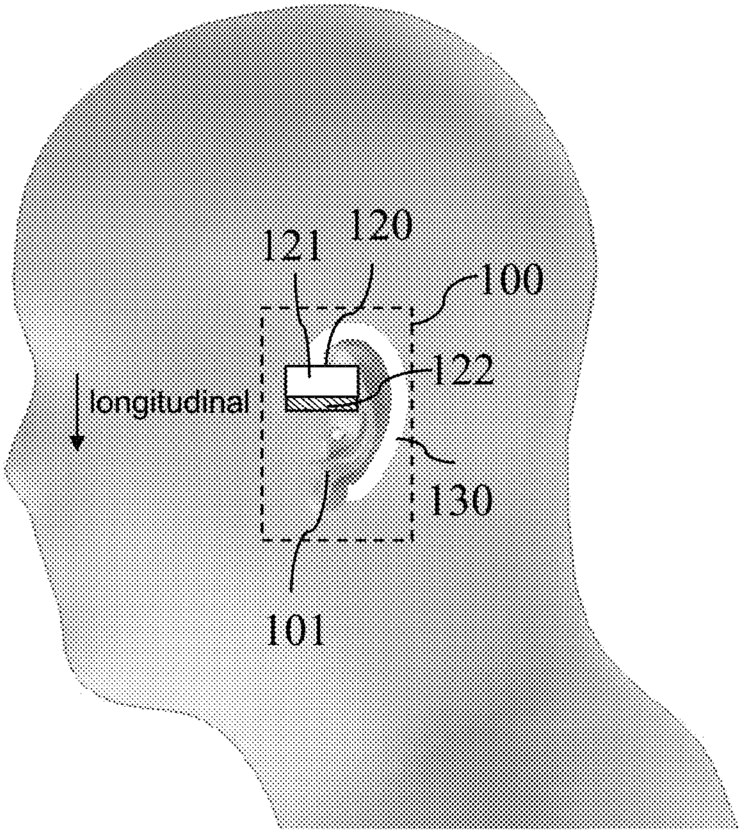
FIG. 38 is a schematic diagram illustrating a structure of an exemplary open earphone according to some embodiments of the present disclosure.

FIG. 38 is a schematic diagram illustrating a structure of an exemplary open earphone according to some embodiments of the present disclosure. As shown in FIG. 38, the open earphone 100 may include an acoustic driver (not shown), a housing 120, and a suspension structure 130. The housing 120 may include the body 121 and the baffle 122, and the body 121 may have an overlap with a projection surface of an auricle. The baffle 122 may be disposed on a side of the body 121 near an ear canal, and the baffle 122 may also have an overlap with the projection surface of the auricle. In some embodiments, the body 121 may be partially disposed within the auricle (e.g., at an upper auricle, as shown in FIG. 38). In some embodiments, the body 121 may also be partially disposed at a lower auricle. In some embodiments, the body 121 may also be disposed to cover a tragus. In some embodiments, one of the two sound holes (e.g., the first sound outlet 123) may be located on a side of the body 121 near the ear canal, and the other sound hole (e.g., the second sound outlet 124) may be disposed on a side of the body 121 away from the ear canal, so that the first sound hole 123 is inside the second cavity and the second sound hole 124 is outside the second cavity.

In some embodiments, when the body 121 is disposed within the auricle or there is an overlap between the projection surface of the auricle and the body 121, an effective area of the baffle 122 may be no less than 15 $mm^2$ in order to enhance a listening volume of the open earphone 100. For example, the effective area of the baffle 122 may be no less than 20 $mm^2$. In some embodiments, when the body 121 is disposed within the auricle or there is an overlap between the projection surface of the auricle and the body 121, and the body 121 and the baffle 122 are disposed in a longitudinal direction (referring to FIG. 38), the longitudinal extension size of the baffle 122 may be of not less than 0.8 cm. For example, the longitudinal extension size of the baffle 122 may be no less than 1 cm.

Figure 39:
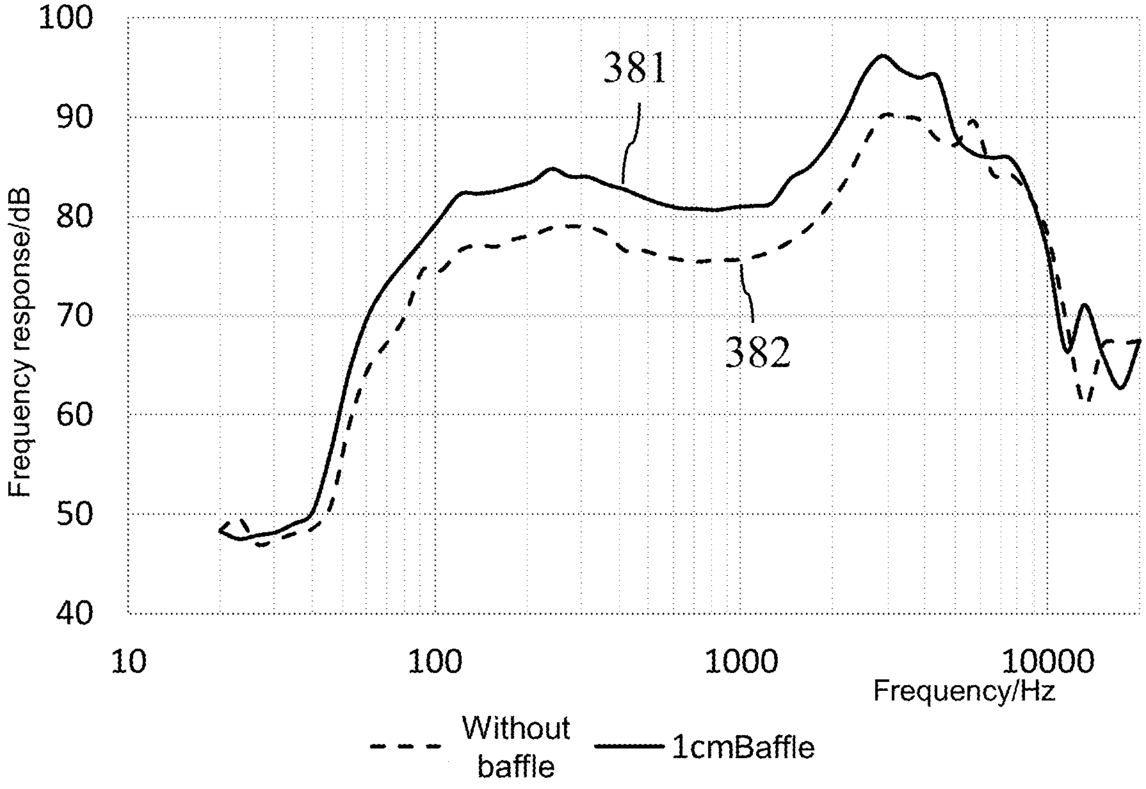
FIG. 39 is a comparison curve diagram illustrating frequency response curves of exemplary open earphone with and without a baffle according to some embodiments of the present disclosure.

FIG. 39 is a comparison curve diagram illustrating frequency response curves of exemplary open earphone with and without a baffle according to some embodiments of the present disclosure. As shown in FIG. 39, a curve 381 indicates a listening volume frequency response curve of the open earphone 100 when the baffle 122 is provided with a longitudinal extension size of 1 cm (or not less than 1 cm, or an effective area of the baffle 122 being not less than 20 $mm^2$), and a curve 381 indicates the listening volume frequency response curve of the open earphone 100 when the baffle 122 is not provided. According to the curve 381 and the curve 382, it may be seen that a listening index of the open earphone 100 with the baffle 122 is improved by more than 5 dB relative to the listening index when the baffle 122 is not provided.

Figure 40:
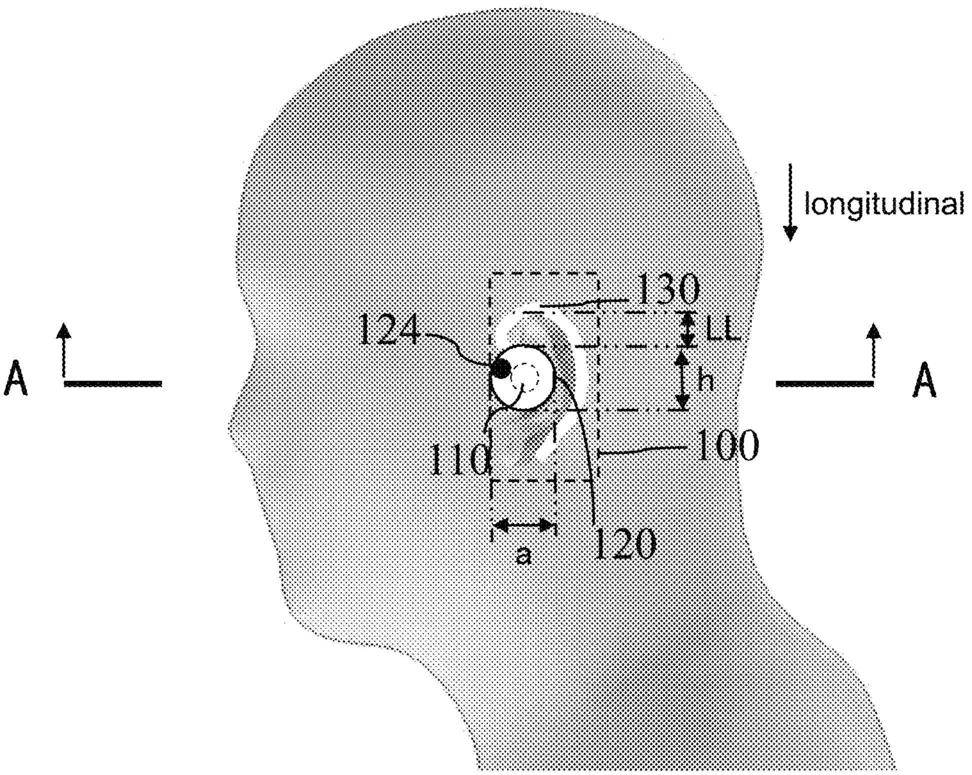
FIG. 40 is a schematic diagram illustrating a structure of an exemplary open earphone according to some embodiments of the present disclosure.
Figure 41:
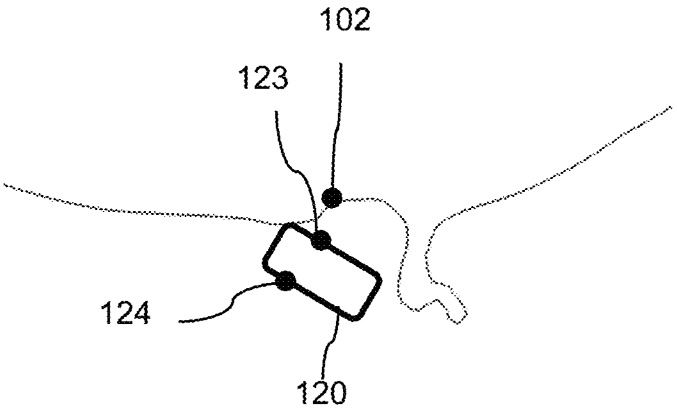
FIG. 41 is a cross-sectional view of the open earphone shown in FIG. 40 along A-A.
Figure 42:
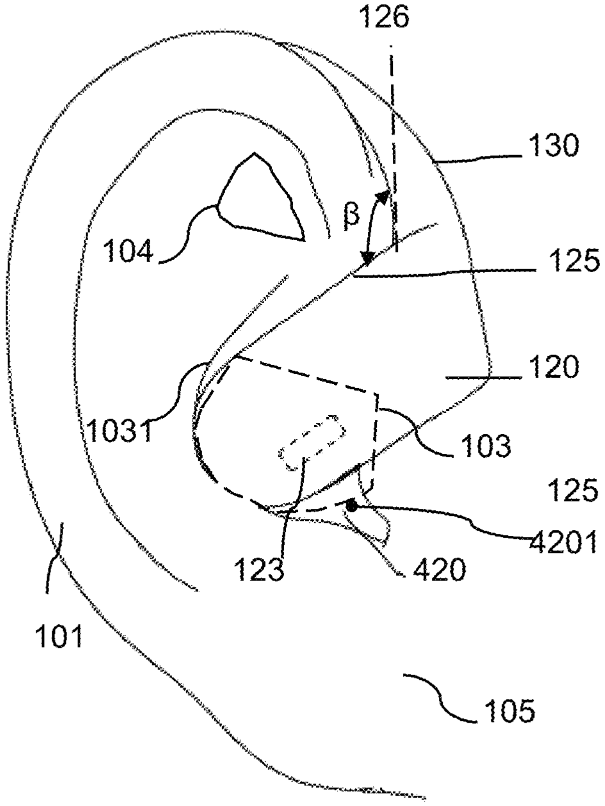
FIG. 42 is a front view of an exemplary open earphone worn on an ear of a user according to some embodiments of the present disclosure.
Figure 43:
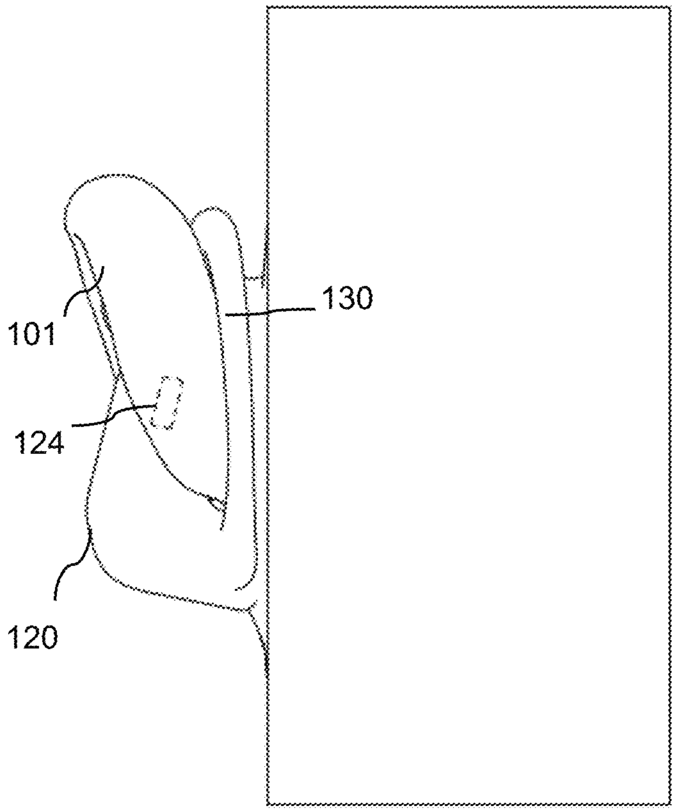
FIG. 43 is a top view of the open earphone shown in FIG. 42 worn on the ear of the user.
Figure 44:
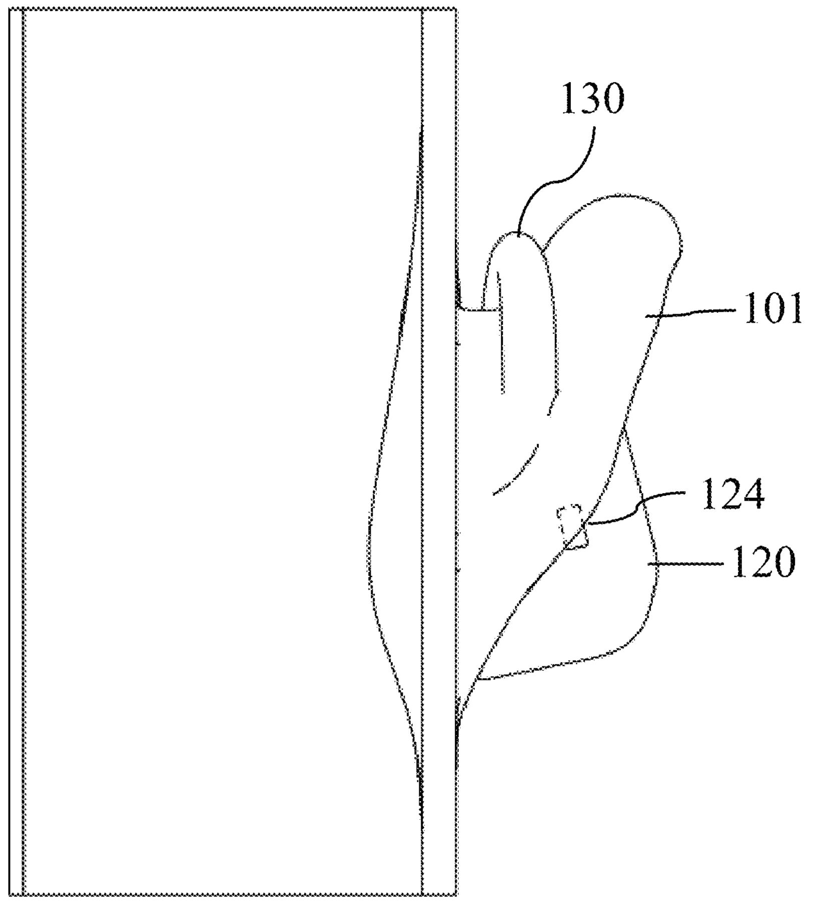
FIG. 44 is a bottom view of the open earphone shown in FIG. 42 worn on the ear of the user.
Figure 45:
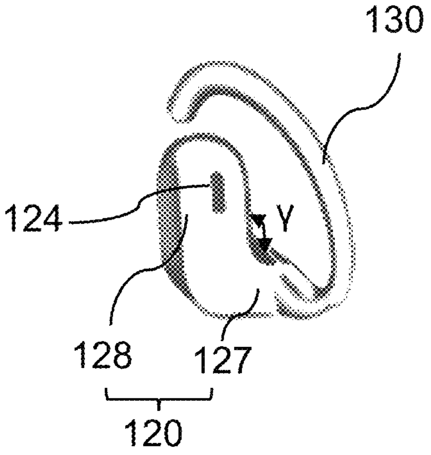
FIG. 45 is a top view of an exemplary open earphone according to some other embodiments of the present disclosure.
Figure 46:
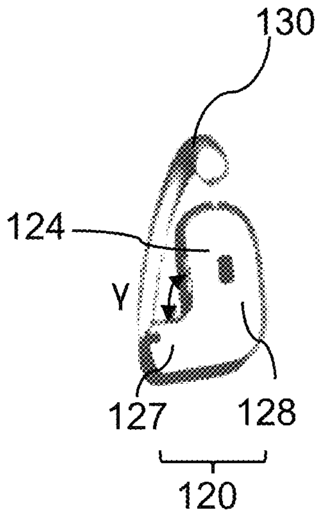
FIG. 46 is a bottom view of the open earphone shown in FIG. 45.
Figure 47:
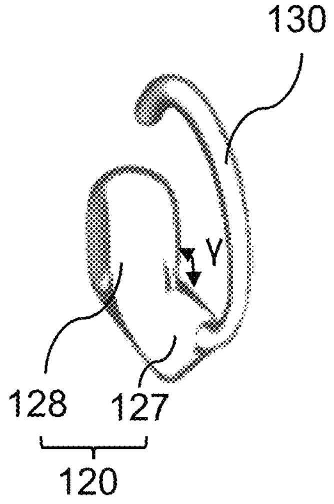
FIG. 47 is a top view of an exemplary open earphone according to some other embodiments of the present disclosure.
Figure 48:
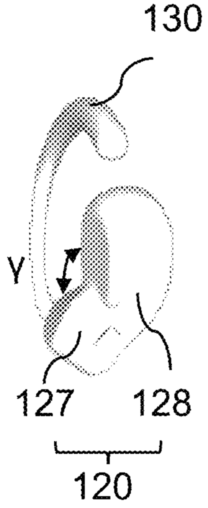
FIG. 48 is a bottom view of the open earphone shown in FIG. 47.

FIG. 40 is a schematic diagram illustrating a structure of an exemplary open earphone according to some embodiments of the present disclosure. FIG. 41 is a cross-sectional view of the open earphone shown in FIG. 40 along A-A. FIG. 42 is a front view of an exemplary open earphone worn on an ear 101 of a user according to some embodiments of the present disclosure. FIG. 43 is a top view of the open earphone shown in FIG. 42 worn on the ear 101 of the user. FIG. 44 is a bottom view of the open earphone shown in FIG. 42 worn on the ear 101 of the user. FIG. 45 is a top view of the exemplary open earphone 100 according to some other embodiments of the present disclosure. FIG. 46 is a bottom view of the open earphone 100 shown in FIG. 45. FIG. 47 is a top view of an exemplary open earphone 100 according to some other embodiments of the present disclosure. FIG. 48 is a bottom view of the open earphone 100 shown in FIG. 47.

As shown in FIGS. 40-44, the open earphone 100 may include the acoustic driver 110, the housing 120, and the suspension structure 130. The housing 120 may be an integrated structure, one end of the suspension structure 130 may be connected to the housing 120, and the other end of the suspension structure 130 may extend along an auricle. One end of the housing 120 (e.g., a side away from the suspension structure 130) may abut against the auricle of the user (e.g., in the concha cavity 103, as shown in FIG. 42, the housing 120 may be abut against an edge 1031 of the concha cavity 103). The housing 120 and the auricle (e.g., the concha cavity 103) may define a second cavity. For example, as shown in FIG. 42, a surface of the housing 120 toward the auricle may define the second cavity with the concha cavity. Furthermore, for example, as shown in FIGS. 45-46 or FIGS. 47-48, the housing 120 may include a first bending portion 127 and a second bending portion 128. In some embodiments, surfaces of the first bending portion 127 and the second bending portion 128 toward the auricle may define the second cavity in conjunction with the concha cavity. In some embodiments, the second bending portion 128 may define the second cavity with the concha cavity. By disposing the first bending portion 127, in the wearing state, the open earphone 100 may well match a shape of the ear, and bypass a front side of a crus of helix or a tragus. At the same time, the disposing of the first bending portion 127 allows the second bending portion 128 to fit more snugly against the concha cavity of the user. By placing an end of the second bending portion 128 against an edge of, or inside, the concha cavity of the user, it may be possible to cause a surface of the first bending portion 127 toward the auricle to form a "integrated" second cavity with the concha cavity. In this way, the second cavity formed may be small in size (i.e., allowing the second cavity to have a smaller relative volume, $V/V_0$, which further improves an overall listening index), and the first sound hole and an entrance to the ear canal may be well wrapped in the second cavity. Furthermore, the disposing of the first bending portion 127 may allow a center of gravity of the entire housing 120 to be close to a section of an ear base, which makes the open earphone 100 stable when worn. Here, the "a section of an ear base" refers to a face where the ear base intersects a head of the user. The "a center of gravity of the housing 120" refers to a center of gravity of the housing 120 as a whole. The weight of the housing 120 as the whole includes weights of all internal structures of the housing 120 (e.g., the acoustic driver 110, a core, a battery, etc.) and the weight of the housing 120 itself.

In some embodiments, the first bending portion 127 and the second bending portion 128 may form the housing 120 by integrally molding. In some other embodiments, the first bending portion 127 and the second bending portion 128 may also be joined together to form the housing 120 by plugging, snapping, etc. In some embodiments, an angle between the first bending portion 127 and the second bending portion 128 may be no less than 90 degrees. The "angle" herein refers to the angle between two surfaces of the first bending portion 127 and the second bending portion 128 toward the auricle. For example, as shown in FIGS. 45-46, an angle γ between the first bending portion 127 and the second bending portion 128 may be 90 degrees. Further example, as shown in FIGS. 47-48, the angle between the first bending portion 127 and the second bending portion 128 may be an obtuse angle. It may be appreciated that the angle between the first bending portion 127 and the second bending portion 128 shown in FIGS. 45-48 may be any angle that is able to be used to form the second cavity with the concha cavity, which is not limited herein. A gap between the housing 120 and the ear canal entrance 102 may be a leaky structure for the second cavity. By disposing the end of the housing 120 against the edge or inside of the concha cavity of the user, the surface of the housing 120 toward the auricle may be made to form a "integrated" second cavity with the concha cavity. In this way, the second cavity may be small in size (i.e., allowing the second cavity to have a smaller relative volume $V/V_0$, thereby further improving the overall listening index), and the first sound hole of and the ear canal entrance may be well wrapped inside.

In some embodiments, in order for one end of the housing 120 (e.g., the side away from the suspension structure 130) to abut against the concha cavity 103 of the user, as shown in FIG. 42, an angle β between a surface 125 of the housing 120 toward a triangular fossa 104 and a tangent line 126 of the suspension structure 130 to a connection portion of the housing 120 may be in a range of 100°-150°. For example, the angle β between the surface 125 of the housing 120 toward the triangular fossa 104 and the tangent line 126 of the suspension structure 130 to the connection portion of the housing 120 may be in a range of 120°-140°.

Figure 51:
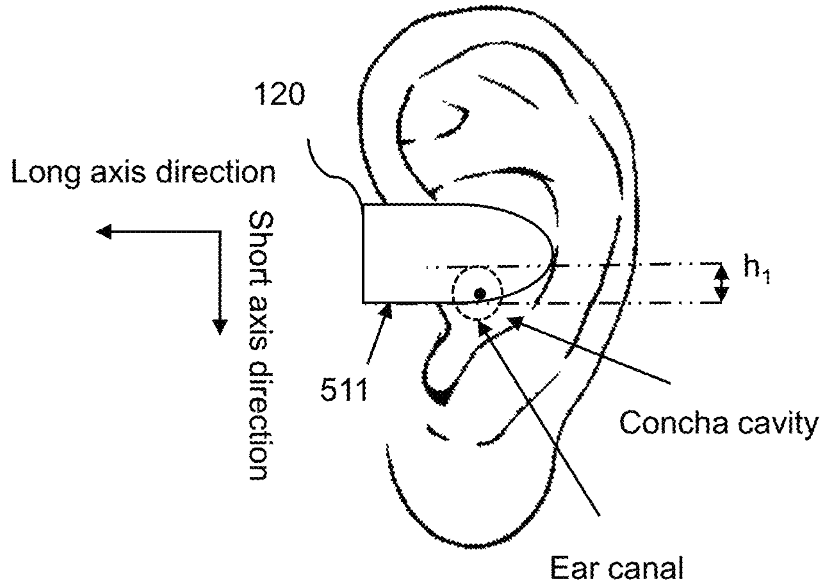
FIG. 51 is a schematic diagram illustrating an exemplary wearing of an open earphone according to some embodiments of the present disclosure.

In some embodiments, in order to allow the housing 120 to be inserted into the concha cavity to form the second cavity with a good acoustic effect (e.g., the second cavity with a smaller relative opening $S/S_0$) for the majority of the users when the users are wearing the open earphone 100. A distance between the upper surface of the housing 120 along a vertical axis direction (i.e., the longitudinal direction) of the user and a point at which the suspension structure 130 contacts with the ear of the user along the vertical axis direction of the user may be in a range of 10 mm-20 mm. As shown in FIG. 40, the distance between the upper surface of the housing 120 along the vertical axis direction of the user and the point at which the suspension structure 130 contacts with the ear of the user along the vertical axis direction of the user may be indicated as LL. In some embodiments, the distance LL between the upper surface of the housing 120 along the vertical axis direction of the user and the point at which the suspension structure 130 contacts the ear of the user along the vertical axis direction of the user may be in a range of 15 mm-18 mm. In some embodiments, a length on the surface of the housing 120 departs from the ear of the user along the direction of the long axis of the housing 120 may be in a range of 20 mm-30 mm. As shown in FIG. 40, the length of the housing 120 on the surface of the housing 120 departs from the ear of the user along the direction of the long axis of the housing 120 may be indicated as a. In some embodiments, a length (which may also be referred to as a height) of the housing 120 on the surface of the housing 120 departs from the ear of the user along the direction of a short axis of the housing 120 may be in a range of 11 mm-16 mm. As shown in FIG. 40, the length of the housing 120 on the surface of the housing 120 departs from the ear of the user along the direction of the short axis of the housing 120, may be indicated as h. The "long axis direction" of the housing 120 in the present disclosure refers to the direction of the longest line segment connecting two points on a surface edge on the housing 120 toward the ear canal of the user. The "short axis direction" refers to a direction perpendicular to the long axis direction on the surface of the housing 120 facing towards the ear canal of the user (as shown in FIG. 51).

The first sound hole 123 and the second sound hole 124 of the open earphone 100 may be located inside and outside of the second cavity, respectively, with the first sound hole 123 being disposed closer to the ear canal entrance 102 relative to the second sound hole 124. As shown in FIGS. 40-42, the sound hole (i.e., the first sound hole 123) disposed within the second cavity may be located on a side of the housing 120 facing the ear canal. In some embodiments, according to FIGS. 25A-25B, the greater the volume of the cavity structure, the greater the listening index in a lower frequency band (e.g., frequencies below 500 Hz). In order to increase the listening index of the open earphone 100 at low frequencies, with a certain area of the housing covering the concha cavity of the user, the greater a distance between the sound hole (i.e., first sound exit hole 123) inside the second cavity along the coronal axis of the human body and a wall surface of the concha cavity (i.e., a height of the second cavity along the coronal axis direction of the human body), the greater the volume of the second cavity. In some embodiments, the distance between the sound hole (i.e., the first sound hole 123) inside the second cavity and the wall surface of the concha cavity along the coronal axis of the human body may be in a range of 4 mm-10 mm. In some embodiments, the greater the distance between the sound hole (i.e., the first sound hole 123) within the second cavity and the leaky structure (e.g., the gap formed by the upper and lower edges of the housing 120 and the ear auricle), the greater the acoustic effect. Meanwhile, the sound hole inside the second cavity may not be too far away from the ear canal, and thus, along the short axis direction of the housing, a minimum distance between the sound hole inside the second cavity and the leaky structure (e.g., the upper or lower edge of the housing along the short axis direction) may be in a range of 3 mm-8 mm. For example, the minimum distance between the sound hole inside the second cavity and the leaky structure (e.g., the upper or lower edge of the housing vertical to the short axis direction) may be in a range of 4 mm-6 mm. The minimum distance between the sound hole inside the second cavity and the leaky structure refers to a smaller distance of the distance between the sound hole inside the second cavity and the upper edge of the housing perpendicular to the short axis direction and the distance between the sound hole inside the second cavity and the lower edge of the housing perpendicular to the short axis direction.

In some embodiments, the sound hole (i.e., the second hole 124) disposed outside the second cavity may be disposed on a side of the housing 120 away from the concha cavity. For example, as shown in FIG. 43, the sound hole outside of the second cavity (i.e., the second sound hole 124) may be disposed on a side of the housing 120 toward the triangular fossa. For another example, as shown in FIG. 44, the sound hole outside the second cavity (i.e., the second sound hole 124) may be located on a side of the housing 120 facing an earlobe. Furthermore, for example, the sound hole outside the second cavity may include two or more sound holes, two of the sound holes may be respectively located on the side of the housing 120 facing the triangular fossa, and on the side of the housing 120 facing the earlobe.

In some embodiments, according to FIGS. 20A-20D and the related descriptions, in order to improve the listening index such that the listening index at each frequency is greater than the listening index of a two-point (dipole) sound source without the cavity structure, the relative distance $L/d_0$ between a centroid of the opening of the cavity structure to the sound source located outside the cavity structure may be no greater than 1.78. When a user wears the open earphone 100 shown in FIGS. 40-48, the relative distance $L/d_0$ between the centroid of the opening of the cavity structure and the sound source located outside the cavity structure may be indicated as a ratio of a distance between a gap between the housing 120 and the ear canal entrance 102 and the second sound hole 124 to the distance between the two sound holes. Here, "the distance between a gap between the housing 120 and the ear canal entrance 102 and the second sound hole 124" refers to a distance between a center point (e.g., the center point 4291 of a region 420 shown in FIG. 42) of a gap region (e.g., the region 420 as shown in FIG. 42) formed by a surface of the housing 120 facing the earlobe (e.g., the earlobe shown in FIG. 42) and the ear 101 and the second sound hole 124. In some embodiments, the ratio of the distance between the gap between the housing 120 and the ear canal entrance 102 and the second sound hole 124 to the distance between the two sound holes may be smaller than 1.78. Merely as an example, the ratio of the distance between the gap between the housing 120 and the ear canal entrance 102 and the second sound hole 124 to the distance between the two sound holes may be less than 1.78, 1.68, 1.58, 1.48, 1.38, 1.28, 1.18, or 1.08, etc.

In some embodiments, according to FIG. 22 and the related descriptions, in order to bring a secondary sound source of the sound source disposed inside the cavity structure (i.e., the second cavity) close to a sound source disposed outside the cavity structure (i.e., the second cavity) to improve the leakage reduction effect, the distance from the opening of the cavity structure to the external sound source may be less than the distance between the two sound sources. When the user wears the open earphone 100 as shown in FIGS. 40-48, the distance between the opening of the cavity structure (i.e., the second cavity) to the external sound source may be indicated as the distance between the gap between the housing 120 and the ear canal entrance 102 and the second sound hole 12. In some embodiments, the distance between the gap between the housing 120 and the ear canal entrance 102 and the second sound hole 124 may be less than the distance between the two sound holes (i.e., the first sound hole 123 and the second sound hole 124).

In some embodiments, according to FIGS. 25A-FIG. 25B and the related descriptions, in order to improve the overall listening index, a relative volume $V/V_0$ of the cavity structure (i.e., the second cavity) may be less than 1.75. The relative volume $V/V_0$ of the cavity structure (i.e., the second cavity) may be indicates as the ratio of the volume of the second cavity to a reference volume. For example, the ratio of the volume of the second cavity to the reference volume may be less than 1.75. When the user wears the open earphone 100 as shown in FIGS. 40-44, the reference volume may be the cube of the distance from the gap between the housing 120 and the ear canal entrance 102 to the sound hole (i.e., the second sound hole 124) located outside the second cavity. In some embodiments, the volume of the second cavity may be a volume of a closed space enclosed by the concha cavity, the ear canal, the housing 120, the sound hole, and the curved surface surrounded by the gap that leaks sound. Thus, the volume of the second cavity may be measured by a glue-injected inverted ear mold. In some embodiments, the volume of the second cavity may be the product of the distance between the surface of the housing 120 facing the auricle or the concha cavity and the surface of the auricle or the concha cavity and the area circumscribed by contact points between the auricle and the housing 120. The distance between the surface of the housing 120 facing the auricle or the concha cavity and the surface of the auricle or the concha cavity may be the distance between a normal direction of the housing 120 along the sound hole disposed inside the second cavity to the surface of the auricle or the concha cavity. The various contact points between the auricle and the housing 120 may include the contact points between the auricle and the upper and lower edges of the housing 120, the contact points between an end of the housing 120 and the concha cavity, the end of the housing 120 closest to a wall surface of the concha cavity, etc., or any combination thereof.

In some embodiments, according to FIGS. 27A-27D, FIGS. 28B-28E, and FIGS. 29B-29E, and the related descriptions, in order to ensure that in a situation where a dual-point source provided with the cavity structure (i.e., the second cavity) has different relative distances $L/d_0$ between the centroids of openings and an external sound source, and different relative areas $S/S_0$ of the openings, in an audible range of a human ear, the dual-point source provided with the cavity structure have greater listening indexes than the dual-point source without cavity structure, the sound pressure ratio Nsource of the two sound sources may be in a range of 0.2-2.0. For example, a ratio value of the sound volume (or the sound pressure) of the sound outputted from the sound hole (i.e., the second sound hole 124) disposed outside the second cavity to the sound volume (or the sound pressure) of the sound outputted from the sound hole (i.e., the first sound hole 123) disposed inside the second cavity may be in a range of 0.2-2.0. As an example only, the ratio of the sound volume of the sound outputted from the second sound hole 124 to the sound volume of the sound outputted from the first sound hole 123 may be in a range of 0.6-1.4. For another example, the ratio of the sound volume of the sound outputted from the second sound hole 124 to the sound volume of the sound outputted from the first sound hole 123 may be in a range of 0.7-1.3.

Figure 49A:
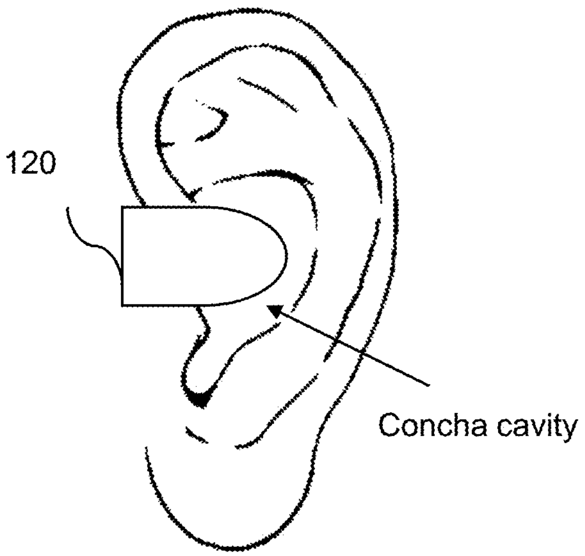
FIG. 49A is a schematic diagram illustrating an exemplary wearing of an open earphone according to some embodiments of the present disclosure.
Figure 49B:
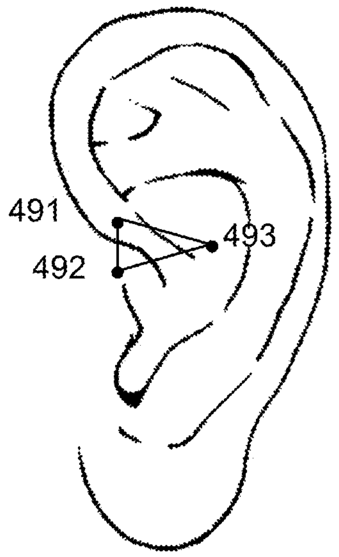
FIG. 49B is a schematic diagram illustrating an ear according to some embodiments of the present disclosure.
Figure 49C:
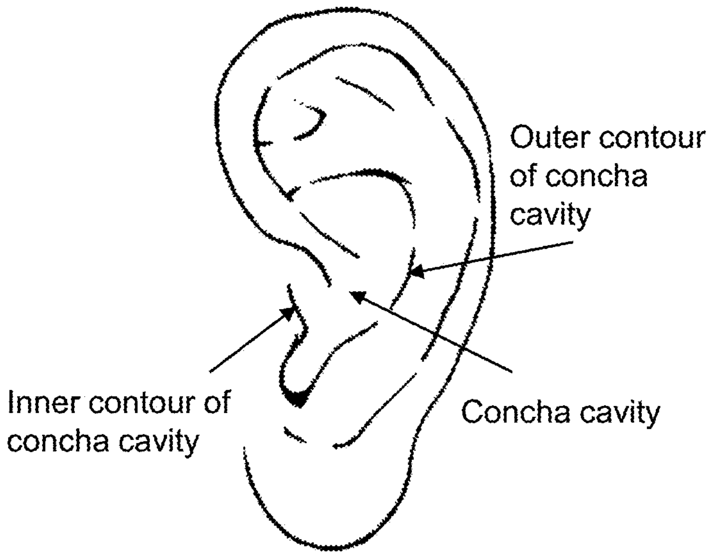
FIG. 49C is a schematic diagram illustrating an ear according to some embodiments of the present disclosure.
Figure 50A:
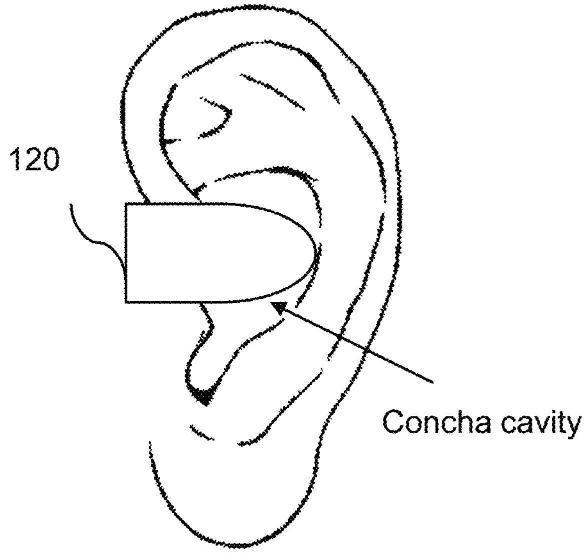
FIG. 50A is a schematic diagram illustrating an exemplary wearing of an open earphone according to some embodiments of the present disclosure.
Figure 50B:
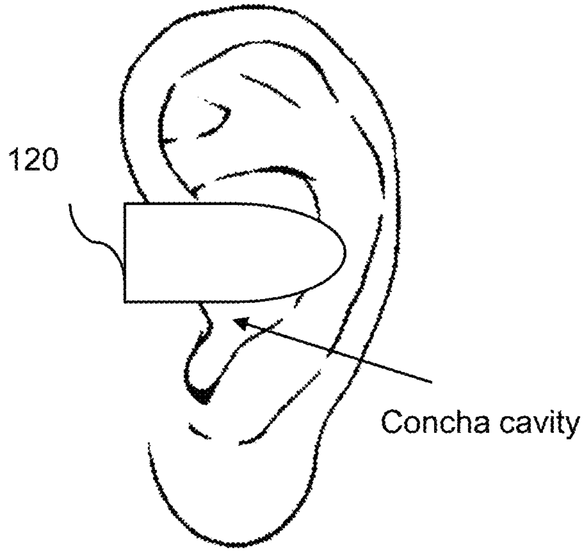
FIG. 50B is a schematic diagram illustrating an exemplary wearing of an open earphone according to some embodiments of the present disclosure.
Figure 50C:
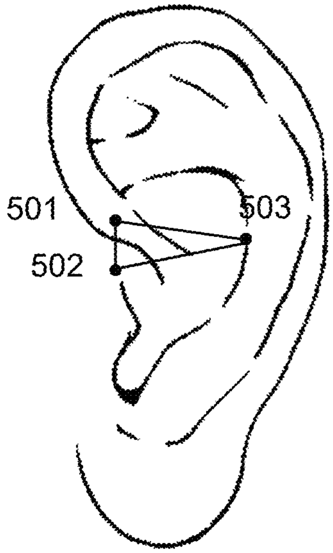
FIG. 50C is a schematic diagram illustrating an ear according to some embodiments of the present disclosure.

FIG. 49A is a schematic diagram illustrating an exemplary wearing of an open earphone according to some embodiments of the present disclosure. FIG. 49B is a schematic diagram illustrating an ear according to some embodiments of the present disclosure. FIG. 49C is a schematic diagram illustrating an ear according to some embodiments of the present disclosure. FIG. 50A is a schematic diagram illustrating an exemplary wearing of an open earphone according to some embodiments of the present disclosure. FIG. 50B is a schematic diagram illustrating an exemplary wearing of an open earphone according to some embodiments of the present disclosure. FIG. 50C is a schematic diagram illustrating an ear according to some embodiments of the present disclosure. In some embodiments, an ear canal of a user may be regarded as a listening position, with the ear canal facing a concha cavity. In order for a second cavity defined by the housing 120 and the concha cavity to wrap as much as possible around the listening position (i.e., the ear canal), an area of the housing 120 covering the concha cavity of the user may be in a range of 20 $mm^2$-130 $mm^2$. In some embodiments, an area of the housing 120 covering the concha cavity of the user may be measured by wearing the open earphone 100 on a standard human ear (e.g., a KB5000/KB5001 somatology auricle manufactured by the Danish company GRAS Sound & Vibration, or adopting any auricle that conforms to the IEC 60318-7 standard). For example, when the housing 120 of the open earphone 100 is not abutted against a wall of the concha cavity (as shown in FIG. 49A), the area of the housing 120 covering the concha cavity of the user may be an area of a tringle region formed by two contact points farthest from each other among the contact points between the housing 120 and an inner contour of the concha cavity (e.g., the contact points 491 and 492 shown in FIG. 49) and a farthest end point of the housing 120 from a human face (e.g., the farthest end point 493 shown in FIG. 49B). The inner contour refers to a contour facing a side of the human face, such as the inner contour of the concha cavity shown in FIG. 49C. Further example, when the housing 120 of the open earphone 100 abuts against a wall surface of the concha cavity (as shown in FIG. 50A) or when the housing 120 of the open earphone 100 abuts against the auricle beyond the concha cavity (as shown in FIG. 50B), the area of the housing 120 covering the concha cavity of the user may be the area of a triangle formed by the two contact points farthest from each other among the contact points between the housing 120 and the inner contour (the contour facing toward the human face) of the concha cavity (e.g., the contact points 501 and 502 shown in FIG. 50) and the farthest end point of the housing 120 contacting the wall surface of the concha cavity or the outer contour of the concha cavity (e.g., the farthest end point 503 shown in FIG. 50C). The outer contour refers to the contour of one side away from the human face, such as the inner contour shown in FIG. 49C. It should be appreciated that when the user wears the open earphone 100, the housing 120 may not be in contact with the user and may be suspended, so the contact point between the housing 120 and the inner contour or the outer contour of the concha cavity in the present disclosure may be an intersection between a projection of the housing 120 on the contour of the concha cavity of the user and the inner contour or the outer contour of the concha cavity.

FIG. 51 is a schematic diagram illustrating an exemplary wearing of an open earphone according to some embodiments of the present disclosure. In some embodiments, in order to enable the second cavity to wrap around a listening position (i.e., an ear canal), the housing 120 may at least partially cover the ear canal of the user, as shown in FIG. 51. In some embodiments, a ratio of an area of the housing 120 covering the ear canal of the user to an area of the ear canal may be greater than ½. In some embodiments, a lower edge of the housing 120 may be lower than a center of the ear canal opening of the user (e.g., closer to the center of the ear canal opening of the user) along a short axis of the housing 120. In some embodiments, along the short axis direction of the housing 120, the lower edge of the housing 120 may have an overlap distance h1 with the ear canal of the user that is in a range of 1 mm-7.5 mm. For example, as shown in FIG. 51, when a lower edge 511 of the housing 120 is parallel to a sagittal axis of a human body, along a vertical axis direction of the human body (i.e., the short axis direction of the housing 120), the overlap distance h1 between the lower edge 511 of the housing 120 and the ear canal of the user may be in a range of 1 mm-7.5 mm. For another example, when the lower edge 511 of the housing 120 is not parallel to the sagittal axis of the human body, along the direction of the short axis of the housing 120, the overlap distance h1 of the lower edge 511 of the housing 120 and the ear canal of the user may be in a range of 1 mm-7.5 mm.

In some embodiments, a regulation of the sound volumes outputted from the first sound outlet 123 and the second sound outlet 124, may be achieved by regulating a sound output power of the acoustic driver 110. In some embodiments, an acoustic structure may be respectively provided corresponding to the first sound hole 123 and the second sound hole 124 within the first cavity, and two sounds with opposite phases output by the acoustic driver 110 may be respectively outputted from the first sound hole 123 and the second sound hole 124 through the acoustic structures. The acoustic structures may adjust a ratio of a sound volume of the sound outputted from the sound hole (i.e., the second sound hole 124) outside the second cavity to a sound volume of the sound outputted from the sound hole (i.e., the first sound hole 123) disposed inside the second cavity. Exemplary acoustic structures may include slits, conduits, cavities, gauzes, porous media, etc., or any combination thereof.

It may be understood that FIGS. 31-44 are for exemplary description only and do not constitute a limitation thereof. For those skilled in the art, a wide variety of variations and modifications may be made in accordance with the guidance of the present disclosure. The beneficial effects produced by different embodiments may be different, and in different embodiments, the beneficial effects produced may be any one or a combination of the foregoing, or any other beneficial effect that may be obtained. For example, the housing 120 may be a circular structure and may be disposed throughout the concha cavity. For another example, the housing 120 may be an oval structure. One end of the housing 120 may be abut against the concha cavity, and the other end of the housing 120 may be located on the outside of the auricle. It may be appreciated that the present disclosure is illustrated with the sound holes being two as an example, but the present disclosure does not intend to limit a count of the sound holes. The count may be two or more, for outputting the sound generated by the acoustic driver. The present disclosure is illustrated with the leaky structure including only one opening, and it may be appreciated that the cavity structure (i.e., the second cavity) may include a plurality of openings.

The basic concepts have been described above, and it may be apparent to those skilled in the art that the foregoing detailed disclosure serves only as an example and does not constitute a limitation of the present disclosure. Although not explicitly stated here, those skilled in the art may make various modifications, improvements, and amendments to the present disclosure. These modifications, improvements, and modifications are intended to be suggested by the present disclosure, and are within the spirit and scope of the exemplary embodiments of the present disclosure.

Moreover, certain terminology has been used to describe embodiments of the present disclosure. For example, "an embodiment", "one embodiment", and/or "some embodiment" may mean a feature, structure, or characteristic associated with at least one embodiment of the present disclosure. Accordingly, it should be emphasized and noted that two or more references to "one embodiment" or "an embodiment" or "an alternative embodiment" in different places in the present disclosure may not necessarily refer to the same embodiment. In addition, some features, structures, or features in the present disclosure of one or more embodiments may be appropriately combined.

Additionally, unless expressly stated in the claims, the order of the processing elements and sequences, the use of numerical letters, or the use of other names in the present disclosure are not intended to limit the order of the processes and methods of the present application. Although the above disclosure discusses through various examples what is currently considered to be a variety of useful embodiments of the present disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, they may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, the disclosure does not mean that the present disclosure object requires more features than the features mentioned in the claims. Rather, claimed subject matter may lie in less than all features of a single foregoing disclosed embodiment.

Some embodiments use numbers to describe the number of components, attributes, and it should be understood that such numbers used in the description of the embodiments are modified in some examples by the modifiers "about", "approximately", or "substantially", "approximately", or "generally". Unless otherwise noted, the terms "about," "approximate," or "roughly", indicate that a ±20% variation in numbers is allowed. Correspondingly, in some embodiments, the numerical parameters used in the present disclosure and the claims are approximations, which changes depending on the desired characteristics of individual embodiments. In some embodiments, the numerical parameters should take into account the specified number of valid digits and employ a general place-keeping method. While the numerical domains and parameters used to confirm the breadth of their ranges in some embodiments of the present disclosure are approximations, in specific embodiments such values are set to be as precise as possible within a feasible range.

For each patent, patent application, patent application disclosure, and other material cited in this application, such as articles, books, disclosures, publications, documents, etc., the entire contents of which are hereby incorporated herein by reference. Except for application history documents that are inconsistent with or create a conflict with the contents of the present disclosure, and except for documents that limit the broadest scope of the claims of the present disclosure that are presently or hereafter appended thereof. It should be noted that to the extent that the descriptions, definitions, and/or use of terms in the materials appurtenant to the present disclosure are inconsistent with or in conflict with the contents of the present disclosure, the descriptions, definitions, and/or use of terms in the present disclosure shall prevail.

Finally, it should be understood that the embodiments in the present disclosure are used only to illustrate the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An open earphone comprising:

an acoustic driver for generating two sounds with opposite phases;

a housing for accommodating the acoustic driver, the housing being provided with two sound holes for outputting each of the two sounds with opposite phases; and a suspension structure for fixing the housing in a position near an ear of a user without blocking an ear canal of the user, wherein the housing includes a body and a baffle, the body defines a first cavity accommodating the acoustic driver, the baffle is connected to the body and extended in a direction of the ear canal of the user, the baffle and an auricle of the user define a second cavity, and the two sound holes are respectively located inside and outside of the second cavity, wherein a ratio of a distance between a boundry of the baffle near the ear canal of the user and a sound hole located outside of the second cavity to a distance between the two sound holes is less than 1.78.

2. The open earphone of claim 1, wherein the baffle is connected to one side of the body facing away from face of the user, and a thickness of the baffle is less than a thickness of the body.

3. The open earphone of claim 1, wherein a distance between a boundry of the baffle near the ear canal of the user and a sound hole located outside of the second cavity is less than a distance between the two sound holes.

4. The open earphone of claim 1, wherein a ratio of a volume of the second cavity to a reference volume is less than 1.75, the reference volume being a cube of a distance between a boundry of the baffle near the ear canal of the user and a sound hole located outside of the second cavity.

5. The open earphone of claim 1, wherein a ratio of a sound volume of a sound output from a sound hole located outside of the second cavity to a sound volume of a sound output from a sound hole located inside the second cavity is in a range of 0.2-2.0.

6. The open earphone of claim 5, further including an acoustic structure, the acoustic structure being configured to adjust the ratio of the sound volume of the sound output from the sound hole located outside of the second cavity to the sound volume of the sound output from the sound hole located inside the second cavity, the acoustic structure including one of the following: a slit, a conduit, a cavity, a gauze, or a porous medium.

7. The open earphone of claim 1, wherein a sound hole located inside of the second cavity is located between the ear canal of the user and a sound hole located outside of the second cavity.

8. The open earphone of claim 1, wherein when the body is located on a front side of a tragus of the user, a horizontal extension size of the baffle is in a range of 2 mm-22 mm, and a longitudinal extension size of the baffle is in a range of 2 mm-10 mm.

9. The open earphone of claim 8, wherein an effective area of the baffle is in a range of 84 $mm^2$-1060 $mm^2$.

10. The open earphone of claim 8, wherein one of the two sound holes is on a side of the body facing the tragus, and the other sound hole is on a side where the baffle is located.

11. The open earphone of claim 1, wherein when the body is located within the auricle or when there is an overlap between the body and a projection surface of the auricle, a longitudinal extension size of the baffle is not less than 1 cm or an effective area of the baffle is not less than 20 $mm^2$.

12. The open earphone of claim 11, wherein one of the two sound holes is on a side of the body towards the ear canal, and the other sound hole is on a side of the body away from the ear canal.

13. The open earphone of claim 1, wherein at least a portion of the ear canal of the user is located inside the second cavity.

14. The open earphone of claim 1, wherein the housing at least partially covers the ear canal of the user.

15. An open earphone comprising:

an acoustic driver for generating two sounds with opposite phases;

a housing for accommodating the acoustic driver, the housing being provided with two sound holes for outputting the two sounds with opposite phases respectively; and a suspension structure for holding an end of the housing away from the suspension structure against an auricle of a user, wherein the housing defines a first cavity accommodating the acoustic driver, the housing and the auricle define a second cavity, and the two sound holes are respectively located inside and outside of the second cavity, wherein a ratio of a distance between a gap between the housing and an ear canal opening and a sound hole located outside of the second cavity to a distance between the two sound holes is less than 1.78.

16. The open earphone of claim 15, wherein one end of the housing away from the suspension structure is abut against a concha cavity, and the housing and the concha cavity define the second cavity.

17. The open earphone of claim 15, wherein an angle between a surface of the housing towards a triangular fossa and a tangent line between the suspension structure and a housing connection is in a range of 100°-150°.

18. The open earphone of claim 15, wherein a distance between a gap between the housing and an ear canal opening and a sound hole located outside of the second cavity is less than a distance between the two sound holes.

* * * * *